US007809572B2

(12) United States Patent
Yamagami et al.

(10) Patent No.: US 7,809,572 B2
(45) Date of Patent: Oct. 5, 2010

(54) VOICE QUALITY CHANGE PORTION LOCATING APPARATUS

(75) Inventors: Katsuyoshi Yamagami, Osaka (JP); Yumiko Kato, Osaka (JP); Shinobu Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 418 days.

(21) Appl. No.: 11/996,234

(22) PCT Filed: Jun. 5, 2006

(86) PCT No.: PCT/JP2006/311205

§ 371 (c)(1), (2), (4) Date: Jan. 18, 2008

(87) PCT Pub. No.: WO2007/010680

PCT Pub. Date: Jan. 25, 2007

(65) Prior Publication Data

US 2009/0259475 A1 Oct. 15, 2009

(30) Foreign Application Priority Data

Jul. 20, 2005 (JP) ............................ 2005-209449

(51) Int. Cl.
*G06F 15/00* (2006.01)
*G10L 19/00* (2006.01)
*G10L 13/00* (2006.01)
*G10L 13/06* (2006.01)

(52) U.S. Cl. ...................... 704/260; 704/200; 704/220; 704/258; 704/267

(58) Field of Classification Search ................. 704/260, 704/267, 258, 264, 220, 200
See application file for complete search history.

(56) References Cited

U.S. PATENT DOCUMENTS 5,752,228 A * 5/1998 Yumura et al. .............. 704/260
6,226,614 B1 * 5/2001 Mizuno et al. .............. 704/260
6,625,257 B1 * 9/2003 Asaoka et al. ........... 379/88.01

(Continued)

FOREIGN PATENT DOCUMENTS

EP 1 256 932 11/2002

(Continued)

OTHER PUBLICATIONS

Jiang, D.N., W. Zhang, L. Shen and L.H. Cai, 2005. Prosody analysis and modeling for emotional speech synthesis. Proceeding of the IEEE International Conference on Acoustics, Speech, and Signal Process Mar. 18-23, IEEE Xplore Press, USA., pp. 281-284.*

(Continued)

*Primary Examiner*—David R Hudspeth
*Assistant Examiner*—Edgar Guerra-Erazo
(74) *Attorney, Agent, or Firm*—Wenderoth, Lind & Ponack, L.L.P.

(57) ABSTRACT

A text edit apparatus which presents, based on language analysis information regarding a text, a portion of the text where voice quality may change when the text is read aloud has advantages of predicting likelihood of the voice quality change and judging whether or not the voice quality change will occur. The apparatus includes: a voice quality change estimation unit (103) which estimates the likelihood of the voice quality change which occurs when the text is read aloud, for each predetermined unit which is an input symbol sequence of the text including at least one phonologic sequence, based on language analysis information which is a symbol sequence of a result of language analysis including a phonologic sequence corresponding to the text; a voice quality change portion judgment unit (105) which locates a portion of the text where the voice quality change is likely to occur, based on the language analysis information and a result of the estimation performed by the voice quality change estimation unit (103); and a display unit (108) which presents the user the portion which is located by the voice quality change portion judgment unit (105) as where the voice quality change is likely to occur.

17 Claims, 34 Drawing Sheets

U.S. PATENT DOCUMENTS

| | | | | |
|---|---|---|---|---|
| 6,665,641 | B1 * | 12/2003 | Coorman et al. | 704/260 |
| 7,617,105 | B2 * | 11/2009 | Shi et al. | 704/260 |
| 2003/0093280 | A1 | 5/2003 | Oudeyer | |

FOREIGN PATENT DOCUMENTS

| | | |
|---|---|---|
| JP | 5-224690 | 9/1993 |
| JP | 7-72900 | 3/1995 |
| JP | 2000-172289 | 6/2000 |
| JP | 2000-250907 | 9/2000 |
| JP | 2003-84800 | 3/2003 |
| JP | 2003-248681 | 9/2003 |
| JP | 3587976 | 8/2004 |

OTHER PUBLICATIONS

Gobl, C., Bennett, E. and Ni Chasaide, A., "Expressive synthesis: how crucial is voice quality", Proceedings of the IEEE Workshop on Speech Synthesis, Santa Monica, California, paper 52:1-4, 2002.*

Gobl, C. and Ni Chasaide, A., "The role of voice quality in communicating emotion, mood and attitude", Speech Communication, 40, pp. 189-212, 2003.*

International Search Report issued Aug. 29, 2006 in the International (PCT) Application of which the present application is the U.S. National Stage.

"*Voice Quality Associated with Voice Source*", The Acoustical Society of Japan, Acoustical Science and Technology, Journal, vol. 51, No. 11, 1995, pp. 869-875, with partial translation.

* cited by examiner

FIG. 8

| | | |
|---|---|---|
| Set 1 | (to require, to request, to demand)<br>要求します、 請求します、 求めます<br>youkyushimasu, seikyushimasu, motomemasu | 301 |
| Set 2 | (to be required, to be necessary, to be needed)<br>掛かります、 必要です、 要します<br>kakarimasu, hitsuyoudesu, youshimasu | 302 |
| Set 3 | (important, precious, valuable, crucial)<br>大事な、 大切な、 重要な、 無視できない<br>daijina, taisetsuna, juyouna, mushidekinai | 303 |
| Set 4 | ..... | |
| Set 5 | ..... | |
| ..... | ..... | |
| ..... | ..... | |
| ..... | ..... | |

FIG. 28

| Consonants in Mora | Degree of Voice Quality Change |
|---|---|
| p | 0.1 |
| t | 0.6 |
| k | 0.7 |
| ch | 0.1 |
| ts | 0.0 |
| s | 0.3 |
| ⋮ | ⋮ |

VOICE QUALITY CHANGE PORTION LOCATING APPARATUS

TECHNICAL FIELD

The present invention relates to a voice quality change portion locating apparatus and the like which locate, in a text to be read aloud, a portion where voice quality may change.

BACKGROUND ART

Conventional text edit apparatuses or text edit methods have been known which estimate how readers will be impressed by expression (contents) in a text and then rewrite a portion against writer's desired impression into a different expression so as to give the writer's desired impression (refer to Patent Reference 1, for example).

Text-to-speech apparatuses or text reading methods using text edit functions have also been known which observe combinations of pronunciation sequences when a target text is reading aloud, then rewrite an expression portion having a pronunciation combination unlikely to be listened to into a different expression easy to be listened to, and eventually read the text aloud (refer to Patent Reference 2, for example).

In addition, methods for evaluating reading voices have been known which evaluate a combination of voice pronunciations from a viewpoint of "confusing-ness", by estimating a similarity between two sequences of Katakana characters (Japanese alphabets) to be read aloud continuously, and if the estimation result satisfies certain conditions, determining that the continuous reading of these sequences confuse listeners since their pronunciations are similar (refer to Patent Reference 3, for example).

As described below, there is another challenge except the "easy to be listened to" and the "confusing-ness", which is to be overcome by editing a text based on the evaluation result of text reading voices.

When a reader reads a text aloud, sound quality of the reading voices is sometimes partially changed due to tensing or relaxing of a phonatory organ which the reader does not intend to do. When listeners listen to the change in the sound quality due to tensing or relaxing of a phonatory organ, the change is heard as "pressed voice" or "relaxed voice" of the reader. However, the voice quality changes such as "pressed voice" and "relaxed voice" in voices are phenomena characteristically observed in voices having emotion and expression, and it has been known that such partial voice quality changes characterize emotion and expression of the voices and thereby create impression of the voices (refer to Non-Patent Reference 1, for example). Therefore, when a reader reads some text aloud, listeners sometimes comprehend impression, emotion, expression, and the like, from the voice quality changes partially occurred in the reading voices, rather than expression modes (writing style and wording) and contents of the text. A problem is encountered when the listener's impression is not what the reader has intended to convey or is different from what the reader has expected. For instance, while a reader reads lecture documents aloud, when a voice of the reader becomes falsetto accidentally without reader's intension and thereby voice quality change occurs although the reader is reading the documents calmly and without any emotion, this may give listeners impression that the reader is nervous and upset.

[Patent Reference 1] Japanese Unexamined Patent Application Publication No. 2000-250907 (page 11, FIG. 1)

[Patent Reference 2] Japanese Unexamined Patent Application Publication No. 2000-172289 (page 9, FIG. 1)

[Patent Reference 3] Japanese Patent Publication No. 3587976 (page 10, FIG. 5)

[Non-Patent Reference 1] "Ongen kara mita seishitsu (Voice Quality Associated with Voice Sources)", Hideki Kasuya and Yang Chang-Sheng, Journal of The Acoustical Society of Japan, Vol. 51, No. 11, 1995, pp 869-875

DISCLOSURE OF INVENTION

Problems that Invention is to Solve

However, a drawback of the conventional apparatuses and methods is that these apparatuses and methods fail to predict at which part such voice quality change is likely to occur in the text reading voices, or to judge whether or not the voice quality change will occur. This results in another drawback that the conventional apparatuses and methods fail to predict impression which listeners will have from partial voice quality change listening to reading voices. Furthermore, this results in still another drawback that the conventional apparatuses and methods fail to locate a portion of a text where voice quality change is likely to occur and thereby may give the listeners impression the reader has not intended, and then to present a different expression indicating similar contents or rewrite the portion into the different expression.

The present invention is conceived to solve the above drawbacks. An object of the present invention is to provide a voice quality change portion locating apparatus and the like which can predict likelihood of voice quality change (hereinafter, referred to also as a "voice quality change likelihood" or simply a "likelihood") and judge whether or not the voice quality change will occur.

Another object of the present invention is to provide a voice quality change portion locating apparatus and the like which can predict impression which listeners will have from partial voice quality change listening to reading voices.

Still another object of the present invention is to provide a voice quality change portion locating apparatus and the like which can locate a portion of a text where voice quality change is likely to occur and thereby may give listeners impression a reader has not intended, and present a different expression indicating similar contents or rewrite the portion into the different expression.

Means to Solve the Problems

In accordance with an aspect of the present invention, there is provided a voice quality change portion locating apparatus which locates, based on language analysis information regarding a text, a portion of the text where voice quality may change when the text is read aloud. The voice quality change portion locating apparatus includes: a voice quality change estimation unit operable to estimate likelihood of the voice quality change which occurs when the text is read aloud, for each predetermined unit of an input symbol sequence including at least one phonologic sequence, based on the language analysis information which is a symbol sequence of a result of language analysis including a phonologic sequence corresponding to the text; and a voice quality change portion locating unit operable to locate a portion of the text where the voice quality change is likely to occur, based on the language analysis information and a result of the estimation performed by the voice quality change estimation unit.

By the above structure, the portion of the text where voice quality change is likely to occur is located. Thereby, the present invention provides the voice quality change portion locating apparatus which can predict the likelihood of voice quality change and judge whether or not the voice quality change will occur.

It is preferable that the voice quality change estimation unit estimates the likelihood of voice quality change, for each kind of the voice quality changes, based on each utterance mode per a predetermined unit of language analysis information, using a plurality of estimation models. The estimation modes are set for respective kinds of voice quality changes and generated by performing analysis and statistical learning on a plurality of voices for each of more than tree kinds of utterance modes of the same user.

By the above structure, the voice quality change portion locating apparatus according to the present invention can perform analyze and the like on voices uttered by the three kinds of utterance modes, such as “pressed voice”, “breathy voice”, “without emotion”, thereby generating estimation models of the “pressed voice” and the “breathy voice”. Using the two models, it is possible to specify what kind of voice quality change occurs at what kind of portion. In addition, it is possible to replace the portion where the voice quality change occurs to an alternative expression.

It is further preferable that the voice quality change estimation unit is operable to (i) select an estimation model corresponding to each of a plurality of users, from among a plurality of estimation models for the voice quality change which are generated by performing analysis and statistical learning on respective voices of the plurality of users, and (ii) estimate the likelihood of the voice quality change for the each predetermined unit of the language analysis information, using the selected estimation model.

By the above structure, by holding the estimation models of voice quality change for each user, the voice quality change portion locating apparatus according to the present invention can locate, with more accuracy, the portion where the voice quality change is likely to occur.

It is further preferable that the voice quality change portion locating apparatus further includes: an alternative expression storage unit in which an alternative expression for a language expression is stored; and an alternative expression presentation unit operable to (i) search the alternative expression storage unit for an alternative expression for the portion of the text where the voice quality change is likely to occur, and (ii) present the alternative expression.

By the above structure, the voice quality change portion locating apparatus according to the present invention can locate a portion of a text where voice quality change is likely to occur, and convert the portion into an alternative expression. Thereby, the holding of the alternative expressions by which voice quality changes are unlikely to occur makes it possible to suppress occurrence of voice quality changes by reading aloud the text with the replaced alternative expression.

It is further preferable that the voice quality change portion locating apparatus further includes a voice synthesis unit operable to generate voice by which the text in which the portion is replaced by the alternative expression by the voice quality change portion replacement unit is read aloud.

By the above structure, when voice quality in voices synthesized by the voice synthesis unit have bias (habit) in balance among voice quality so as to cause voice quality changes such as “pressed voice” and “breathy voice” depending on phonemes, the voice quality change portion locating apparatus according to the present invention can generate voices to be read aloud by preventing instability of voice quality due to the bias as much as possible.

It is further preferable that the voice quality change portion locating apparatus further includes a voice quality change portion presentation unit operable to present a user the portion of the text which is located by the voice quality change locating unit as where the voice quality change is likely to occur.

By the above structure, the voice quality change portion locating apparatus according to the present invention can present a part where voice quality change tends to occur, so that based on the presented information the user can predict impression which listeners will have from partial voice quality change listening to reading voices.

It is further preferable that the voice quality change portion locating apparatus further includes an elapsed-time calculation unit operable to calculate an elapsed time which is a time period of reading from a beginning of the text to a predetermined position of the text, based on speech rate information indicating a speed at which a user reads the text aloud, wherein the voice quality change estimation unit is further operable to estimate the likelihood of the voice quality change for the each predetermined unit, by taking the elapsed time into account.

By the above structure, the voice quality change portion locating apparatus according to the present invention can estimate likelihood of voice quality change and predict a portion where the voice quality change will occur, in consideration of influence, in reading text aloud, of an elapsed time during which a reader’s phonatory organ is used for the reading, in other words, tiredness of a throat or the like. This allows the voice quality change portion locating apparatus to locate, with more accuracy, the portion where the voice quality change is likely to occur.

It is further preferable that the voice quality change portion locating apparatus further includes a voice quality change ratio judgment unit operable to judge a ratio of (i) the portion which is located by the voice quality change locating unit as where the voice quality change is likely to occur, to (ii) all or a part of the text.

By the above structure, the voice quality change portion locating apparatus according to the present invention enables the user to learn a rate of the voice quality change to a whole text or a part of the text. Thereby, the user can predict impression which listeners will have from partial voice quality change listening to reading voices.

It is further preferable that the voice quality change portion locating apparatus further includes: a voice recognition unit operable to recognize voice by which a user reads the text aloud; a voice analysis unit operable to analyze an occurrence degree of the voice quality change, for each predetermined unit which includes each phoneme unit of the voice of the user, based on a result of the recognition performed by the voice recognition unit; and a text evaluation unit operable to compare (i) the portion of the text which is located by the voice quality change locating unit as where the voice quality change is likely to occur to (ii) a portion where the voice quality change has actually occurred in the voice of the user, based on (a) the portion of the text where the voice quality change is likely to occur and (b) a result of the analysis performed by the voice analysis unit.

By the above structure, the voice quality change portion locating apparatus according to the present invention can compare a portion of voice quality change which is predicted from a text to be read, with a portion where the voice quality change has actually occurred when the user has read the text aloud. Thereby, if the user repeats practice of reading of the text, the voice quality change portion locating apparatus enables the user to check a skill level of the reading so as to prevent voice quality change at the portion where the voice quality change is predicted to occur. Or, if the user repeats practice of reading of the text, the voice quality change portion locating apparatus enables the user to check a skill level of the reading so as to cause voice quality change at the portion where the voice quality change is predicted to occur to give listeners impression which the user has intended.

It is further preferable that the voice quality change estimation unit is operable to estimate the likelihood of the voice quality change for the each predetermined unit of the language analysis information, based on a numeric value allocated to each phoneme included in the predetermined unit, with reference to a phoneme-based voice quality change table in which a level of the likelihood of the voice quality change is represented for the each phoneme by the numeric value.

By the above structure, the present invention provides the voice quality change portion locating apparatus which can predict the likelihood of voice quality change or judge whether or not the voice quality change will occur, even by using the phoneme-based voice quality change table which has been previously prepared, instead of using the estimation models.

It should be noted that the present invention can be achieved not only as the above voice quality change portion locating apparatus including these characteristic units, but also as the voice quality change portion locating method including steps performed by the characteristic units of the apparatus, a program causing a computer to execute the characteristic units of the apparatus, and the like. Obviously, such a program can be distributed via recording medium such as Compact Disc-Read Only Memory (CD-ROM) or communication network such as the Internet.

Effects of the Invention

Thus, the present invention can predict and locate a part and a kind of a partial voice quality change which will occur in text reading voices, thereby solving the drawbacks of the conventional arts. Therefore, the present invention has advantages of enabling a reader as a user to learn a part and a kind of a partial voice quality change which will occur in text reading voices, then to predict impression of the reading voices given to listeners when being read aloud, and to pay attention to the part in actual reading.

The present invention has further advantages of: regarding a language expression at a portion where voice quality change giving undesired impression will occur in a text, presenting alternative expressions indicating the same contents as the language expression; and automatically converting the language expression into the alternative expression.

The present invention has still further advantages that the present invention enables a reader as a user to confirm an actual voice quality change portion occurred when the reader reads a text aloud, and to compare the actual voice quality change portion with an estimated voice quality change portion which is estimated from the text. Thereby, when the reader intends to read the text without producing undesired voice quality changes, or when the reader intends to read the text with desired voice quality changes at appropriate portions, if the reader repeats practice of the reading the text aloud, the present invention has specific advantages of enabling the reader to easily learn a skill level of distinguishing utterance of voice quality changes.

Furthermore, the present invention can locate a portion of an input text where voice quality change is likely to occur, and replace a language expression related to the located portion to an alternative expression. Thereby, especially when voice quality in voices generated by the voice quality change portion locating apparatus has a bias (habit) in the voice quality balancing so as to cause voice quality changes such as "pressed voice" and "breathy voice" depending on kinds of phonemes, it is possible to read aloud while preventing, as much as possible, voice quality instability due to the bias. This results in another advantages of the present invention. In the meanwhile, there is a tendency in which voice quality change per phoneme may weaken phonological feature of phoneme and then may reduce its clearness. Therefore, if the clearness of the reading voices is to be prioritized, the present invention has advantages of suppressing the problem of the clearness reduction due to the voice quality changes, by preventing, as much as possible, language expressions including phonemes which tend to cause voice quality change.

BRIEF DESCRIPTION OF DRAWINGS

FIG. 8 is a table showing an example of an alternative expression database of the text edit apparatus according to the first embodiment of the present invention.

FIG. 28 is a table showing an example of a phoneme-based voice quality change information table.

NUMERICAL REFERENCES

Figure 1:
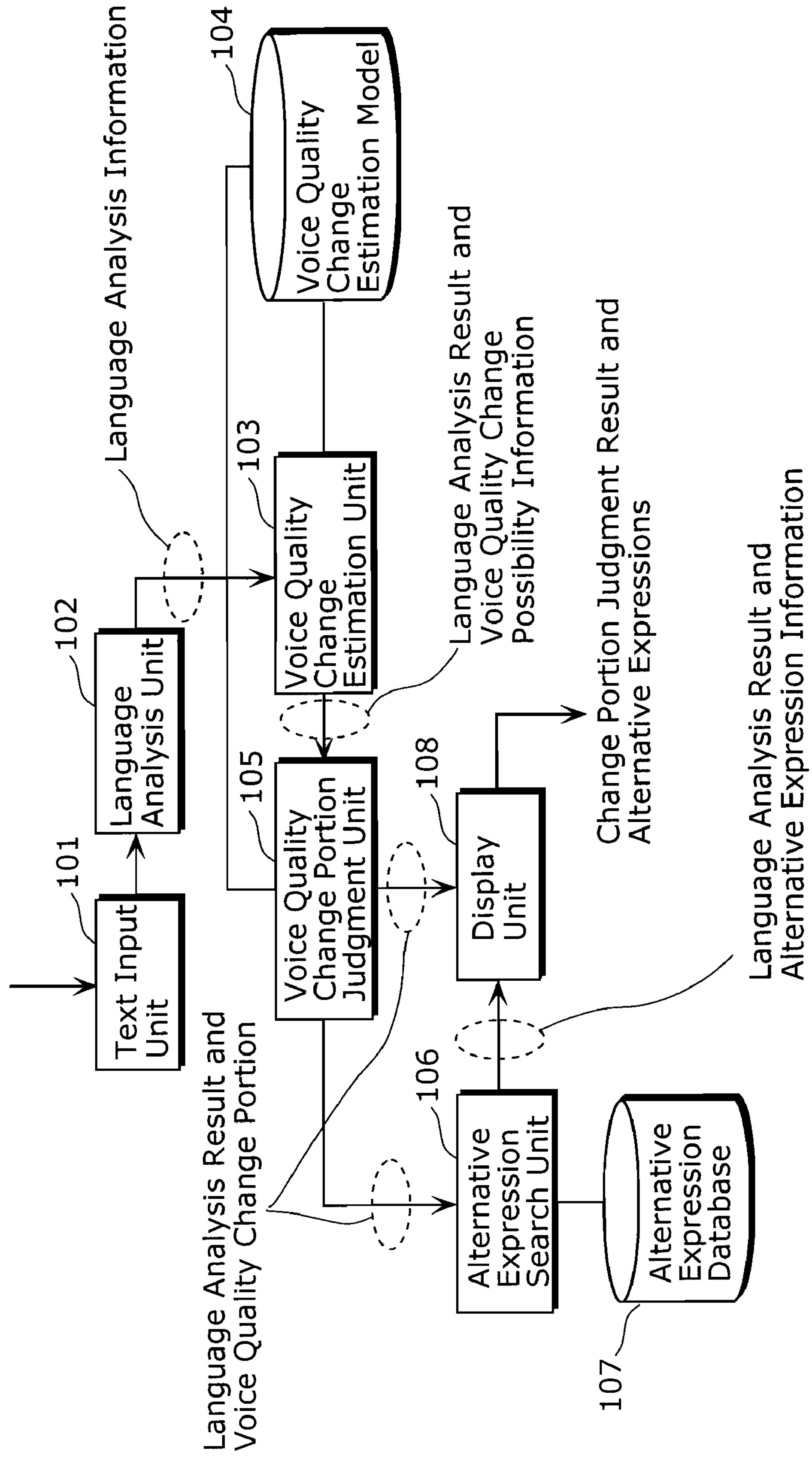
FIG. 1 is a functional block diagram of a text edit apparatus according to the first embodiment of the present invention.

101, 1010 text input unit
102, 1020 language analysis unit
103, 103A, 1030 voice quality change estimation unit
104, 104A, 104B voice quality change estimation model
105, 105A, 105B, 1050 voice quality change portion judgment unit
106, 106A alternative expression search unit
107 alternative expression database
108, 108A, 108B display unit
109 alternative expression sort unit
110 user identification information input unit
111 switch
112 speech rate input unit
113 elapsed-time measurement unit
114, 114A comprehensive judgment unit
115 voice input unit
116 voice recognition unit
117 voice analysis unit
118 expression conversion unit
119 voice-synthesis language analysis unit
120 voice synthesis unit
121 voice output unit
1040 phoneme-based voice quality change information table
1091 sorting unit

BEST MODE FOR CARRYING OUT THE INVENTION

The following describes embodiments of the present invention with reference to the drawings.

First Embodiment

In the first embodiment of the present invention, description is given for a text edit apparatus which estimates variation of voice quality from a text and presents a user candidates for an alternative expression (hereinafter, refers to also as "alternative expressions") at a part where the voice quality changes.

FIG. 1 is a functional block diagram of the text edit apparatus according to the first embodiment of the present invention.

In FIG. 1, the text edit apparatus is an apparatus which edits an input text so that unintended impression is not given to listeners when a reader reads the text aloud. The text edit apparatus includes a text input unit 101, a language analysis unit 102, a voice quality change estimation unit 103, a voice quality change estimation model 104, a voice quality change portion judgment unit 105, an alternative expression search unit 106, an alternative expression database 107, and a display unit 108.

The text input unit 101 is a processing unit which receives a text to be processed. The language analysis unit 102 is a processing unit which performs language analysis on the text provided from the text input unit 101, and thereby outputs a result of the language analysis (hereinafter, referred to as "language analysis result") that includes a sequence of phonemes as pronunciation information, information of boundary between accent phrases, accent position information, information of part of speech, and syntax information. The voice quality change estimation unit 103 is a processing unit which estimates a voice quality change likelihood for each accent phrase of the language analysis result, using the voice quality change estimation model 104 which is previously generated by statistical learning. The voice quality change estimation model 104 is made of an estimation equation and a threshold value corresponding to the estimation equation. In the estimation equation, a part of the various information included in the language analysis result is set to an input variable, and a voice-quality change estimation value for each phoneme portion in the language processing result is set to an objective variable.

The voice quality change portion judgment unit 105 is a processing unit which judges whether or not voice quality change may change in each accent phase, based on a voice-quality change estimation value calculated by the voice quality change estimation unit 103 and a threshold value corresponding to the estimation value. The alternative expression search unit 106 is a processing unit which searches sets of alternative expressions (hereafter, referred to also as "alternative expression sets") stored in the alternative expression database 107, for alternative expressions of a language expression at the portion of the text which is judged by the voice quality change portion judgment unit 105 as where voice quality may change, and then outputs the found set of alternative expressions. The display unit 108 is a display apparatus which displays (i) an entire input text, (ii) a portion of the text which is judged by the voice quality change portion judgment unit 105 as where voice quality may change, as highlighted display, (iii) the set of alternative expressions outputted from the alternative expression search unit 106.

Figure 2:
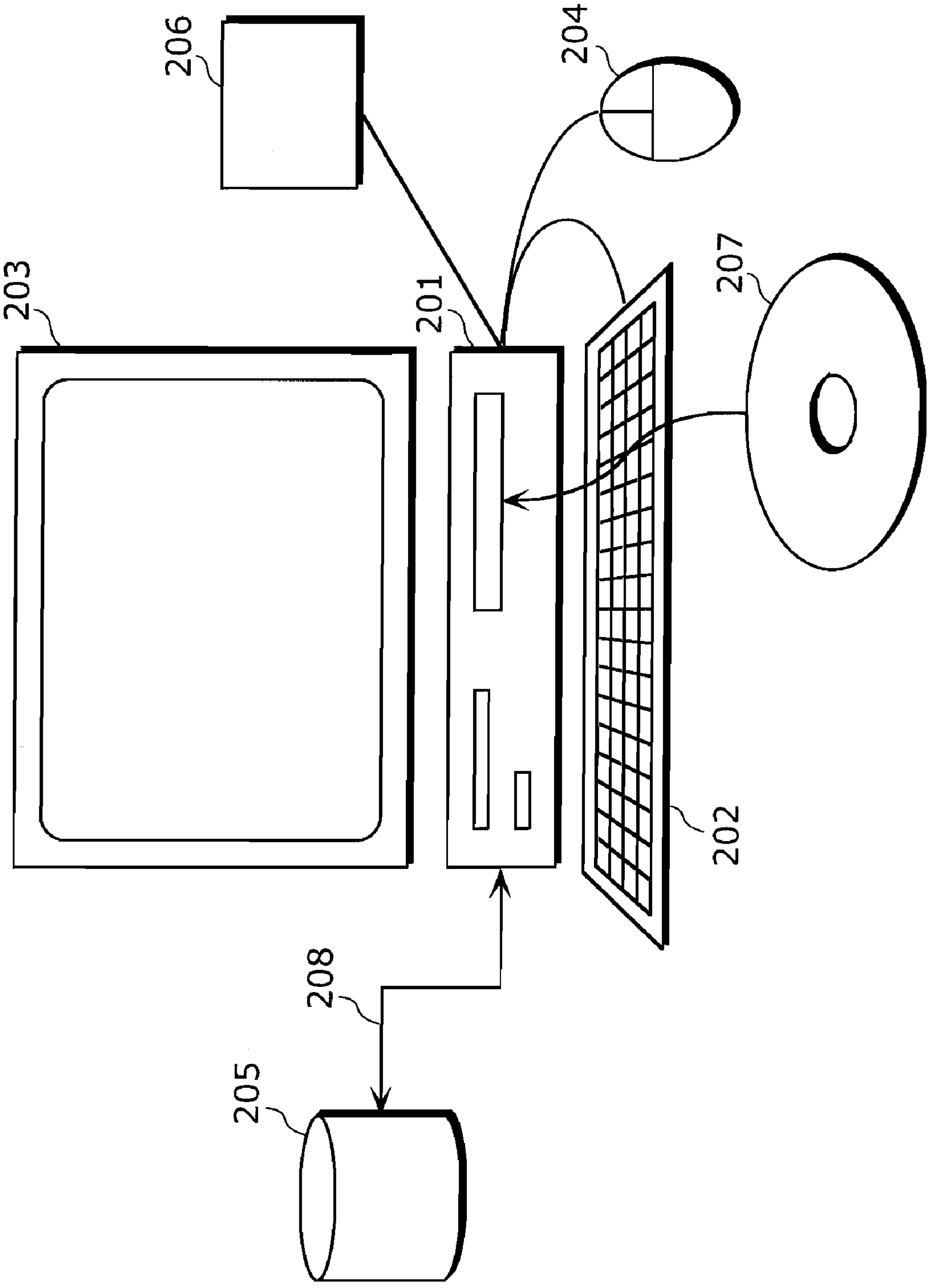
FIG. 2 is a diagram showing a computer system implementing the text edit apparatus according to the first embodiment of the present invention.

The above-explained text edit apparatus is implemented, for example, in a computer system as shown in FIG. 2. FIG. 2 is a diagram showing the computer system implementing the text edit apparatus according to the first embodiment of the present invention.

The computer system includes a body part 201, a keyboard 202, a display 203, and an input device (mouse) 204. The voice quality change estimation model 104 and the alternative expression database 107 of FIG. 1 are stored in a CD-ROM 207 which is set into the body part 201, a hard disk (memory) 206 which is embedded in the body part 201, or a hard disk 205 which is in another system connected with the computer system via a line 208. Note that the display unit 108 in the text edit apparatus of FIG. 1 corresponds to the display 203 in the system of FIG. 2, and that the text input unit 101 of FIG. 1 corresponds to the display 203, the keyboard 202, and the input device 204 in the system of FIG. 2.

Prior to the description of processing performed by the text edit apparatus having the structure described in the first embodiment, explanation is given for the background in which the voice quality change estimation unit 103 can reasonably estimate the voice quality change likelihood based on the voice quality change estimation model 104. Conventionally, the uniform variation in an entire utterance has been often focused, regarding expression of voice with expression or emotion, especially regarding variation of voice quality. Therefore, technological developments have been conducted to realize the uniform variation. Regarding such voice with expression or emotion, however, it has been known that voices of various voice quality are mixed even in a certain utterance style, thereby characterizing expression and emotion of the voices and creating impression of the voices (refer to Non-Patent Reference 1, for example). Note that, in this description, the voice expression which can convey speaker's situation or intention to listeners with additional meaning of literal meaning or as different meaning from the literal meaning is hereinafter called an "utterance mode". This utterance mode is determined based on information that includes data such as: an anatomical or physiological state such as tensing and relaxing of a phonatory organ; a mental state such as emotion or feeling; phenomenon, such as vocal expression, reflecting a mental state; attitude or a behavior pattern of a speaker, such as an utterance style or a way of speaking, and the like. Examples of the information for determining the utterance mode are types of emotion, such as "anger", "joy", and "sadness".

Figure 3A:
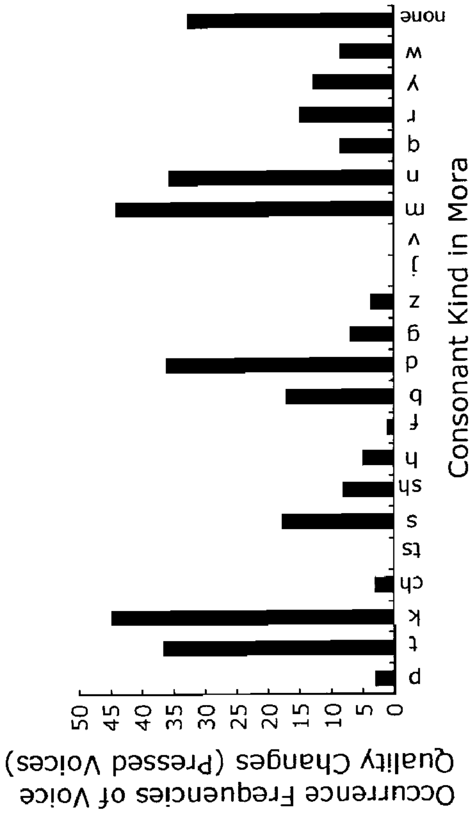
FIG. 3A is a graph showing an occurrence frequency distribution for each kind of consonants in moras uttered by a voice quality change "pressed voice" or a voice quality change "harsh voice" in voices with emotion expression of "strong anger" regarding a speaker 1.
Figure 3B:
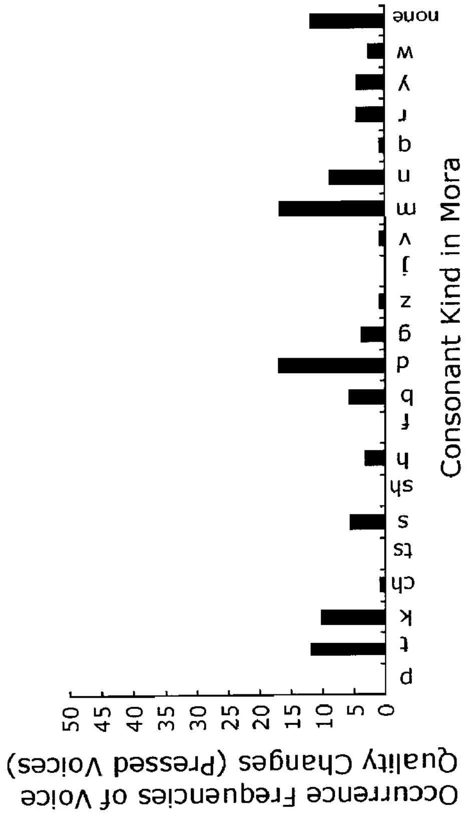
FIG. 3B is a graph showing an occurrence frequency distribution for each kind of consonants in moras uttered by a voice quality change "pressed voice" or a voice quality change "harsh voice" in voices with emotion expression of "strong anger" regarding a speaker 2.
Figure 3C:
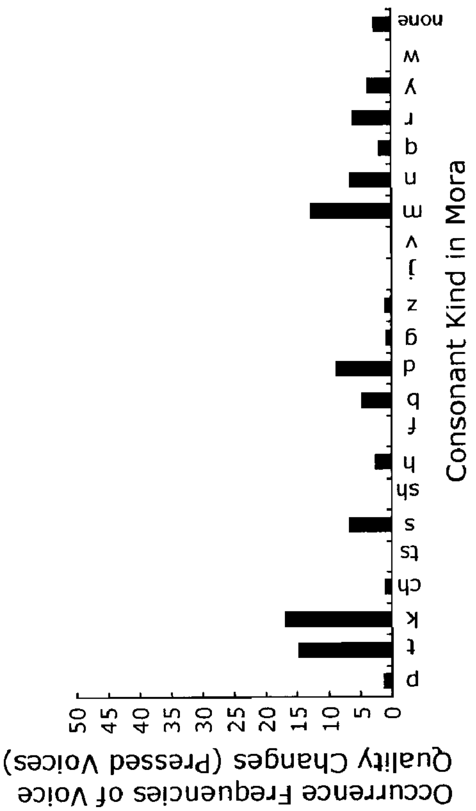
FIG. 3C is a graph showing an occurrence frequency distribution for each kind of consonants in moras uttered by a voice quality change "pressed voice" or a voice quality change "harsh voice" in voices with emotion expression of "weak anger" regarding the speaker 1.
Figure 3D:
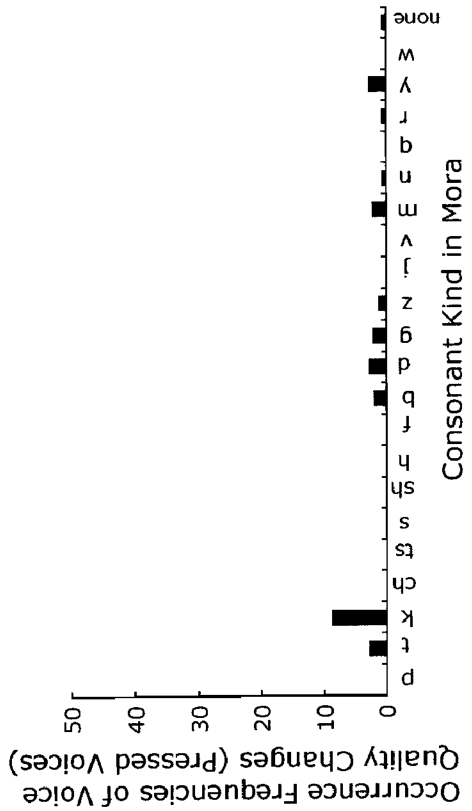
FIG. 3D is a graph showing an occurrence frequency distribution for each kind of consonants in moras uttered by a voice quality change "pressed voice" or a voice quality change "harsh voice" in voices with emotion expression of "weak anger" regarding the speaker 2.

Here, prior to the following description of the present invention, research has previously performed for fifty utterance examples which have been uttered based on the same text, so that voices without expression and voices with emotion among the samples have been examined. FIG. 3A is a graph showing an occurrence frequency distribution for each kind of consonants in moras uttered by voice quality change "pressed voice" (or voice quality change "harsh voice" included in the voice quality change "pressed voice") in voices with emotion expression of "strong anger" regarding a speaker 1. FIG. 3B is a graph showing an occurrence frequency distribution for each kind of consonants in moras uttered by voice quality change "pressed voice" or voice quality change "harsh voice" in voices with emotion expression of "strong anger" regarding a speaker 2. FIGS. 3C and 3D are graphs showing occurrence frequency distributions for each kind of consonants in moras uttered by voice quality change "pressed voice" or voice quality change "harsh voice" in voices with emotion expression of "weak anger" regarding the speakers of FIGS. 3A and 3B, respectively. The occurrence frequency of voice quality change is biased depending on kinds of consonants. For example, a mora with consonant "t", "k", "d", "m", or "n", or a mora without any consonant has a high occurrence frequency of voice quality change. On the other hand, a mora with consonant "p", "ch", "ts", or "f", has a low occurrence frequency. Comparing these graphs of FIGS. 3A and 3B regarding the two different speakers, it is understood that the biased tendency of occurrence frequencies of voice quality changes depending on consonants are common between these graphs. The common bias tendency among the speakers shows a possibility of ability of estimating, based on information such as kinds of phonemes, a portion where voice quality change will occur in a sequence of phonemes of a text to be read aloud.

Figure 4:
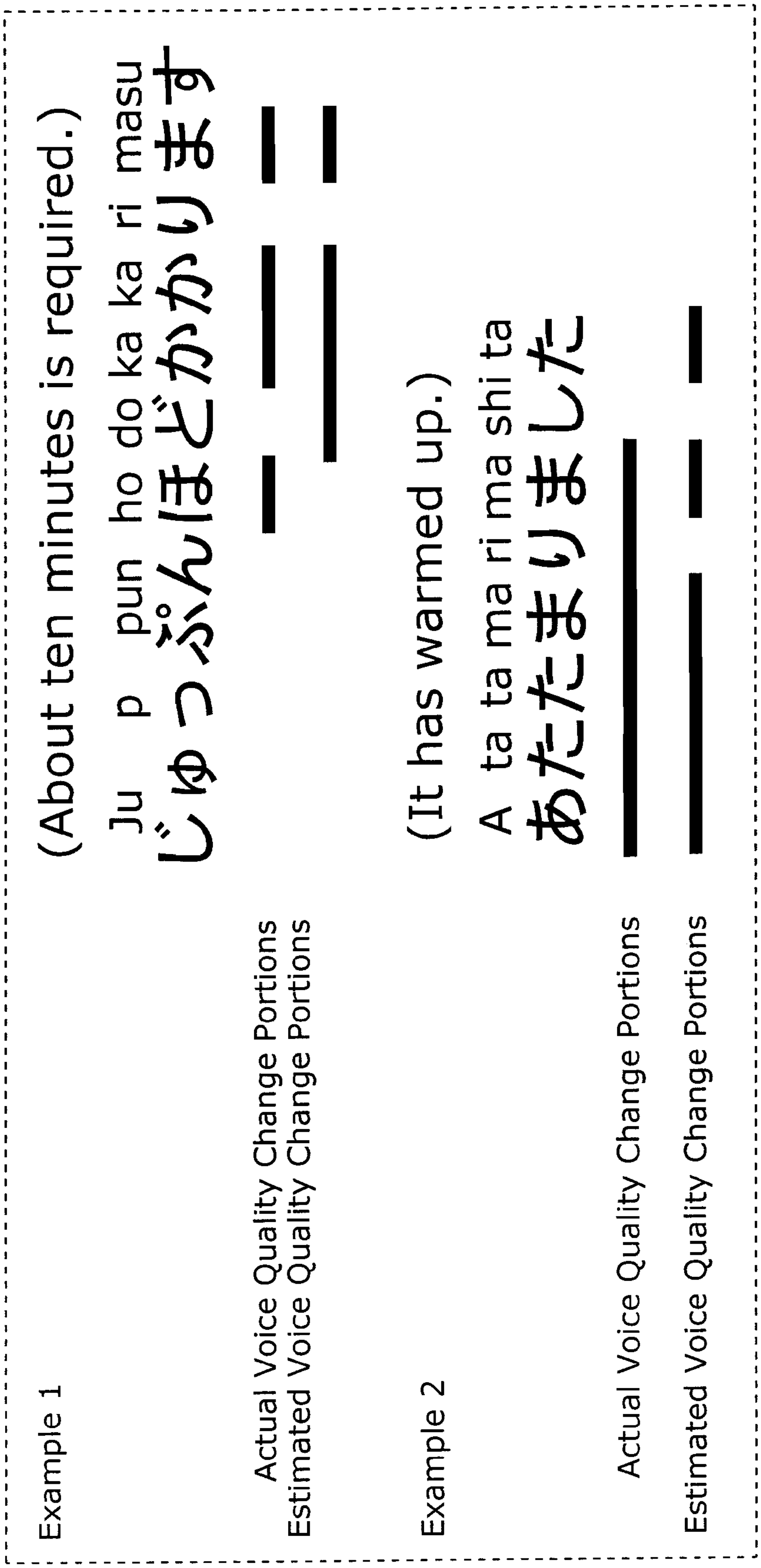
FIG. 4 is a diagram showing comparison in temporal positions between occurrence positions of voice quality changes observed in actual voices and estimated occurrence positions of voice quality changes.

FIG. 4 is a diagram showing a result of such estimation by which moras uttered with voice quality change "pressed voice" or "harsh voice" are estimated in an utterance example 1 "Juppun hodo kakarimasu ('About ten minutes is required' in Japanese)" and an example 2 "Atatamarimashita ('It has been warmed up' in Japanese), according to estimate equations generated from the same data as FIGS. 3A to 3D using Quantification Method II that is one of statistical learning techniques. The underling for kanas (Japanese alphabets) shows (i) moras which are uttered with the voice quality change in an actually uttered speech, and also (ii) moras which are predicted to have the voice quality change using the estimate equations. The estimation result of FIG. 4 is obtained in the case where (i) an estimation equation is generated for each of moras in result learning data using the Quantification Method II so that (a) information indicating a kind of a phoneme, such as a kind of a consonant and a kind of a vowel in the mora or a category of the phoneme, and (b) information indicating a position of the mora in an accent phrase are set to independent variables of the estimation equation, and that a binary value representing whether or not the voice quality change “pressed voice” or “harsh voice” actually occurs is set to a dependent variable of the estimation equation, and (ii) a threshold value is determined so that an occurrence portion of an actually uttered text matches the estimated occurrence portion of the learning data with an accuracy rate of about 75%. The estimation result proves that it is possible to estimate, with high accuracy, occurrence portions of voice quality changes using the information regarding kinds of phonemes, accents, and the like.

Figure 5:
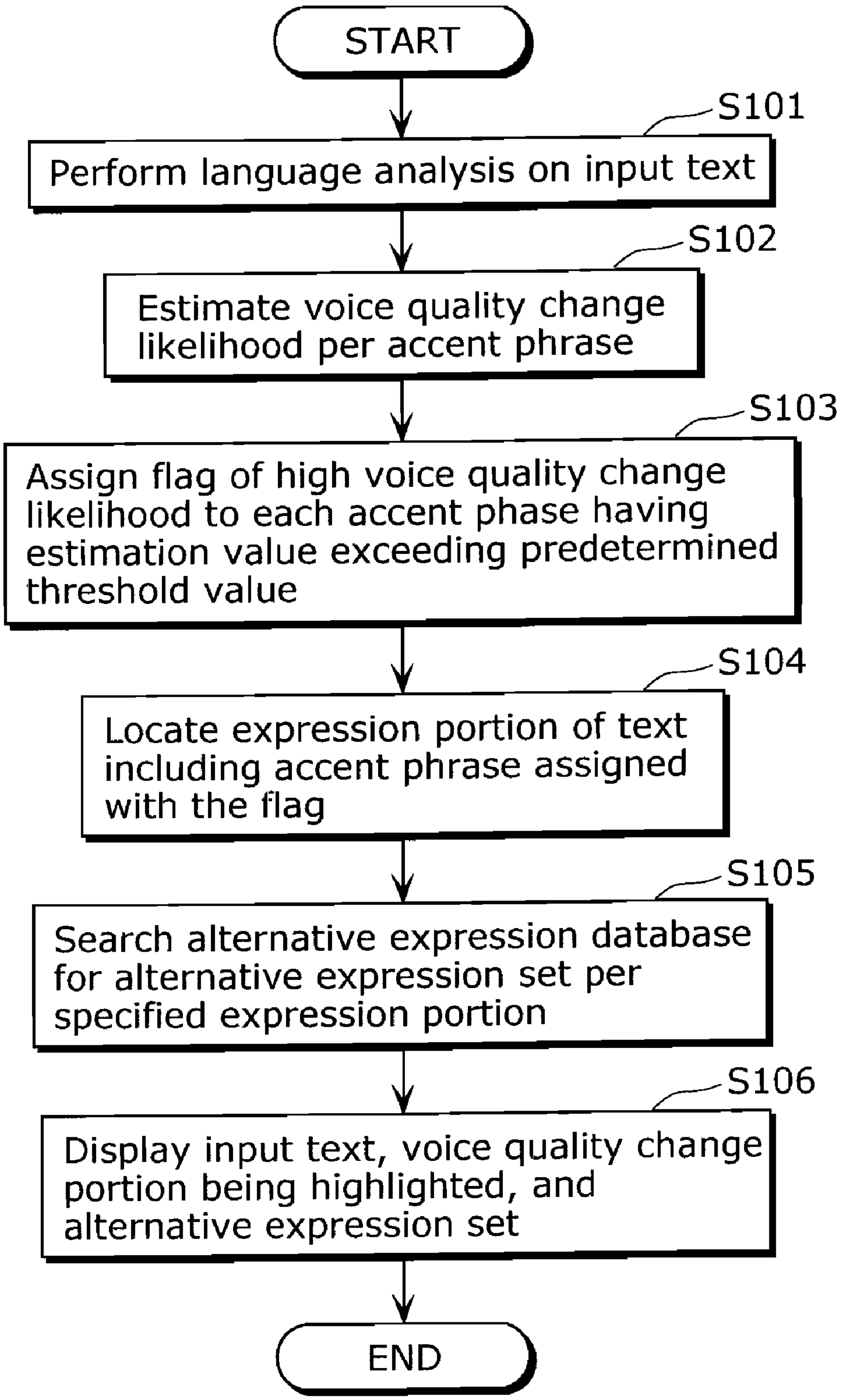
FIG. 5 is a flowchart showing processing performed by the text edit apparatus according to the first embodiment of the present invention.

Next, description is given for processing performed by the text edit apparatus having the above-described structure with reference to FIG. 5. FIG. 5 is a flowchart showing the processing performed by the text edit apparatus according to the first embodiment of the present invention.

Firstly, the language analysis unit 102 performs a series of language analysis that includes morpheme analysis, syntax analysis, pronunciation generation, and accent phrase processing on a text received from the text input unit 101, and then outputs a language analysis result that includes a sequence of phonemes which is pronunciation information, information of boundary between accent phrases, accent position information, information of part of speech, and syntax information (S101).

Next, the voice quality change estimation unit 103 (i) calculates, for each of accent phrases in the input text, estimation values of respective phonemes in the target accent phrase, by using the language analysis result as an explaining variable of an estimation equation which is for phoneme-based voice quality change and is included in the voice quality change estimation model 104, and (ii) eventually outputs, as an estimation value of voice quality change occurrence likelihood (hereinafter, referred to also as a “voice-quality change estimation value” or simply an “estimation value”) of the target accent phrase, an estimation value which is the largest among the estimation values of the phonemes in the target accent phrase (S102). It is assumed in the first embodiment that the voice quality change to be judged is “pressed voice”. The estimation equation is generated using the Quantification Method II for each of phonemes for which voice quality change is judged. In the estimation equation, a binary value representing whether or not voice quality change “pressed voice” voice quality change will occur is set to a dependent variable, and consonants and vowels in the phoneme and a position of the mora in the accent phrase are set to independent variables. The threshold value for judging whether or not the voice quality change “pressed voice” will occur is assumed to be set for the estimation equation. If a value of the estimation equation is equal to the threshold value, an occurrence portion of an actually uttered text matches the estimated occurrence portion of the learning data with an accuracy rate of about 75%.

Figure 6:
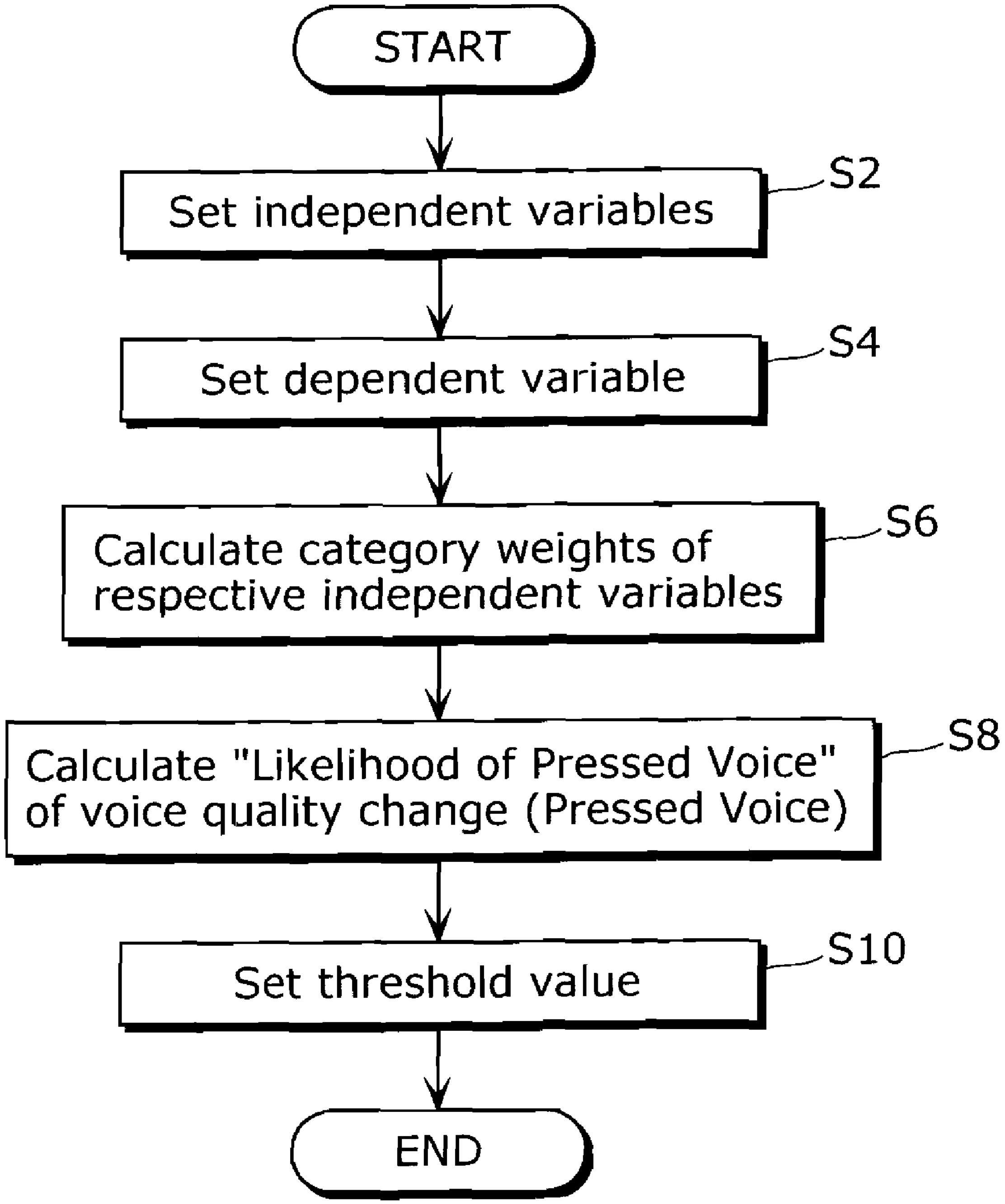
FIG. 6 is a flowchart for explaining a method of generating an estimation equation and a judgment threshold value.

FIG. 6 is a flowchart for explaining the method of generating the estimation equation and the judgment threshold value. Here, it is assumed that “pressed voice” is selected as voice quality change.

First, a kind of a consonant, a kind of a vowel, and a position of a mora in a normal ascending order within an accent phrase are set to independent variables in an estimation equation, for each of moras in learning voice data (S2). In addition, a binary value representing whether or not the voice quality change “pressed voice” actually occurs in the learning voice data is set to a dependent variable in the estimation equation, for each of the moras (S4). Next, a weight of each consonant kind, a weight of each vowel kind, and a weight of each mora position in a normal ascending order within an accent phrase are calculated as category weights for the respective independent variables, according to the Quantification Method II (S6) Further, “likelihood of pressed voice” that represents likelihood of voice quality change “pressed voice” is calculated, by applying the category weights of the respective independent variables to attribute conditions of each mora in the learning voice data (S8).

Figure 7:
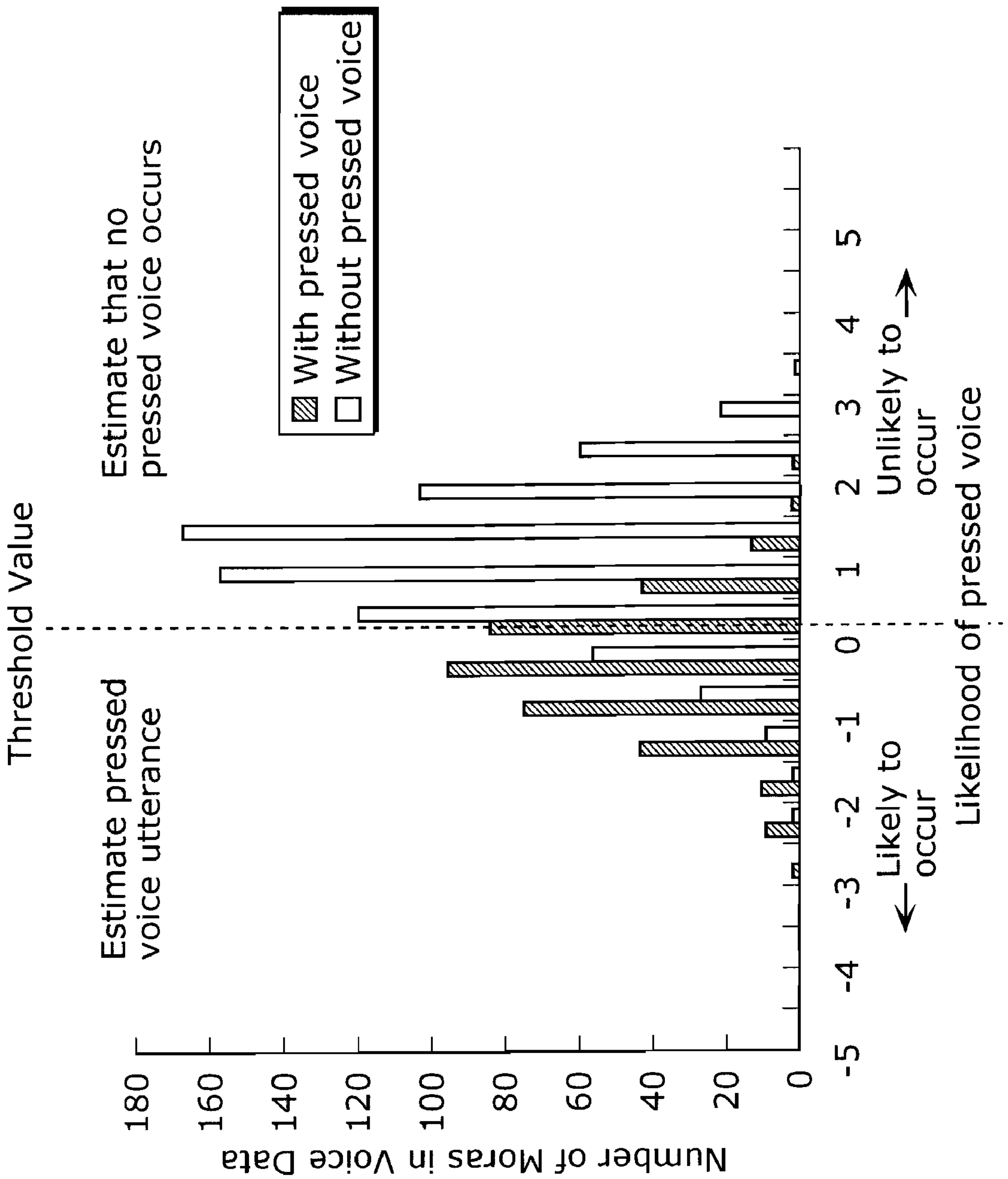
FIG. 7 is a graph showing "likelihood of pressed voice" in a horizontal axis and "number of moras in voice data" in a vertical axis.

FIG. 7 is a graph where the “likelihood of pressed voice” is represented by a horizontal axis and “Number of Moras in Voice Data” is represented by a vertical axis. The “likelihood of pressed voice” ranges from “−5” to “5” in numeral values. With the smaller value, the higher likelihood is estimated for an actually uttered speech. The hatched bars in the graph represent occurrence frequencies of moras which are actually uttered with the voice quality change “pressed voice”. The non-hatched bars in the graph represent occurrence frequencies of moras which are not actually uttered with the voice quality change “pressed voice”.

In this graph, values of the “likelihood of pressed voice” are compared between (i) a group of moras which are actually uttered with the voice quality change “pressed voice” and (ii) a group of moras which are actually uttered without the voice quality change “pressed voice”. Thereby, based on the “likelihood of pressed voice”, a threshold value is set so that accuracy rates of the both groups exceed 75% (S10).

As described above, it is possible to calculate the estimate equation and the judgment threshold value corresponding to the tone of “pressed voice” which is characteristically occurred in voices with “anger”.

Here, it is assumed that such an estimate equation and a judgment threshold value are set also for each of voice quality changes corresponding to other emotions, such as “joy” and “sadness”.

Next, the voice quality change portion judgment unit 105 (i) compares (a) a voice-quality change estimation value of each accent phrase, which is outputted from the voice quality change estimation unit 103, to (b) a threshold value in the voice quality change estimation model 104, which corresponds to the estimation equation used by the voice quality change estimation unit 103, and (ii) thereby assigns a flag representing a high voice quality change likelihood, to an accent phrase whose estimation value exceeds the threshold value (S103).

Subsequently, as an expression portion with high likelihood of voice quality change, the voice quality change portion judgment unit 105 locates a part of a character sequence which is made of the shortest morpheme sequence including the accent phrase assigned at Step S103 with the flag of the high voice quality change likelihood (S104).

Next, for each of such expression portions located at Step S104, the alternative expression search unit 106 searches the alternative expression database 107 for an alternative expression set which will be able to be used as alternative expressions (S105).

FIG. 8 is a table showing an example of the alternative expression sets stored in the alternative expression database. Each of sets 301 to 303 in FIG. 8 is a set of language expression character sequences which are alternative expressions having the same meaning. Using, as a search key, a character sequence in an input text corresponding to the expression portion located at Step S104, the alternative expression search unit 106 checks whether or not the search key (character sequence) matches any character sequence in the alternative expression sets, and then outputs an alternative expression set including the matching character sequence.

Next, the display unit 108 presents a user a portion of the text which is located at Step S104 as where voice quality change is likely to occur (in other words, the voice quality change likelihood is high), by displaying the portion highlighted, and also presents the user the alternative expression set obtained at Step S105 (S106).

Figure 9:
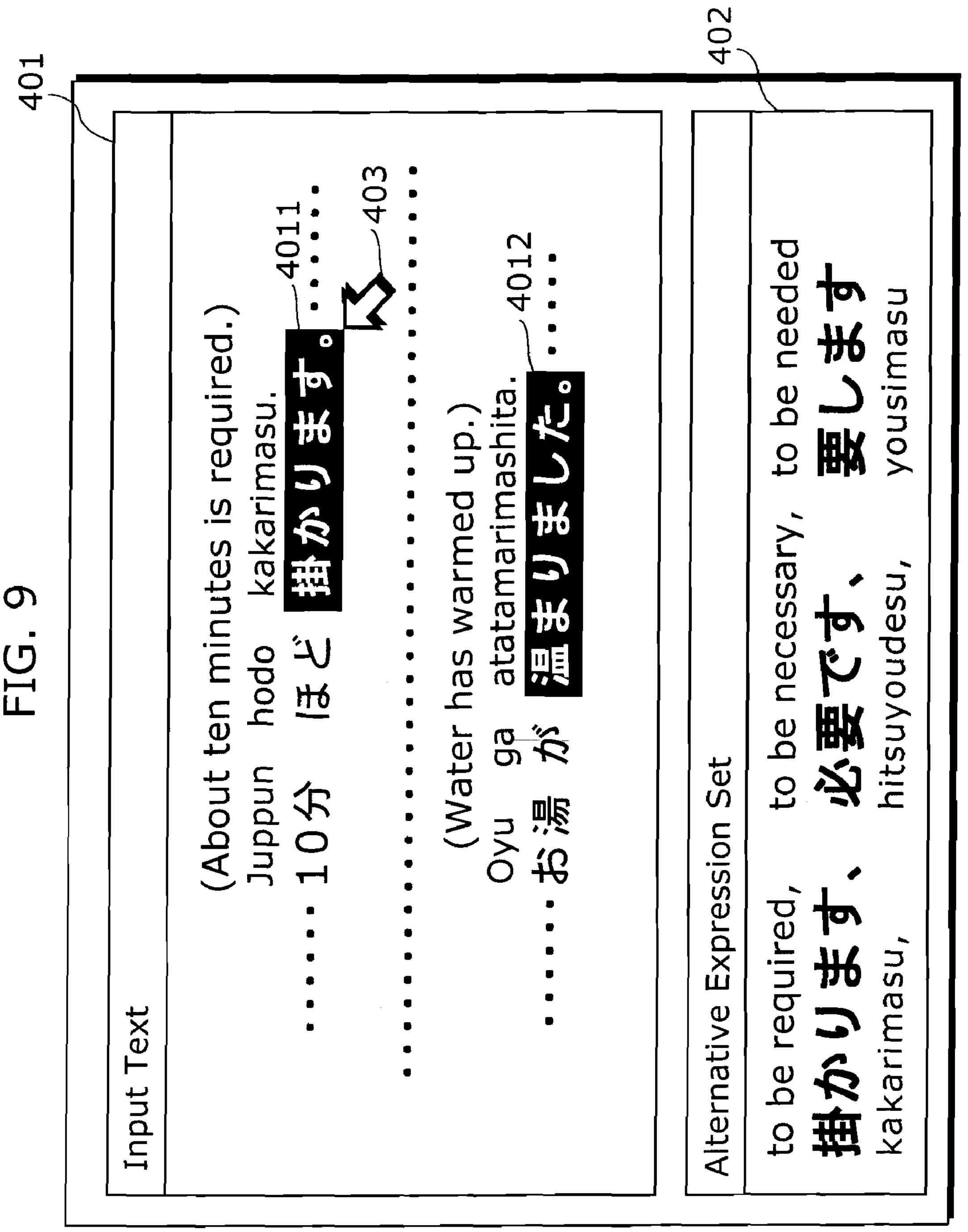
FIG. 9 is a diagram showing a screen display example of the text edit apparatus according to the first embodiment of the present invention.

FIG. 9 is a diagram showing an example of a screen detail which the display unit 108 displays on the display 203 of FIG. 2 at Step S106. A display area 401 displays (i) the input text and (ii) the portions 4011 and 4012 as the portions where voice quality change are likely to occur, as being highlighted, which are displayed at Step S104 by the display unit 108. A display area 402 displays the alternative expression set which is obtained at Step S105 by the alternative expression search unit 106, for the portion where voice quality change is likely to occur. When in the area 401 the user points the highlighted portion 4011 or 4012 by a mouse pointer 403 and clicks a button of the mouse 204, the alternative expression set corresponding to the clicked portion is displayed in the display area 402. In the example of FIG. 9, the portion 4011 "kakarimasu (is required)" is highlighted, and when the portion 4011 is clicked, a set of alternative expressions "kakarimasu (to be required)", "hitsuyoudesu (to be necessary)", and "youshimasu (to be needed)" is displayed in the display area 402. The alternative expression set is a result of the processing in which the alternative expression search unit 106 searches the alternative expression database for an alternative expression set using, as a key, the language expression character sequence "kakarimasu (is required)" in the text, and then the alternative expression set 302 in FIG. 8 matches the key and therefore is outputted to the display unit 108 as alternative expressions to be used.

With the above structure, the voice quality change estimation unit 103 calculates, for each accent phrase in the language analysis result of the input text, a voice-quality change estimation value using an estimation equation in the voice quality change estimation model 104. Then, the voice quality change portion judgment unit 105 locates, as a portion where voice quality change is likely to occur, a portion which is one accent phrase in the text and whose estimation value exceeds a predetermined threshold value. Thereby, the first embodiment can provide the text edit apparatus which has specific advantages of predicting or locating, from the text to be read aloud, a portion where voice quality change will occur when the text is actually read aloud, and then presenting the portion in a form by which the user can confirm it.

Furthermore, with the above structure, based on the judgment result regarding a portion where voice quality change will occur, the alternative expression search unit 106 searches for alternative expressions having the same meaning as an expression at the portion of the text. Thereby, the first embodiment can provide the text edit apparatus which has specific advantages of presenting the alternative expressions for the portion where voice quality change is likely to occur when the text is actually read aloud.

Note that it has been described in the first embodiment that the voice quality change estimation model 104 is generated to judge the voice quality change "pressed voice", but the voice quality change estimation model 104 may be generated to judge any other voice quality changes such as "falsetto".

Figure 10A:
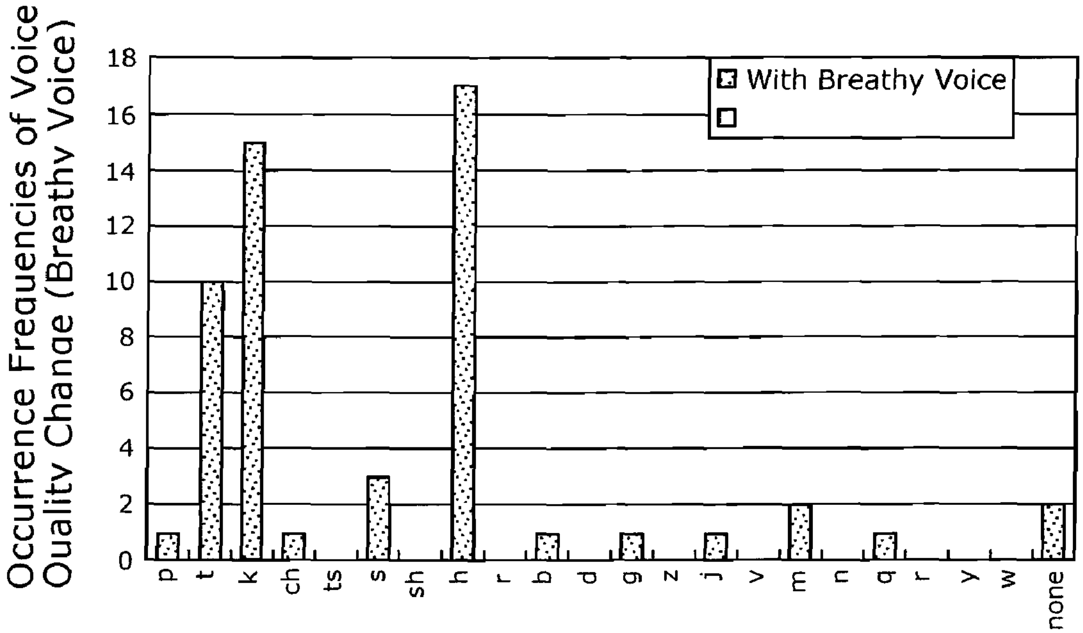
FIG. 10A is a graph showing occurrence frequency distribution for each kind of consonants in moras uttered by voice quality change "breathy voice" in voices with emotion expression "cheerful" regarding a speaker 1.
Figure 10B:
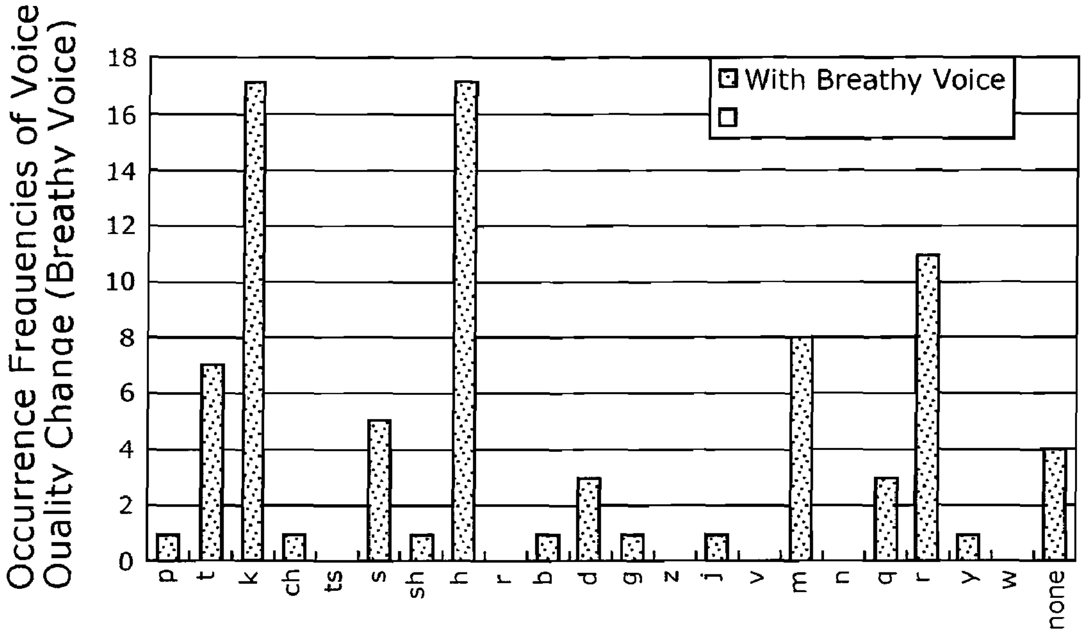
FIG. 10B is a graph showing occurrence frequency distribution for each kind of consonants in moras uttered by voice quality change "breathy voice" in voices with emotion expression "cheerful" regarding a speaker 2.

For example, FIG. 10A is a graph showing occurrence frequency distribution for each kind of consonants in moras uttered by voice quality change "breathy voice" in voices with emotion expression "cheerful" regarding a speaker 1, and FIG. 10B is a graph showing occurrence frequency distribution for each kind of consonants in moras uttered by voice quality change "breathy voice" in voices with emotion expression "cheerful" regarding a speaker 2. Also for the voice quality change "breathy voice", by comparing these graphs regarding the two different speakers, it is understood that the biased tendency of occurrence frequencies of the voice quality change are common between these graphs. In more detail, for example, a mora with consonant "t", "k", or "h" has a high occurrence frequency of the voice quality change "breathy voice". On the other hand, a mora with consonant "ts", "f", "z", "v", "n", or "w" has a low occurrence frequency. Therefore, it is possible to generate a voice quality change estimation model for judging the voice quality change "breathy voice".

Note also that it has been described in the first embodiment that the voice quality change estimation unit 103 estimates the voice quality change likelihood for each accent phrase, but the voice quality change estimation unit 103 may perform the estimation per any other unit which is obtained by dividing the text, such as a mora, a morpheme, a clause, or a sentence.

Note also that it has been described in the first embodiment that the estimation equation of the voice quality change estimation model 104 is generated using the Quantification Method II by setting a binary value representing whether or not voice quality change actually occurs to a dependent variable and setting a consonant, a vowel, a mora position in an accent phrase to independent variables, and that the threshold value of the voice quality change estimation model 104 is determined for the estimation equation so that an occurrence portion of an actually uttered text matches the estimated occurrence portion of the learning data with an accuracy rate of about 75%. However, the voice quality change estimation model 104 may be other estimation equation and judgment threshold value which are generated based on any other different statistical learning models. For example, a binary value judgment learning model generated by a support vector machine (SVM) technique may be used for the judgment of voice quality change, providing the same advantages as the first embodiment. The support vector machine is a known art. Therefore, description in the case of the support vector machine is not given herein.

Note also that it has been described in the first embodiment that the display unit 108 highlights a portion of the text in order to present the user where voice quality change is likely to occur. However, the display unit 108 may display the portion using any other means by which the user can visually distinguish the portion from others. For example, the display unit 108 may display the portion by a font, color, or a size different from other portions.

Note also that it has been described in the first embodiment that the display unit 108 displays the alternative expressions obtained by the alternative expression search unit 108 in an order of storing in the alternative expression database, or at random. However, the display unit 108 may sort the output of the alternative expression search unit 106 (the alternative expressions) according to a certain criterion, in order to display them.

Figure 11:
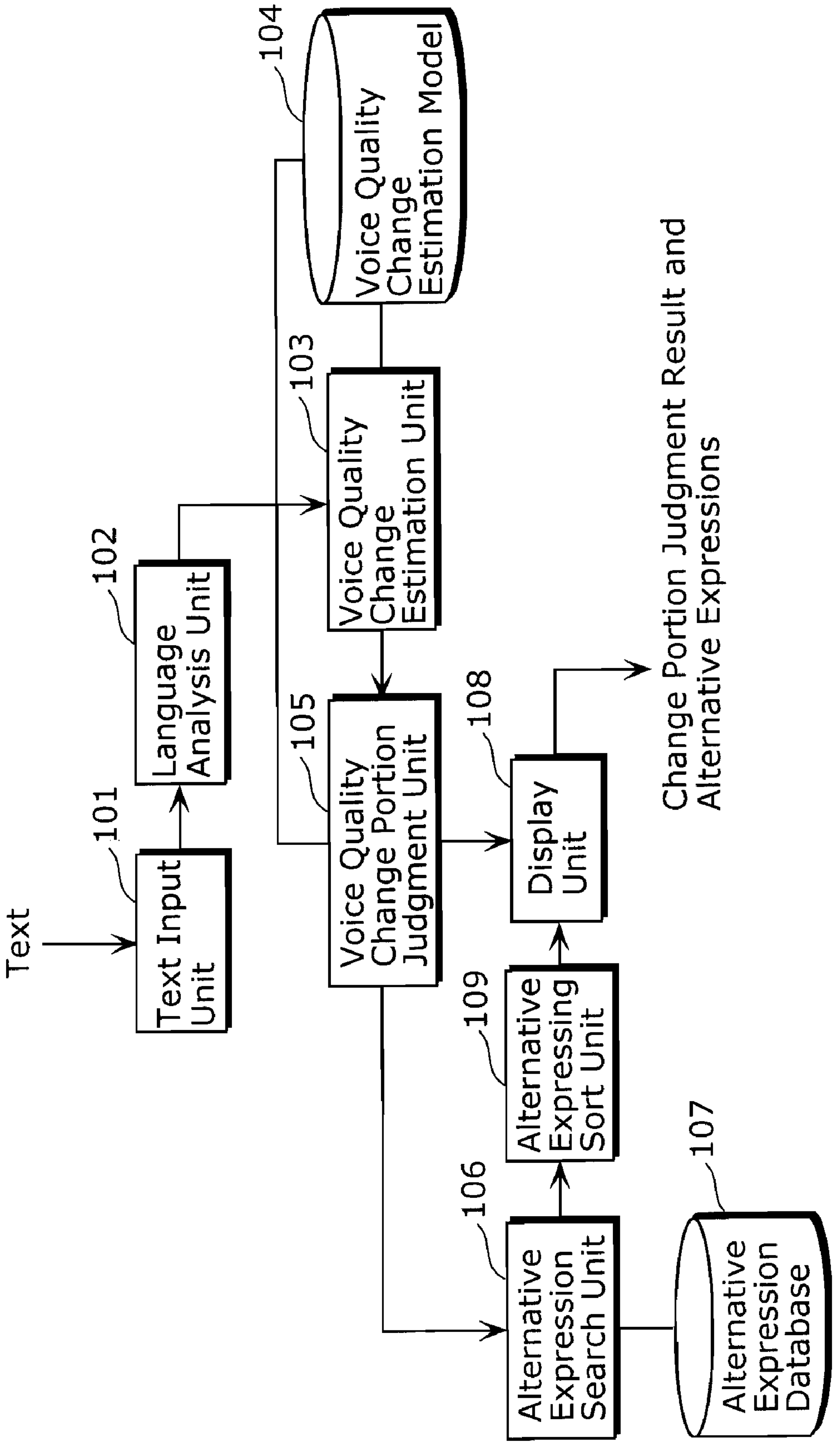
FIG. 11 is a functional block diagram of the text edit apparatus according to the first embodiment of the present invention.
Figure 12:
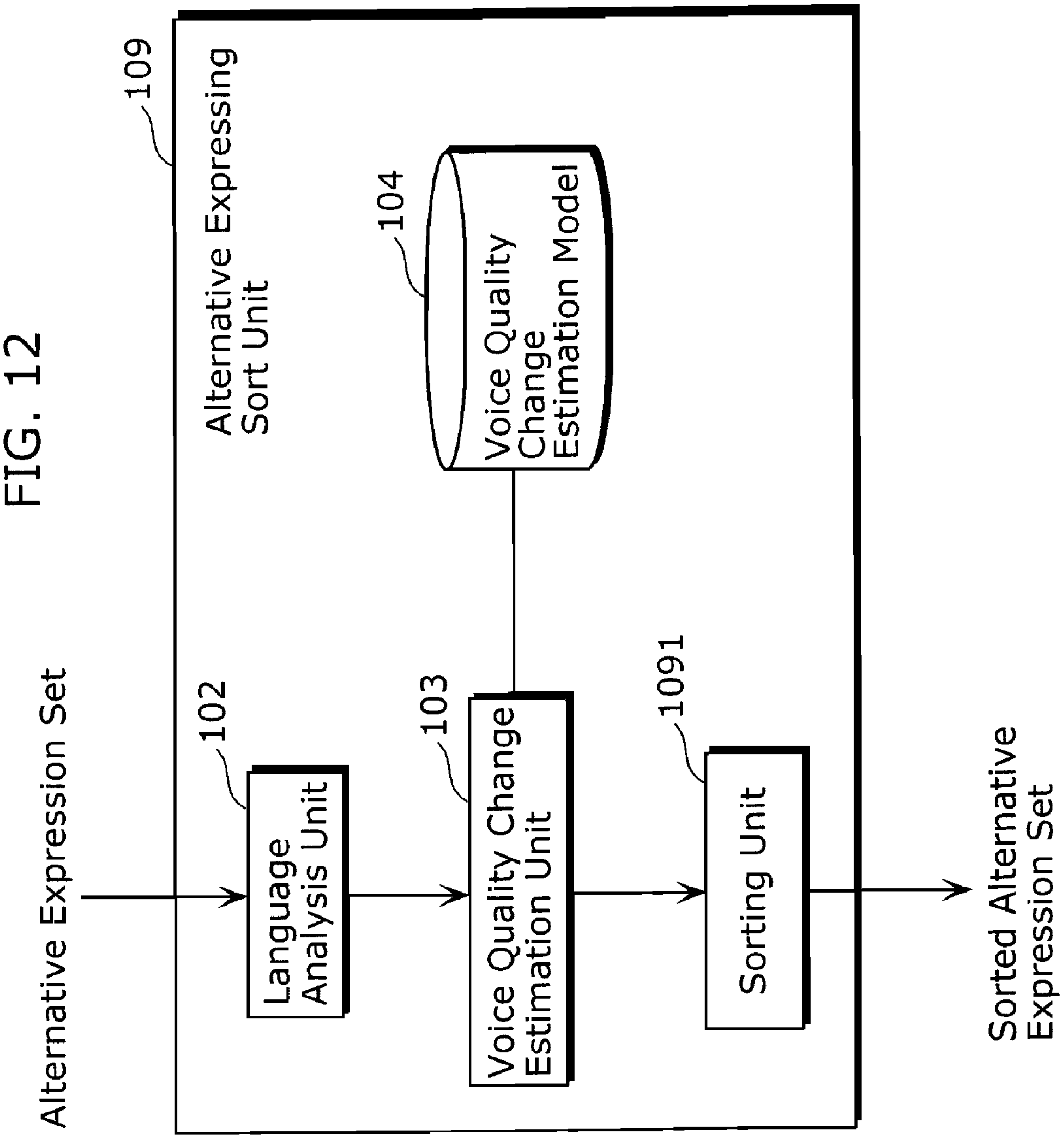
FIG. 12 is a functional block diagram of an interior of an alternative expression sort unit of the text edit apparatus according to the first embodiment of the present invention.

FIG. 11 is a functional block diagram of a text edit apparatus in which alternative expressions are sorted as described above. A structure of the text edit apparatus of FIG. 11 differs from the structure of the text edit apparatus of FIG. 1 in that an alternative expression sort unit 109 is added between the alternative expression search unit 106 and the display unit 108. The alternative expression sort unit 109 sorts an output of the alternative expression search unit 106. In FIG. 11, the processing units except the alternative expression sort unit 109 are identical to the respective processing units in the text edit apparatus of FIG. 1 and have the same functions and operations as the identical processing units of FIG. 1. Therefore, the reference numerals in FIG. 1 are assigned to the identical processing units in FIG. 11, respectively. FIG. 12 is a functional block diagram showing an inside structure of the alternative expression sort unit 109. The alternative expression sort unit 109 includes a language analysis unit 102, a voice quality change estimation unit 103, a voice quality change estimation model 104, and a sorting unit 1091. Also in FIG. 12, the reference numerals and names in FIGS. 1 and 11 are assigned to identical processing units in FIG. 12 which have the same functions and operations as the identical processing units of FIGS. 1 and 11.

In FIG. 12, the sorting unit 1091 compares respective estimation values, which are outputted from the voice quality change estimation unit 103, of a plurality of alternative expressions included an alternative expression set, and thereby sorts the alternative expressions in order of their estimation values with the largest as first.

Figure 13:
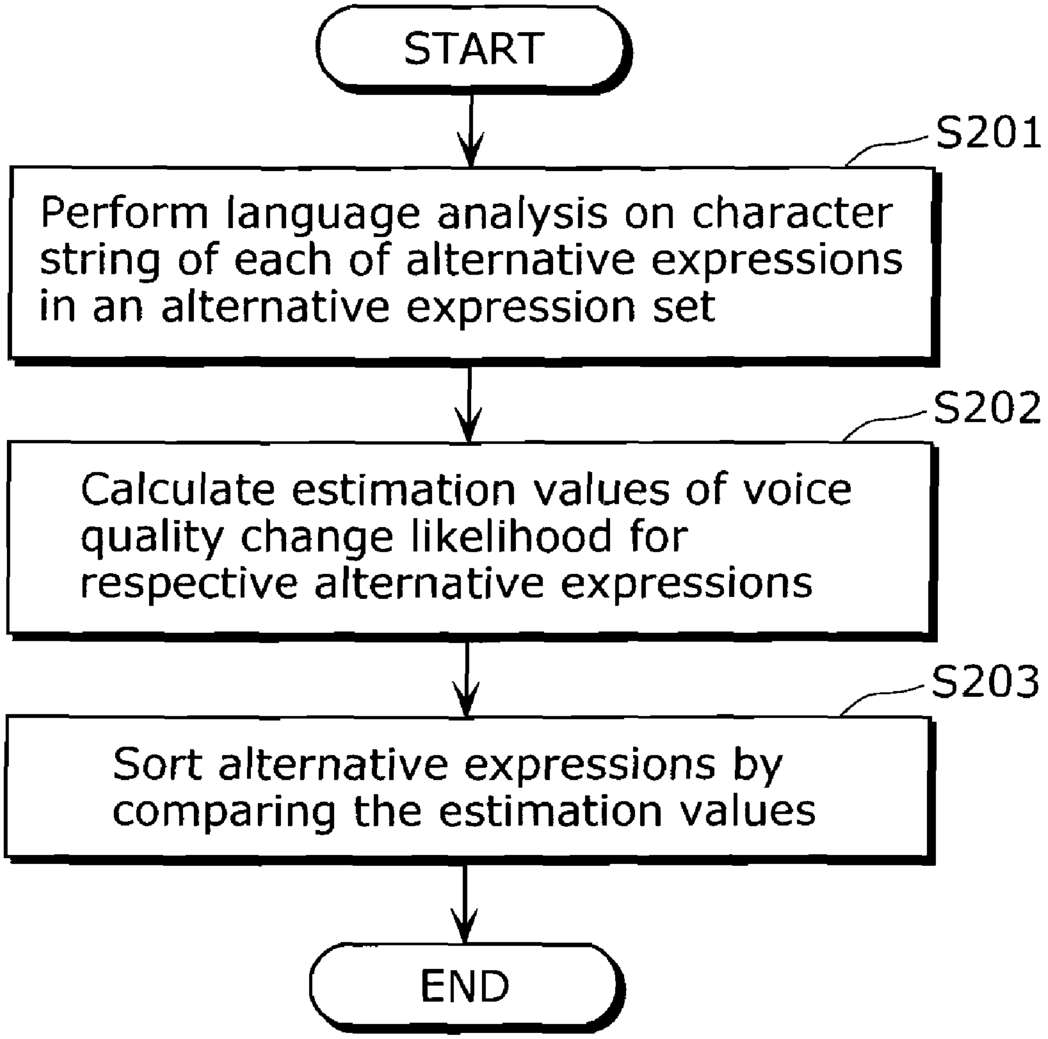
FIG. 13 is a flowchart showing processing performed by the interior of the alternative expression sort unit of the text edit apparatus according to the first embodiment of the present invention.

FIG. 13 is a flowchart of processing performed by the alternative expression sort unit 109. The language analysis unit 102 performs language analysis on each character sequence of the alternative expressions in the alternative expression set (S201). Next, using the estimation equation of the voice quality change estimation model 104, the voice quality change estimation unit 103 calculates a voice-quality change estimation value for each result of the language analysis (language analysis result), which is obtained at Step S201, of the alternative expressions (S202). Then, the sorting unit 1091 sorts the alternative expressions by comparing their estimation values calculated at Step S202 (S203).

Figure 14:
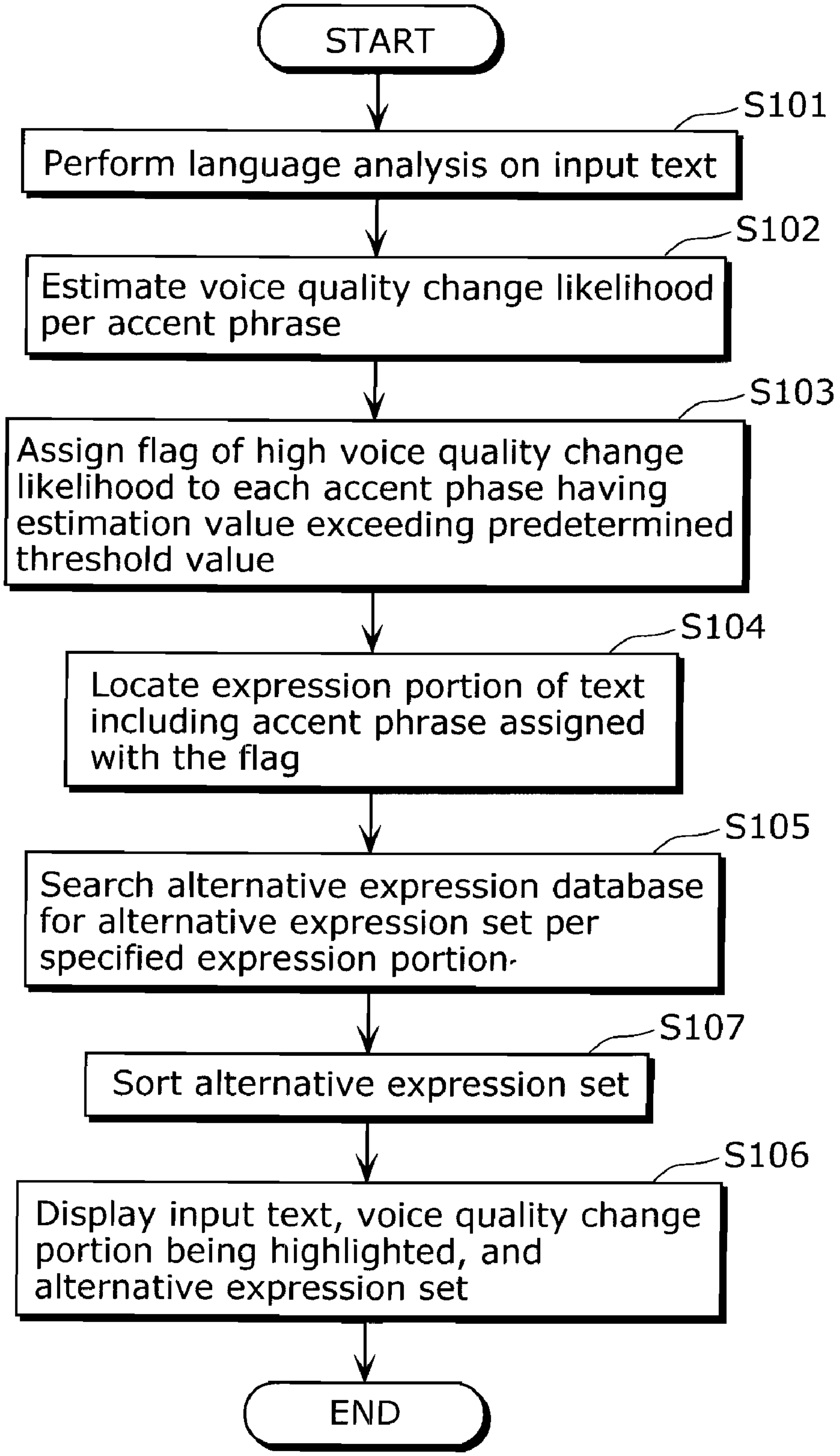
FIG. 14 is a flowchart showing processing performed by the text edit apparatus according to the first embodiment of the present invention.

FIG. 14 is a flowchart of whole processing performed by the text edit apparatus of FIG. 11. The flowchart of FIG. 14 differs from the flowchart of FIG. 5 in that a Step S107 for sorting the alternative expression set is added between Step S105 and Step S106. Detail of the Step S107 has been previously described with reference to FIG. 13. Other steps except Step S107 are identical to the respective steps of FIG. 5, so that the same step numerals are assigned to the identical steps.

With the above structure, in addition to the above-described advantages of the text edit apparatus of FIG. 1, the first embodiment has further advantages that, if there are a plurality of alternative expressions for the language expression at the portion where voice quality change is likely to occur, the alternative expression sort unit 109 can arrange and present the alternative expressions according to their voice quality change occurrence tendencies. Thereby, the first embodiment can provide the text edit apparatus which has further specific advantages that the user can revise a draft of the text by taking voice quality changes into account.

Second Embodiment

In the second embodiment according to the present invention, the description is given for a text edit apparatus which basically has the same structure as the text edit apparatus of the first embodiment, but which differs from the text edit apparatus of the first embodiment in that various kinds of voice quality changes can be estimated at the same time.

Figure 15:
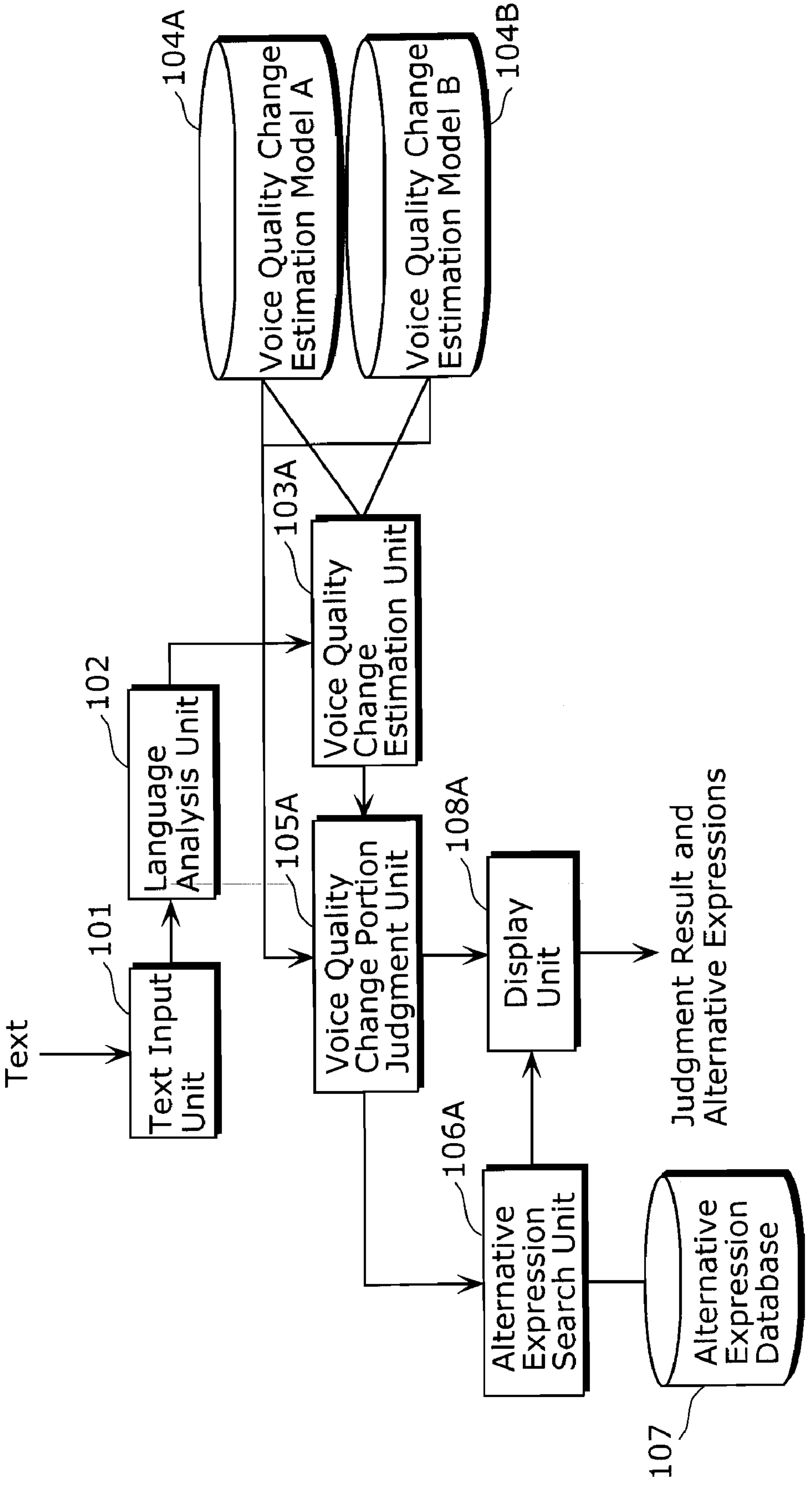
FIG. 15 is a functional block diagram of the text edit apparatus according to the second embodiment of the present invention.

FIG. 15 is a functional block diagram of the text edit apparatus according to the second embodiment of the present invention.

In FIG. 15, the text edit apparatus is an apparatus which edits an input text so that unintended impression is not given to listeners when a reader reads the text aloud. The text edit apparatus of FIG. 15 includes the text input unit 101, the language analysis unit 102, a voice quality change estimation unit 103A, a voice quality change estimation model 104A, a voice quality change estimation model 104B, a voice quality change portion judgment unit 105A, an alternative expression search unit 106A, the alternative expression database 107, and a display unit 108A.

The reference numerals in FIG. 1 are assigned to identical processing units in FIG. 15 which have the same functions as the processing units in the text edit apparatus of the first embodiment of FIG. 1. Description for the identical processing units having the same functions as the processing units in FIG. 1 are not repeated here. In FIG. 15, each of the voice quality change estimation model 104A and the voice quality change estimation model 104B is made of an estimation equation and a threshold value generated in the same mariner as described for the voice quality change estimation model 104. However, the voice quality change estimation model 104A and the voice quality change estimation model 104B are generated for respective different kinds of voice quality changes using the statistical learning. The voice quality change estimation unit 103A estimates voice quality change likelihood for each kind of voice quality change, per accent phrase of the language analysis result outputted from the language analysis unit 102, using the voice quality change estimation models 104A and 104B.

The voice quality change portion judgment unit 105A judges, for each kind of voice quality change, whether or not the voice quality change may occur, based on (i) a voice-quality change estimation value which is estimated by the voice quality change estimation unit 103 for each kind of voice quality change and (ii) a threshold value corresponding to an estimation equation used to calculate the estimation value. The alternative expression search unit 106A searches for alternative expressions for a language expression at the portion of the text which is judged for each kind of voice quality change by the voice quality change portion judgment unit 105A that the voice quality change may occur, and then outputs the found alternative expression set. The display unit 108 displays (i) an entire input text, (ii) a portion of the text which is judged by the voice quality change portion judgment unit 105A as where voice quality change may occur, for each kind of voice quality change, (iii) the alternative expression sets outputted from the alternative expression search unit 106A.

The above-explained text edit apparatus is implemented in the computer system as shown in FIG. 2. The computer system includes the body part 201, the keyboard 202, the display 203, and the input device (mouse) 204. The voice quality change estimation model 104A, the voice quality change estimation model 104B, and the alternative expression database 107 of FIG. 15 are stored in the CD-ROM 207 which is set into the body part 201, the hard disk (memory) 206 which is embedded in the body part 201, or the hard disk 205 which is in another system connected with the computer system via the line 208. Note that the display unit 108A in the text edit apparatus of FIG. 15 corresponds to the display 203 in the system of FIG. 2, and that the text input unit 101 of FIG. 15 corresponds to the display 203, the keyboard 202, and the input device 204 in the system of FIG. 2.

Figure 16:
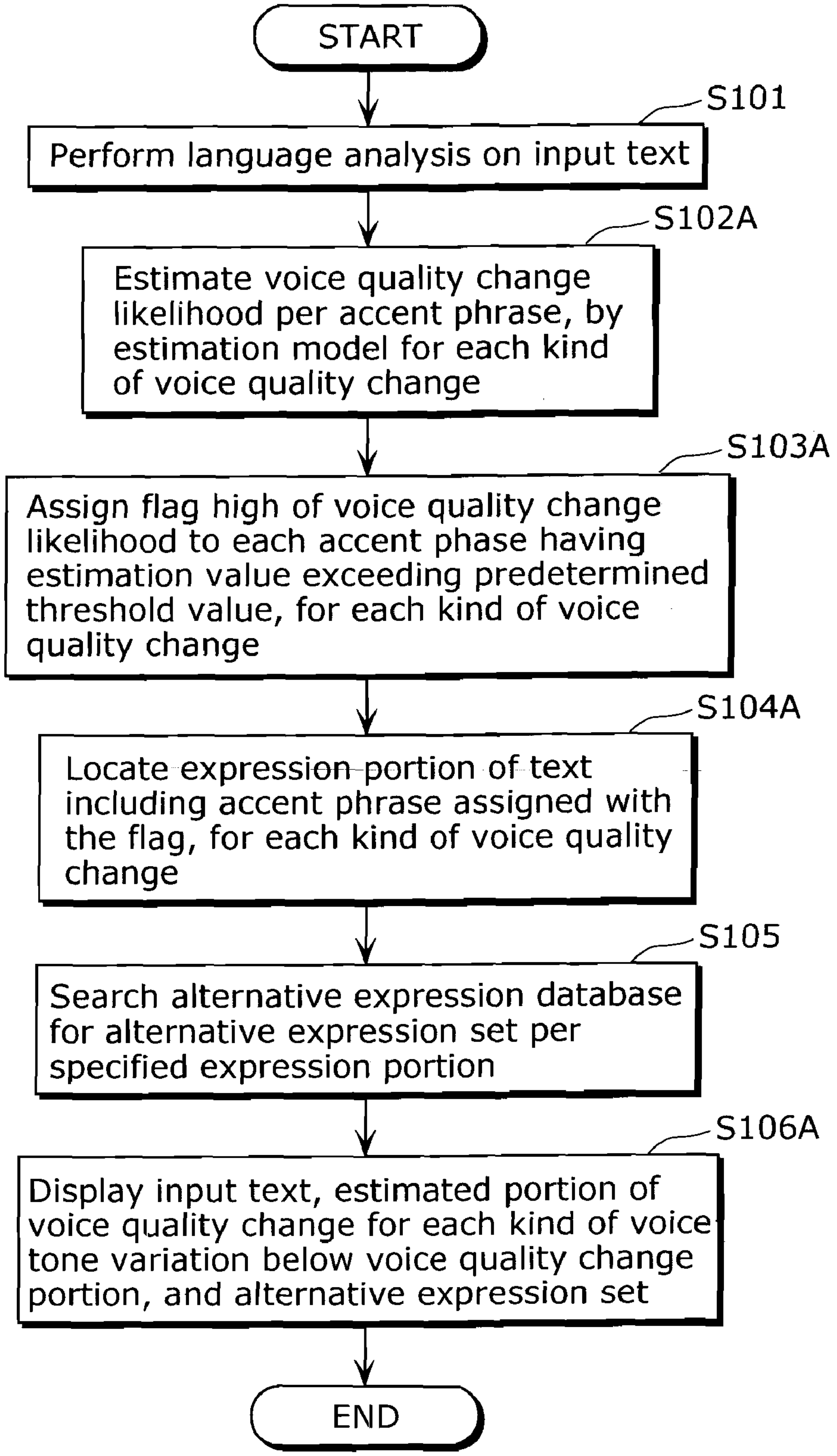
FIG. 16 is a flowchart showing processing performed by the text edit apparatus according to the second embodiment of the present invention.

Next, description is given for processing performed by the text edit apparatus having the above-described structure with reference to FIG. 16. FIG. 16 is a flowchart showing processing performed by the text edit apparatus according to the second embodiment of the present invention. The step numerals in FIG. 5 are assigned to steps in FIG. 16 which are identical to the steps of the text edit apparatus according to the first embodiment. The description of the identical steps is not repeated here.

After performing the language analysis (S101), the voice quality change estimation unit 103A (i) calculates, for each accent phrase, voice-quality change estimation values of respective phonemes in the target accent phrase, by using the language analysis result as an explaining variable of an estimation equation which is for phoneme-based voice quality change and is included in the voice quality change estimation models 104A and 104B, and (ii) eventually outputs, as a voice-quality change estimation value of the target accent phrase, an estimation value which is the largest among the estimation values of the phonemes in the target accent phrase (S102A). In the second embodiment, the voice quality change "pressed voice" is judged using the voice quality change estimation model 104A, and the voice quality change "breathy voice" is judged using the voice quality change estimation model 104B. The estimation equation is generated using the Quantification Method II for each of phonemes for which voice quality change is judged. In the estimation equation, a binary value representing whether or not the voice quality change "pressed voice" or "breathy voice" will occur is set to a dependent variable, and consonants and vowels in the phoneme and a position of the mora in the accent phrase are set to independent variables. The threshold value for judging whether or not the voice quality change "pressed voice" or "breathy voice" will occur is assumed to be set for the estimation equation. If a value of the estimation equation is equal to the threshold value, an occurrence portion of an actually uttered text matches the estimated occurrence portion of the learning data with an accuracy rate of about 75%.

Next, the voice quality change portion judgment unit 105A (i) compares (a) a voice-quality change estimation value for each kind of voice quality change per accent phrase, which is outputted from the voice quality change estimation unit 103A, to (b) a threshold value in the voice quality change estimation model 104A or 104B, which corresponds to the estimation equation used by the voice quality change estimation unit 103A, and (ii) thereby assigns a flag representing high voice quality change likelihood, to an accent phrase whose estimation value exceeds the threshold value (S103A).

Subsequently, as an expression portion with high likelihood of voice quality change, the voice quality change portion judgment unit 105A locates, for each kind of voice quality change, a part of a character sequence which is made of the shortest morpheme sequence including the accent phrase assigned at Step S103A with the flag of the high voice quality change likelihood (S104A).

Next, for each of such expression portions located at Step S104A, the alternative expression search unit 106A searches the alternative expression database 107 for an alternative expression set (S105).

Next, for each kind of voice quality change, the display unit 108A displays a landscape rectangular region having a length identical to the length of one line of an input text display, under each line of the input text display. Here, the display unit 108A uses a different color for displaying a rectangular region which is included in the landscape rectangular region and corresponds to horizontal position and length of a range of the character sequence at the portion that is located at Step S104A as the portion of the text where voice quality change is likely to occur, so that the color allows to distinguish the portion from other portions where the voice quality change is unlikely to occur. Thereby, for each kind of voice quality change, the display unit 108A presents the user the portion where the voice quality change is likely to occur. At the same time, the display unit 108A presents the user the alternative expression sets obtained at Step S105 (S106A).

Figure 17:
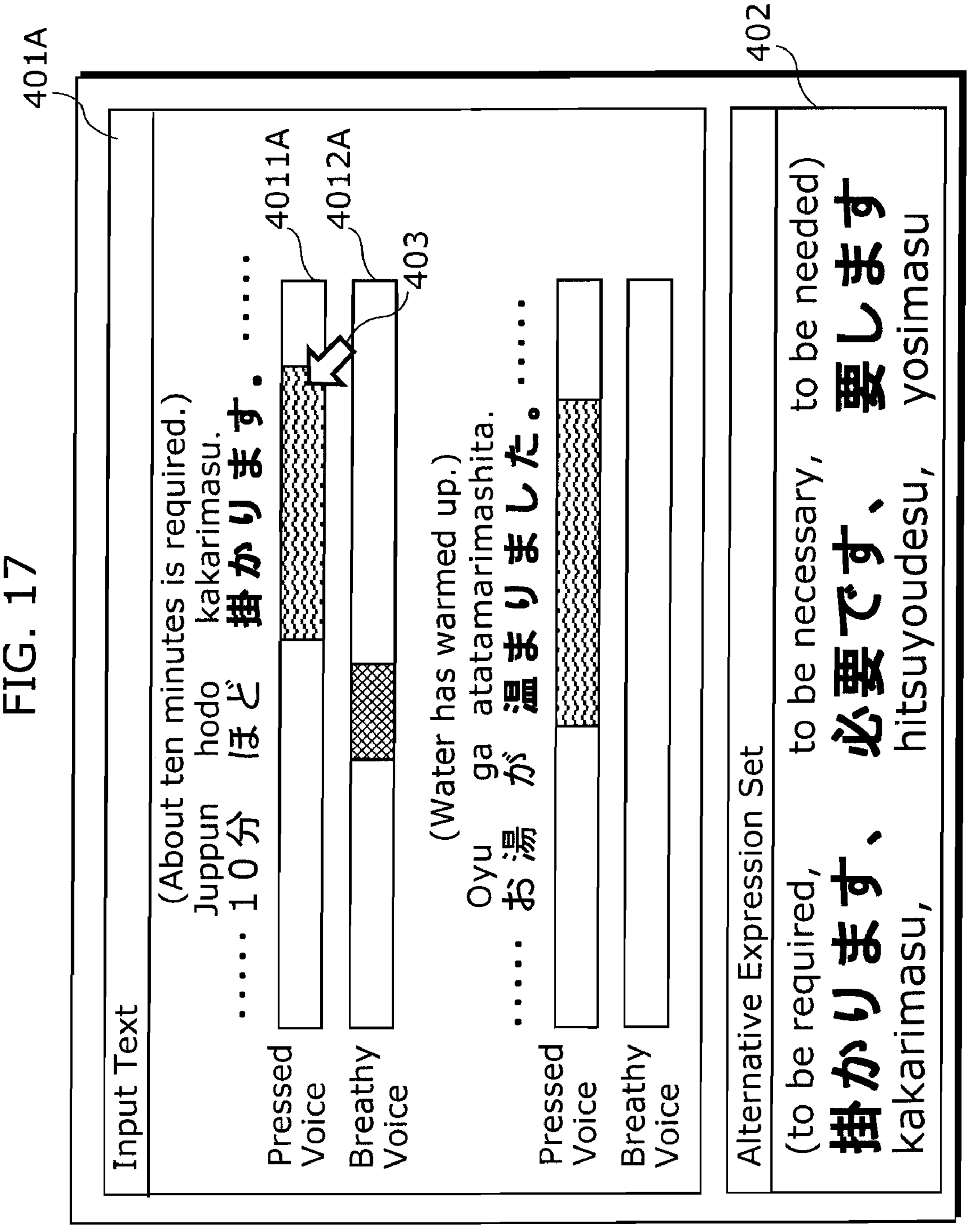
FIG. 17 is a diagram showing a screen display example of the text edit apparatus according to the second embodiment of the present invention.

FIG. 17 is a diagram showing an example of a screen detail which the display unit 108A displays on the display 203 of FIG. 2 at Step S106A. A display area 401A displays rectangular regions 4011A and 4012A in each of which a region corresponding to a portion where each kind of voice quality change is likely to occur in the text is displayed in a different color, which are displayed at Step S104A by the display unit 108A. The display area 402 displays one of the alternative expression sets which are obtained at Step S105 by the alternative expression search unit 106A, for the portion where voice quality change is likely to occur. When in the area 401A the user points the mouse pointer 403 to a region displayed by the different color in the rectangular region 4011A or 4012A and clicks a button of the mouse 204, the alternative expression set for the language expression at the portion corresponding to the clicked region is displayed in the display area 402. In the example of FIG. 17, "kakarimasu (is required, in Japanese)" and "atatamarimashita (has warmed up, in Japanese)" are presented as the portions where voice quality change "pressed voice" are likely to occur, and "hodo (about, in Japanese)" is presented as the portion where voice quality change "breathy voice" is likely to occur. Furthermore, the example of FIG. 17 shows a situation where a set of alternative expressions, "kakarimasu (to be required)", "hitsuyoudesu (to be necessary)", and "youshimasu (to be needed)" is displayed in the display area 402, when a portion with a different color in the rectangular region 4011A is clicked.

With the above structure, for each of various kinds of voice quality changes, the voice quality change estimation unit 103A estimates voice quality change likelihood at the same time, using the voice quality change estimation model 104A and the voice quality change estimation model 104B. Then, for each of various kinds of voice quality changes, the voice quality change portion judgment unit 105A locates, as a portion where voice quality change is likely to occur, a portion which is one accent phrase in the text and whose estimation value exceeds a predetermined threshold value. Thereby, the second embodiment can provide the text edit apparatus which has specific advantages of, for each of various kinds of voice quality changes, predicting or locating, from the text to be read aloud, a portion where voice quality change will occur when the text is actually read aloud, and then presenting the portion in a form by which the user can confirm it, in addition to the advantages of the first embodiment of the predicting or locating and the presenting for a single kind of voice quality change.

Furthermore, with the above structure, based on the judgment result of the voice quality change portion judgment unit 105A regarding a portion where the voice quality change will occur, the alternative expression search unit 106 searches, for each of various kinds of voice quality change, for alternative expressions having the same meaning as an expression at the portion of the text. Thereby, the second embodiment can provide the text edit apparatus which has specific advantages of presenting, for each of various kinds of voice quality changes, the alternative expressions for the portion where each voice quality change is likely to occur when the text is actually read aloud.

Note that it has been described in the second embodiment that the two different kinds of voice quality changes, "pressed voice" and "breathy voice", can be judged using the two voice quality change estimation models 104A and 104B, but the number of voice quality change estimation models and kinds of voice quality changes may be more than two, in order to provide the text edit apparatus having the same advantages as described above.

Third Embodiment

In the third embodiment of the present invention, the description is given for a text edit apparatus which basically has the same structure as the text edit apparatuses of the first and second embodiments, but which differs from these text edit apparatuses in that the estimation for the various kinds of voice quality changes can be performed for each of a plurality of users at the same time.

Figure 18:
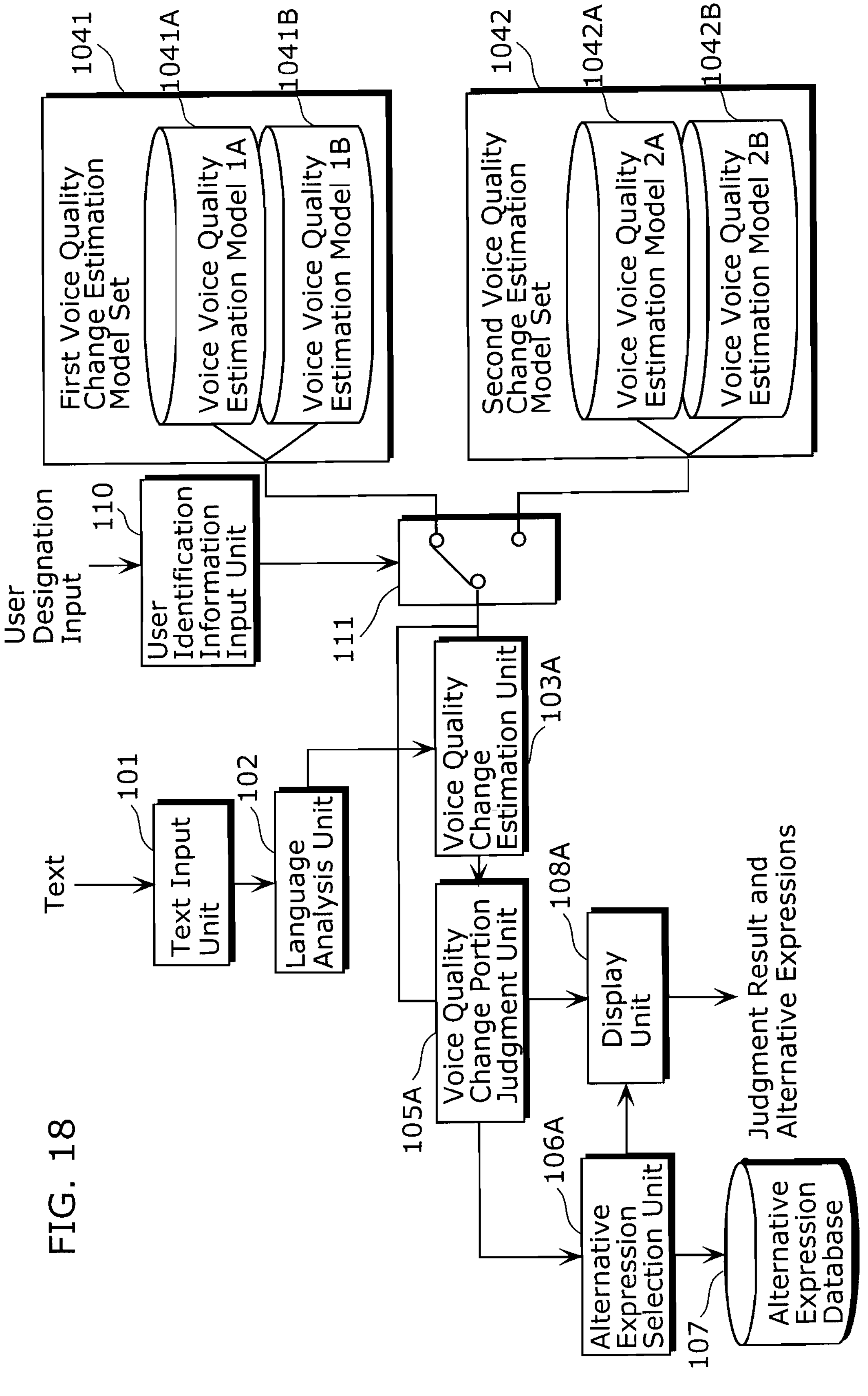
FIG. 18 is a functional block diagram of the text edit apparatus according to the third embodiment of the present invention.

FIG. 18 is a functional block diagram of the text edit apparatus according to the third embodiment of the present invention.

In FIG. 18, the text edit apparatus is an apparatus which edits an input text so that unintended impression is not given to listeners when a reader reads the text aloud. The text edit apparatus of FIG. 18 includes the text input unit 101, the language analysis unit 102, the voice quality change estimation unit 103A, a first voice quality change estimation model set 1041, a second voice quality change estimation model set 1042, the voice quality change portion judgment unit 105A, the alternative expression search unit 106A, the alternative expression database 107, the display unit 108A, a user identification information input unit 110, and a switch 111.

The reference numerals in FIGS. 1 and 15 are assigned to identical processing units in FIG. 18 which have the same functions as the processing units in the text edit apparatuses of the first and second embodiments of FIGS. 1 and 15. Description for the identical processing units having the same functions as the processing units in FIGS. 1 and 15 are not repeated here. In FIG. 18, each of the first and second voice quality change estimation model sets 1041 and 1042 has two kinds of voice quality change estimation models.

The first voice quality change estimation model set 1041 is made of a voice quality change estimation model 1041A and a voice quality change estimation model 1041B which are generated to judge respective different voice quality changes in voices of a single person, in the same manner as described for the voice quality change estimation models 104A and 104B of the text edit apparatus according to the second embodiment of the present invention. Likewise, the second voice quality change estimation model set 1042 is made of a voice quality change estimation model 1042A and a voice quality change estimation model 1042B which are generated to judge respective different voice quality changes in voices of another single person, in the same manner as described for the voice quality change estimation models 104A and 104B of the text edit apparatus according to the second embodiment of the present invention. It is assumed in the third embodiment that the first voice quality change estimation model set 1041 is generated for a user 1 and the second voice quality change estimation model set 1042 is generated for a user 2.

In FIG. 18, the user identification information input unit 110 receives user identification information for identifying a user when the user inputs the user identification information. According to the inputted user identification information, the switch 111 switches to select the voice quality change estimation model set corresponding to the user identified by the user identification information. Thereby, the voice quality change estimation unit 103A and the voice quality change portion judgment unit 105A can use the selected voice quality change estimation model set.

Figure 19:
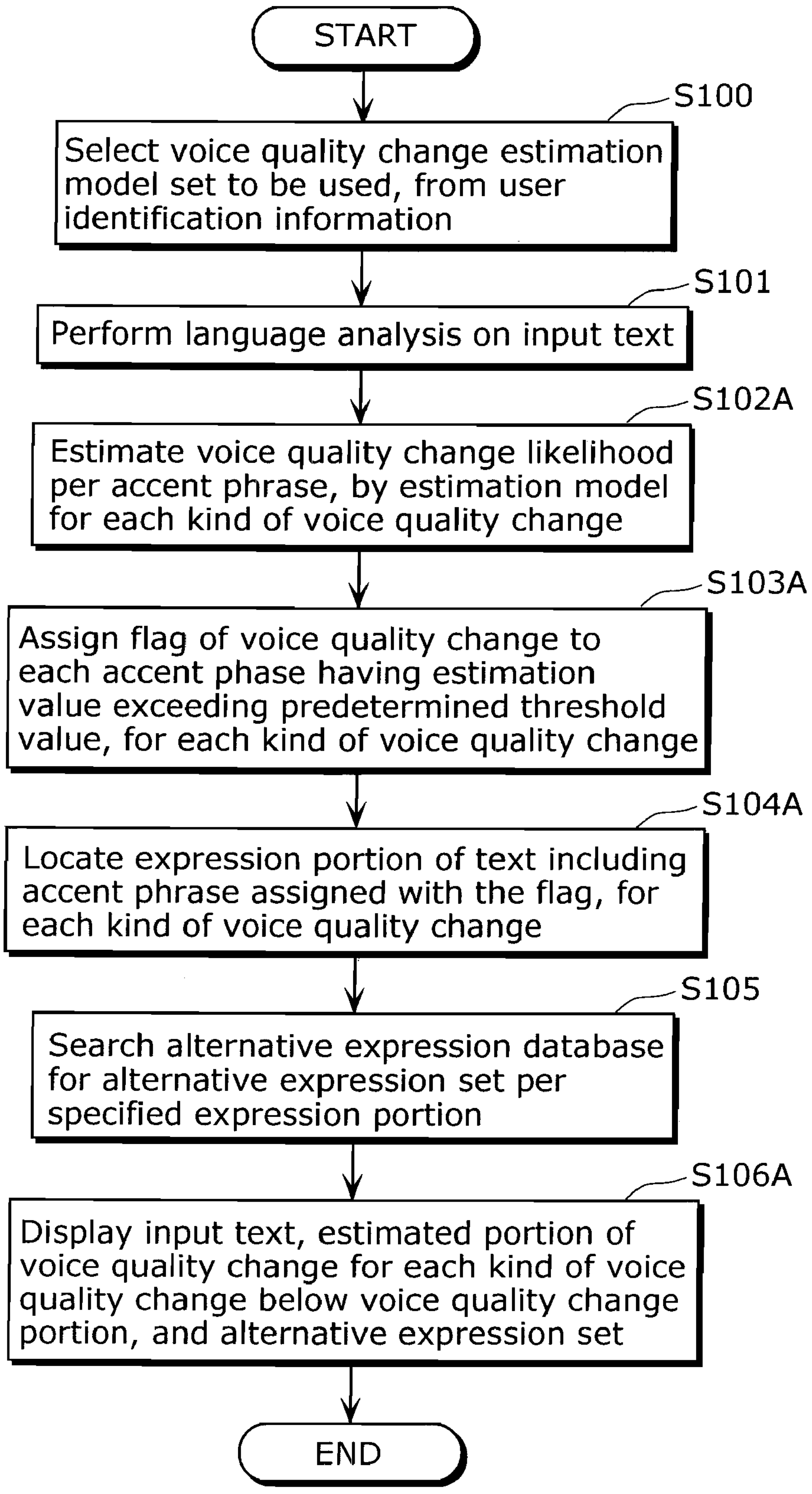
FIG. 19 is a flowchart showing processing performed by the text edit apparatus according to the third embodiment of the present invention.

Next, description is given for processing performed by the text edit apparatus having the above-described structure with reference to FIG. 19. FIG. 19 is a flowchart showing the processing performed by the text edit apparatus according to the third embodiment of the present invention. The step numerals in FIGS. 5 and 16 are assigned to identical steps in FIG. 19 which are the same as the steps of the text edit apparatuses according to the first and second embodiments. The description of the identical steps is not repeated here.

Firstly, according to the user identification information obtained from the user identification information input unit 110, the switch 111 is operated to select a voice quality change estimation model which corresponds to the user identified by the user identification information (S100). It is assumed in the third embodiment that the inputted user identification information is information regarding the user 1 and that the switch 111 selects the first voice quality change estimation model set 1041.

Next, the language analysis unit 102 performs language analysis (S101). The voice quality change estimation unit 103A (i) calculates, for each of accent phrases in an input text, voice-quality change estimation values of respective phonemes in the target accent phrase, by using the language analysis result, which is an output of the language analysis unit 102, as an explaining variable of estimation equations of the voice quality change estimation model 1041A and the voice quality change estimation model 1041B in the first voice quality change estimation model set 1041, and (ii) eventually outputs, as a voice-quality change estimation value of the target accent phrase, an estimation value which is the largest among the estimation values of the phonemes in the target accent phrase (S102A). It is assumed also in the third embodiment that each of the voice quality change estimation model 1041A and the voice quality change estimation model 1041B has estimation equations and their threshold values for judging occurrence of voice quality changes "pressed voice" and "breathy voice", respectively, in the same manner as the second embodiment.

Subsequent steps, which are Steps S103A, S104A, S105, and S106A, are the same as the steps performed by the text edit apparatuses of the first and second embodiments, so that the description of those steps are not repeated herein.

With the above structure, it is possible to select an optimum voice quality change estimation model set by the switch 111 using the user identification information of the user, when user's reading voices are estimated. Therefore, the third embodiment can provide a text edit apparatus which has specific advantages of predicting or locating, with the highest accuracy, a portion where voice quality change are likely to occur when an input text is actually read aloud, in addition to the advantages of the text edit apparatuses of the first and second embodiments.

Note that it has been described in the third embodiment that two voice quality change estimation model sets are used and the switch 111 selects one of them, but three or more voice quality change estimation model sets may be used thereby achieving the same advantages as described above.

Note also that it has been described in the third embodiment that each of the voice quality change estimation model sets has two voice quality change estimation models, but the voice quality change estimation model set may have one or more any arbitrary numbered voice quality change estimation models.

Fourth Embodiment

In the fourth embodiment of the present invention, the description is given for a text edit apparatus which is based on the observation that voice quality change occurs more as time passes due to tiredness of a throat or the like, when a user reads a text aloud. In other words, the following describes a text edit apparatus which can estimate the tendency at which voice quality change is more likely to occur as the user reads the text.

Figure 20:
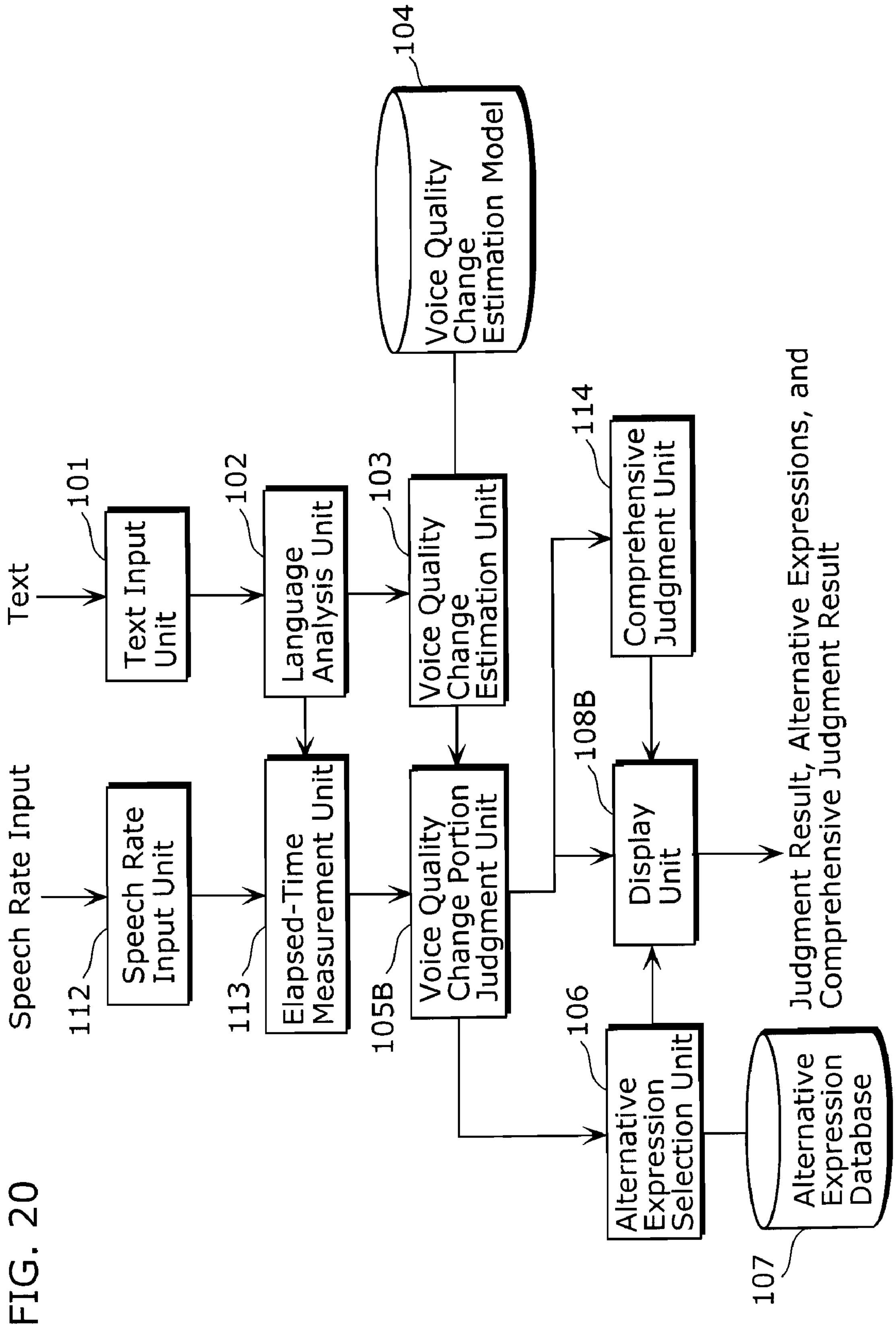
FIG. 20 is a functional block diagram of the text edit apparatus according to the fourth embodiment of the present invention.

FIG. 20 is a functional block diagram of the text edit apparatus according to the fourth embodiment of the present invention.

In FIG. 20, the text edit apparatus is an apparatus which edits an input text so that unintended impression is not given to listeners when a reader reads the text aloud. The text edit apparatus of the fourth embodiment includes the text input unit 101, the language analysis unit 102, the voice quality change estimation unit 103, the voice quality change estimation model 104, a voice quality change portion judgment unit 105B, the alternative expression search unit 106, the alternative expression database 107, a display unit 108B, a speech rate input unit 112, an elapsed-time measurement unit 113, and a comprehensive judgment unit 114.

The reference numerals in FIG. 1 are assigned to identical processing units in FIG. 20 which have the same functions as the processing units in the text edit apparatus of the first embodiment of FIG. 1. Description for the identical processing units having the same functions as the processing units in FIG. 1 is not repeated here. In FIG. 20, the speech rate input unit 112 converts designation inputted by a user regarding a speed of speech (hereinafter, referred to as a "speech rate") into a value in unit of an average mora time period (for example, the number of moras per second), and then outputs the resulting value. The elapsed-time measurement unit 113 sets the value of the speech rate obtained from the speech rate input unit 112, to a parameter of a speech rate (hereinafter, referred to as a "speech rate parameter) which is used to calculate a time period during which the user has read the text aloud (hereinafter, referred to as an "elapsed time" or a "reading elapsed time"). The voice quality change portion judgment unit 105B judges whether or not voice quality change may occur in each accent phase, based on the voice-quality change estimation value calculated by the voice quality change estimation unit 103 and the threshold value corresponding to the estimation value.

The comprehensive judgment unit 114 (i) receives and calculates results of the judging which is performed for each accent phrase by the voice quality change portion judgment unit 105B as to whether or not voice quality change may occur in each accent phase, and (ii) calculates an evaluation value which represents voice quality change likelihood in reading an entire text, based on a ratio of portions having the voice quality change likelihood to the entire text, by taking all of the results of the judging into account. The display unit 108B displays (i) the entire input text and (ii) the portions of the text which are judged by the voice quality change portion judgment unit 105B to have the voice quality change likelihood. In addition, the display unit 108B displays (iii) sets of alternative expressions outputted from the alternative expression search unit 106 and (iv) the evaluation value regarding voice quality change calculated by the comprehensive judgment unit 114.

The above-explained text edit apparatus is implemented, for example, in the computer system as shown in FIG. 2. The computer system includes the body part 201, the keyboard 202, the display 203, and the input device (mouse) 204. The voice quality change estimation model 104 and the alternative expression database 107 of FIG. 20 are stored in the CD-ROM 207 which is set into the body part 201, the hard disk (memory) 206 which is embedded in the body part 201, or the hard disk 205 which is in another system connected with the computer system via the line 208. Note that the display unit 108B in the text edit apparatus of FIG. 20 corresponds to the display 203 in the system of FIG. 2, and that the text input unit 101 and the speech rate input unit 112 of FIG. 20 correspond to the display 203, the keyboard 202, and the input device 204 in the system of FIG. 2.

Figure 21:
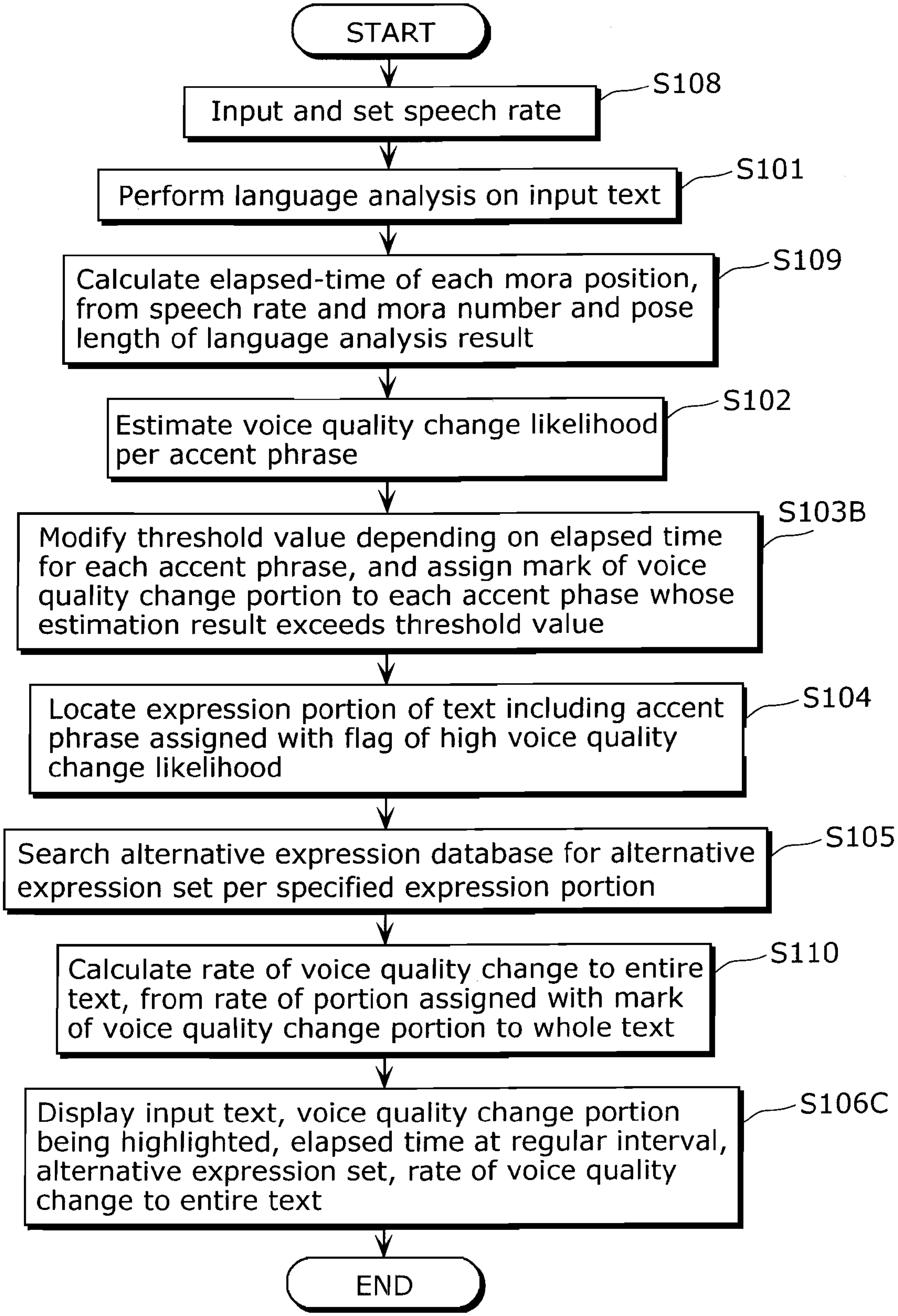
FIG. 21 is a flowchart showing processing performed by the text edit apparatus according to the fourth embodiment of the present invention.

Next, description is given for processing performed by the text edit apparatus having the above-described structure with reference to FIG. 21. FIG. 21 is a flowchart showing the processing performed by the text edit apparatus according to the fourth embodiment of the present invention. The step numerals in FIG. 5 are assigned to steps in FIG. 21 which are identical to the steps of the text edit apparatus according to the first embodiment. The description of the identical steps is not repeated here.

Firstly, the speech rate input unit 112 converts a speech rate which is designated and inputted by a user into a value in unit of an average mora time period, and then outputs the resulting value, and the elapsed-time measurement unit 113 sets the output of the speech rate input unit 112 to a speech rate parameter used to calculate an elapsed time (S108).

After performing the language analysis (S101), the elapsed-time measurement unit 113 counts the number of moras from beginning of a pronunciation mora sequence included in the language analysis result, then divide the mora numbers by the speech rate parameter, thereby calculating a reading elapsed time which is a time period of reading from a beginning of reading the text to each mora position.

The voice quality change estimation unit 103 calculates a voice-quality change estimation value for each accent phrase (S102). It is assumed in the fourth embodiment that the voice quality change estimation model 104 is generated by statistical learning to judge voice quality change "breathy voice". The voice quality change portion judgment unit 105B (i) modifies a threshold value for each accent phrase, based on the value of the reading 65 elapsed time which is calculated at Step S109 by the elapsed-time measurement unit 113 based on the position of the first mora in the target accent phrase, then (ii) compares (a) a voice-quality change estimation value of the accent phrase to (b) the modified threshold value, and (iii) thereby assigns a flag of high voice quality change likelihood, to an accent phrase whose estimation value exceeds the modified threshold value (S103B). The modification of the threshold value based on the reading elapsed time is determined by the following equation.

$$S'=S(1+T)/(1+2T)$$

Here, S represents an original threshold value, S' represents a modified threshold value, and T (minute) is an elapsed time. In other words, a threshold value is modified so that the threshold value becomes smaller as time passes. By setting a smaller threshold value as time passes, this modification makes it easy to assign the flag of high voice quality change likelihood, since due to tiredness of a throat or the like the voice quality change occurs more as the user reads the text aloud.

The comprehensive judgment unit 114 (i) accumulates at Steps S104 and S105, for accent phrases in the entire text, status of flags of high voice quality change likelihood which are obtained from the voice quality change portion judgment unit 105B for the respective accent phrases, and then (ii) calculates a ratio of (a) the number of accent phrases assigned with the flags of high voice quality change likelihood to (b) the number of all access phrases in the text (S110).

Eventually, the display unit 108B displays (i) reading elapsed times calculated by the elapse time measurement unit 113, for respective predetermined ranges of the text, (ii) portions located at Step S104 in the text as portions where voice quality change are likely to occur, as being highlighted, (iii) the set of alternative expressions of each portion, which is obtained at Step S105, and at the same time (iv) the ratio of accent phrases having voice quality change likelihood, which is calculated by the comprehensive judgment unit 114 (S106C).

Figure 22:
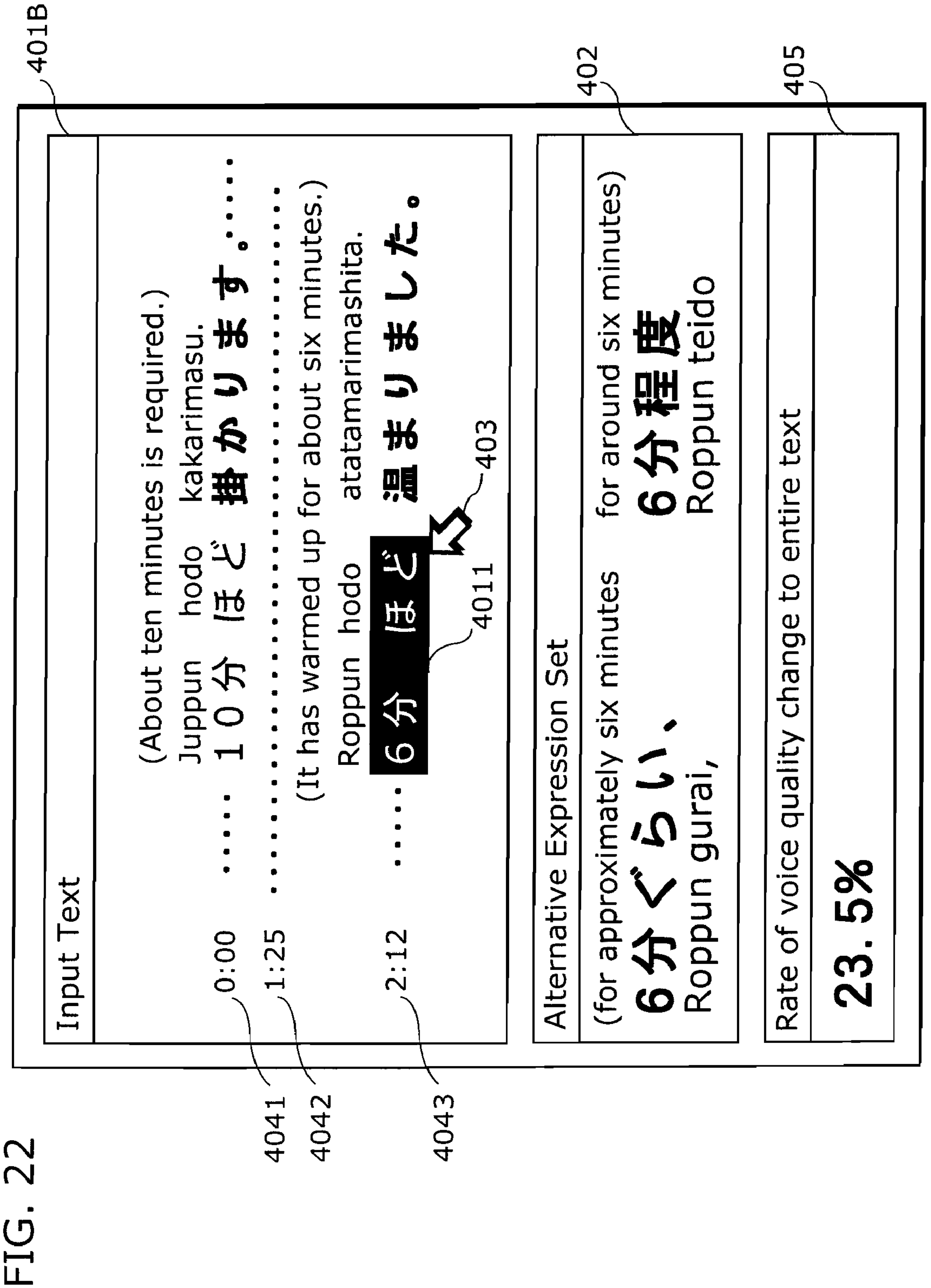
FIG. 22 is a diagram showing a screen display example of the text edit apparatus according to the fourth embodiment of the present invention.

FIG. 22 is a diagram showing an example of a screen detail which the display unit 108B displays on the display 203 of FIG. 2 at Step S106C. A display area 401B displays (i) the elapsed times 4041 to 4043 which are calculated at Step S109 to represent respective time periods in the case where the input text is read aloud at a designated speech rate, and (ii) the portion 4011 which is presented at Step S104 by the display unit 108 as a portion where voice quality change is likely to occur, as being highlighted. A display area 402 displays a set of alternative expressions obtained at Step S105 by the alternative expression search unit 106, for the portion where voice quality change is likely to occur. When in the area 401B the user points the highlighted portion 4011 by the mouse pointer 403 and clicks a button of the mouse 204, the alternative expression set corresponding to the clicked highlighted portion is displayed in the display area 402. A display area 405 displays the ratio of accent phrases at which the voice quality change "breathy voice" are likely to occur, which is calculated by the comprehensive judgment unit 114. In the example of the FIG. 22, the portion of "Roppun hodo (for about six minutes in Japanese)" in the text is highlighted, and when the portion 4011 is clicked, a set of alternative expressions "roppun gurai (for approximately six minutes)" and "roppun teido (for around six minutes)" is displayed in the display area 402.

The reading voice "Roppun hodo" is judged as "breathy voice", since sounds of Ha-gyo (sounds with a consonant "h" in Japanese alphabet ordering) tend to cause the voice quality change "breathy voice". A voice-quality change estimation value of "breathy voice" for a sound "ho" in the accent phrase "Roppun hodo" is larger than any estimation values of other moras in the "Roppun hodo". Thereby, the voice-quality change estimation value of the sound "ho" is set to a representative voice-quality change estimation value of the accent phrase. However, although reading voice "Juppun hodo (for about ten minutes)" also contains a sound of "ho", a portion of the voice is not judged as a portion where the voice quality change is likely to occur.

According to the equation for modifying a threshold value, which is $$S'=S(1+T)/(1+2T),$$

the modified threshold value S' is decreased as time passes, in other words, as T increases. Here, when each of voice-quality change estimation values of "Juppun hodo" and "Roppun hodo" is S×3/5, the part "Juppun hodo" is not judged as a portion where the voice quality change is likely to occur, because the modified threshold value S' is larger than S×3/5 until two minutes has passed since beginning of reading the text. However, the part "Roppun hodo" is judged as a part at which the voice quality change is likely to occur, because S' becomes smaller than S×3/5 after two minutes. Therefore, the example of FIG. 22 shows the case where, among accent phrases whose voice-quality change estimation values are the same, only the accent phrases whose elapsed time is larger than a certain value are judged to have portions where voice quality change are likely to occur.

With the above structure, the voice quality change portion judgment unit 105B modifies a threshold value as a judgment criteria, according to a speech rate which is inputted by the user and obtained from the elapse time measurement unit 113. Thereby, the fourth embodiment can provide a text edit apparatus which has specific advantages of predicting or locating a portion where voice quality change is likely to occur when a user reads the text aloud at a speech rate that the user expects, in consideration of influence of an elapsed time of the reading to the voice quality change likelihood, in addition to the advantages of the text edit apparatus of the first embodiment.

Note that it has been described in the fourth embodiment that the equation for modifying a threshold value is determined so that the threshold value is decreased as time passes, but the equation may be any equations for increasing accuracy of the estimation, and may be determined based on a result of analyzing, for each of various kinds of voice quality changes, a relationship between likelihood of the target voice quality change and an elapsed time. For example, the equation for modifying a threshold value may be determined based on the observation that voice quality change firstly is likely to occur due to tensing of a throat or the like, then gradually becomes unlikely to occur due to relaxing of the throat, and sequentially becomes likely to occur again as the reading proceeds due to tiredness of the throat or the like.

Fifth Embodiment

In the fifth embodiment of the present invention, the description is given for a text evaluation apparatus which can compare (a) an estimated portion where voice quality change is estimated to be likely to occur in an input text to (b) an occurred portion where the voice quality change has actually occurred when the user reads the same text aloud.

Figure 23:
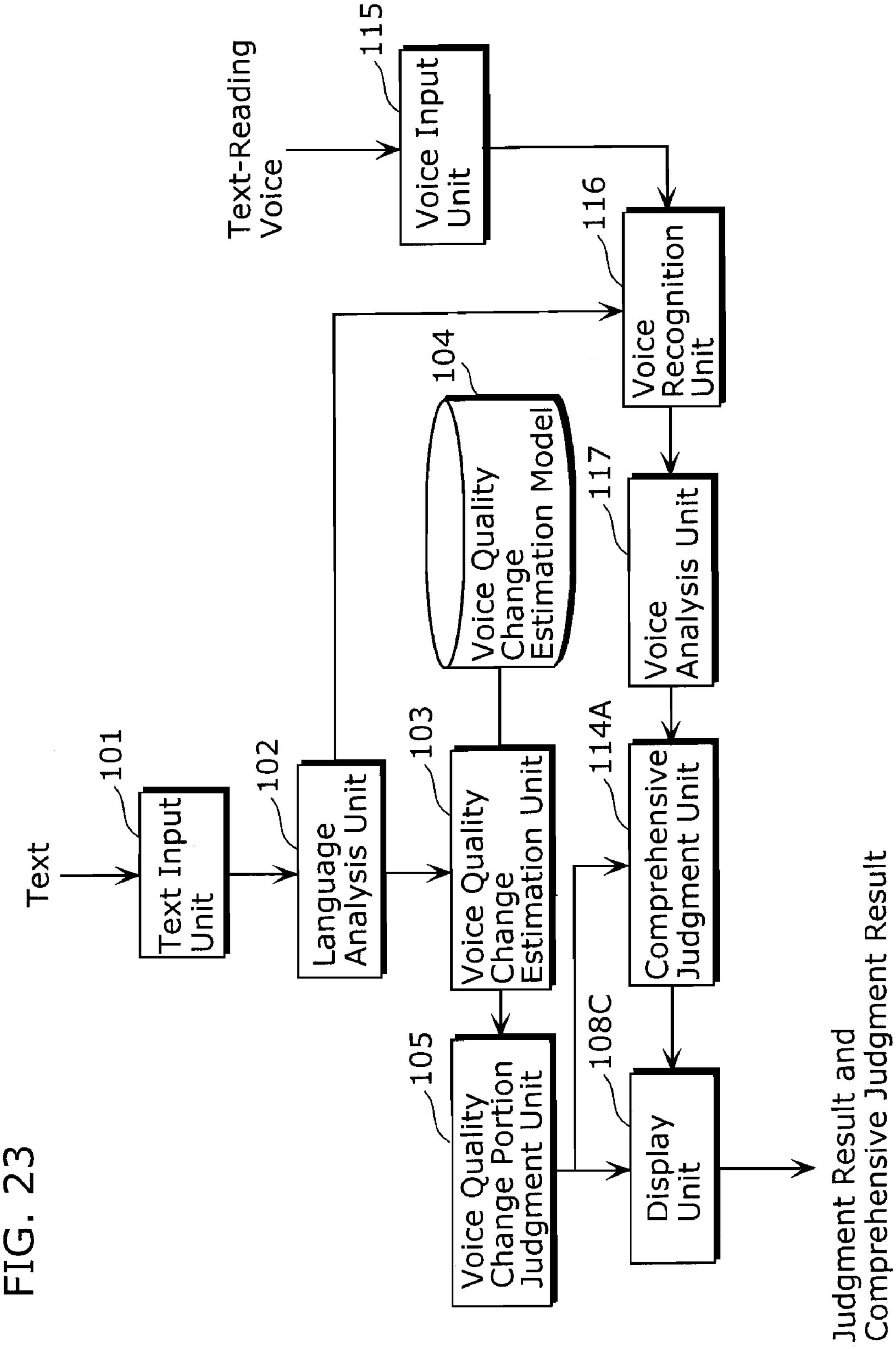
FIG. 23 is a functional block diagram of a text evaluation apparatus according to the fifth embodiment of the present invention.

FIG. 23 is a functional block diagram of the text evaluation apparatus according to the fifth embodiment of the present invention.

In FIG. 23, the text evaluation apparatus is an apparatus which compares (a) an estimated portion where voice quality change is estimated to be likely to occur in an input text to (b) an occurred portion where the voice quality change has actually occurred when a user reads the same text aloud. The text evaluation apparatus of FIG. 23 includes the text input unit 101, the language analysis unit 102, the voice quality change estimation unit 103, the voice quality change estimation model 104, the voice quality change portion judgment unit 105, a display unit 108C, a comprehensive judgment unit 114A, a voice input unit 115, a voice recognition unit 116, and a voice analysis unit 117.

The reference numerals in FIG. 1 are assigned to identical processing units in FIG. 23 which have the same functions as the processing units in the text edit apparatus of the first embodiment of FIG. 1. Description for the identical processing units having the same functions as the processing units in FIG. 1 is not repeated here. In FIG. 23, into the text evaluation apparatus, the voice input unit 115 takes, as voice signals, voices of user's text reading (hereinafter, referred to as "text reading voices" or "reading voices") which are inputted by the user using the input unit 101. For the voice signals taken by the voice input unit 115, the voice recognition unit 116 aligns the voice signals and a phonologic sequence, using information of a pronunciation phonologic sequence of the language analysis result outputted from the language analysis unit 102, and thereby recognizes voices of the taken voice signals. The voice analysis unit 117 judges whether or not voice quality change whose kind is predetermined has actually occurred in each accent phrase in the voice signals of the user's text reading voices.

The comprehensive judgment unit 114A (i) compares (b) a result of the judgment performed by the voice analysis unit 117 as to whether the voice quality change has actually occurred in each accent phrase in the reading voices to (a) a result of the judgment performed by the voice quality change portion judgment unit 105 to locate an estimated portion where the voice quality change is estimated to is likely to occur (in other words, a portion having high voice quality change likelihood), and then (ii) calculates a ratio of (c) the occurred portions where the voice quality change have actually occurred in the user's reading voice to (d) the estimated portions where the voice quality change are estimated to be likely to occur. The display unit 108C displays (i) the entire input text, and (ii) the estimated portions judged by the voice quality change portion judgment unit 105 as portions where the voice quality change are estimated to be likely to occur, as being highlighted. In addition, at the same time, the display unit 108C displays the ratio calculated by the comprehensive judgment unit 114A of (c) the occurred portions where the voice quality change have actually occurred in the user's reading voice to (d) the estimated portions where the voice quality change are estimated to be likely to occur.

Figure 24:
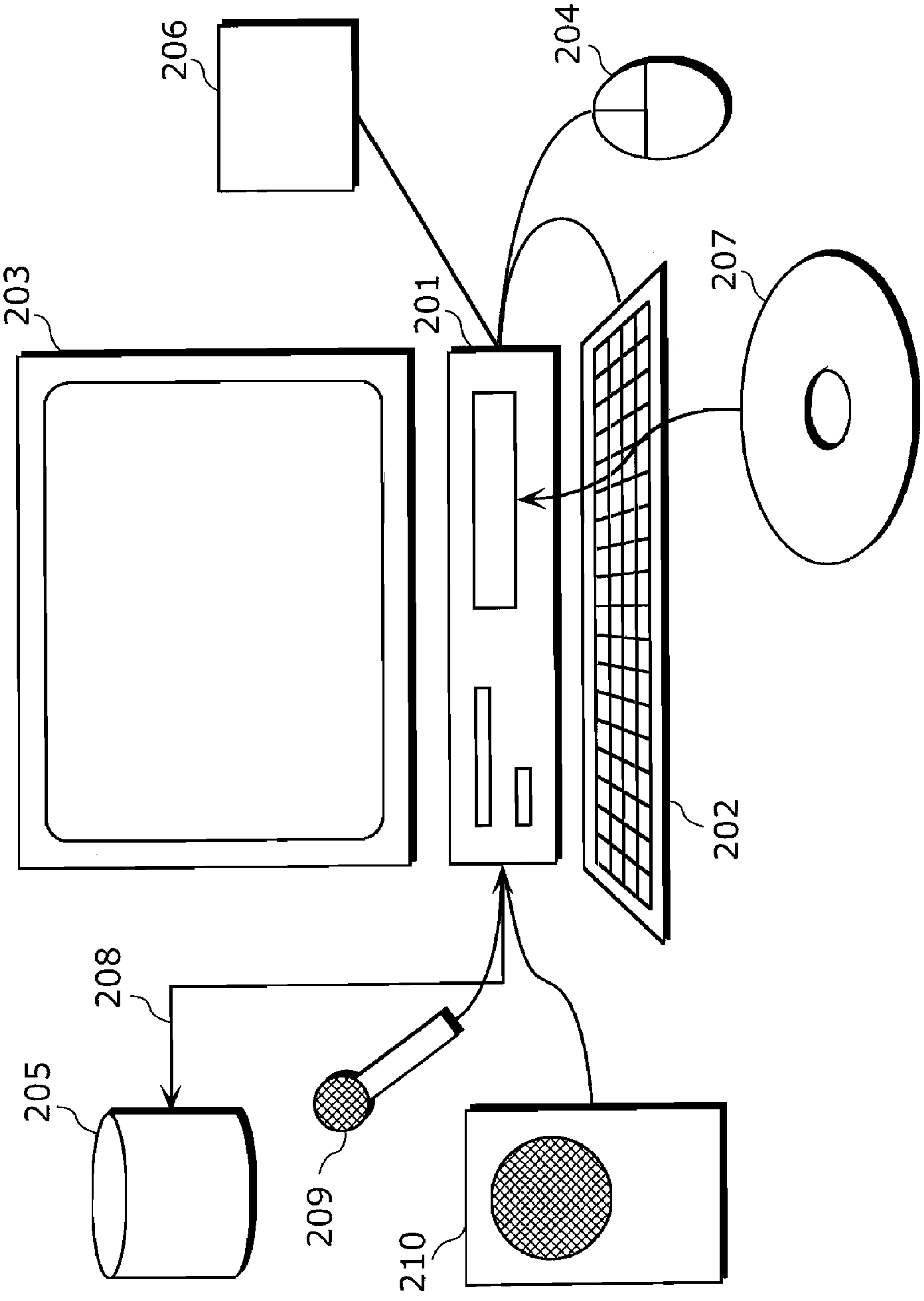
FIG. 24 is a diagram showing a computer system implementing the text evaluation apparatus according to the fifth embodiment of the present invention.

The above-explained text evaluation apparatus is implemented, for example, in a computer system as shown in FIG. 24. FIG. 24 is a diagram showing a computer system implementing the text evaluation apparatus according to the fifth embodiment of the present invention.

The computer system includes a body part 201, a keyboard 202, a display 203, and an input device (mouse) 204. The voice quality change estimation model 104 and the alternative expression database 107 of FIG. 23 are stored in a CD-ROM 207 which is set into the body part 201, a hard disk (memory) 206 which is embedded in the body part 201, or a hard disk 205 which is in another system connected with the computer system via a line 208. Note that the display unit 108C in the text evaluation apparatus of FIG. 23 corresponds to the display 203 in the system of FIG. 24, and that the text input unit 101 of FIG. 23 corresponds to the display 203, the keyboard 202, and the input device 204 in the system of FIG. 23. Further, the voice input unit 115 of FIG. 23 corresponds to a microphone 209. A speaker 210 is used to reproduce voices in order to check whether or not the voice input unit 115 gets the voice signals at an appropriate level.

Figure 25:
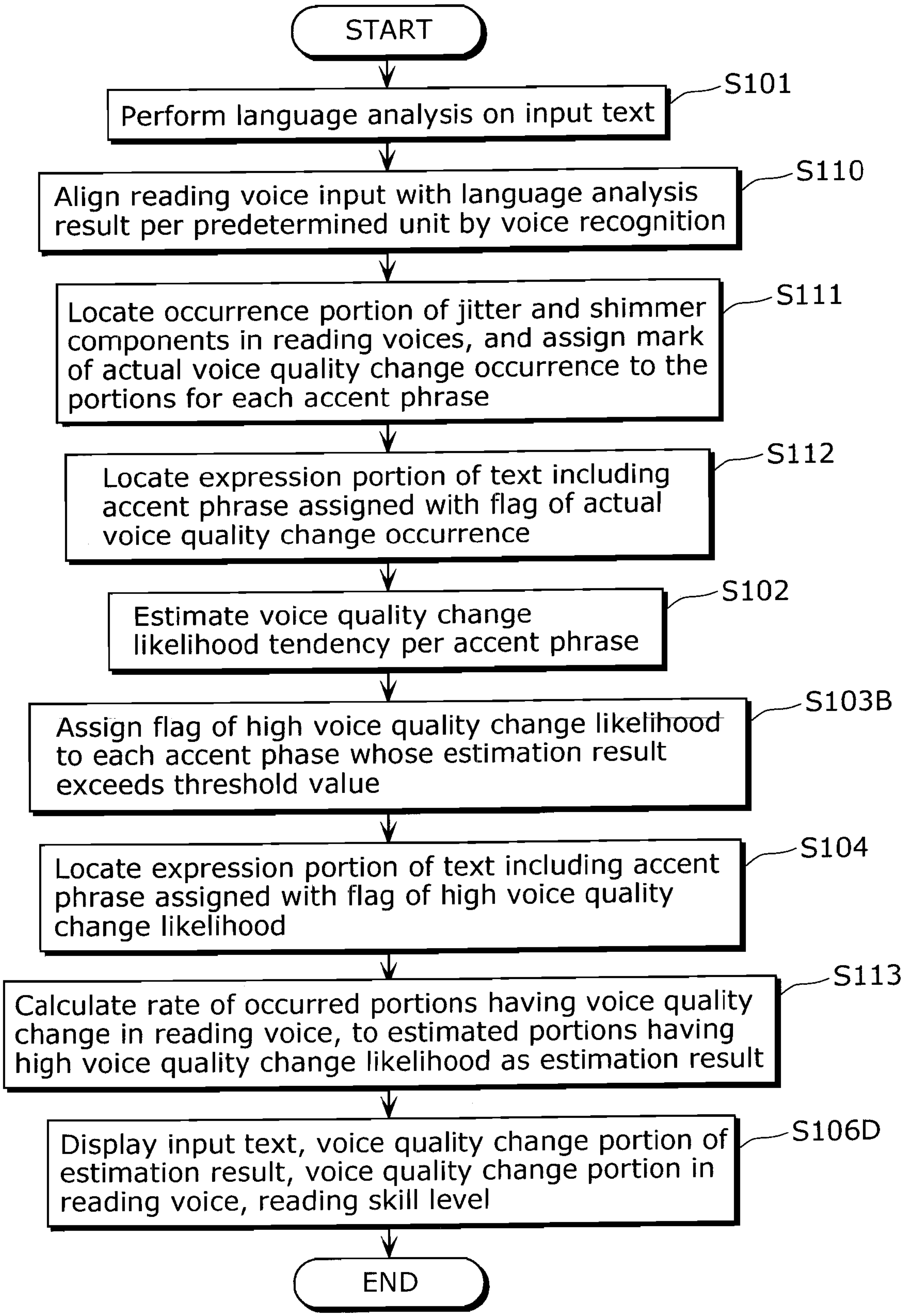
FIG. 25 is a flowchart showing processing performed by the text evaluation apparatus according to the fifth embodiment of the present invention.

Next, description is given for processing performed by the text evaluation apparatus having the above-described structure with reference to FIG. 25. FIG. 25 is a flowchart showing the processing performed by the text evaluation apparatus according to the fifth embodiment of the present invention. The step numerals in FIG. 5 are assigned to steps in FIG. 25 which are identical to the steps of the text edit apparatus according to the first embodiment. The description of the identical steps is not repeated here.

After performing the language analysis at Step S101, for the voice signals of the user obtained from the voice input unit 115, the voice recognition unit 116 aligns pronunciation phonologic sequence included in the language analysis result obtained from the language analysis unit 102 (S110).

Next, the voice analysis unit 117 (i) judges, for the voice signals of the user's reading voices, whether or not a certain kind of voice quality change has actually occurred in each accent phrase, using a voice analysis technique in which the kind of the voice quality change to be judged is predetermined, and (ii) assigns a flag presenting the actual voice-quality change occurrence to an accent phrase in which the voice quality change has actually occurred (S111). It is assumed in the fifth embodiment that the voice analysis unit 117 is set to analyze voice quality change "pressed voice". According to description of Non-Patent Reference 1, noticeable feature of "harsh voice" which is classified into voice quality change "pressed voice" are resulted from irregularity of fundamental frequency, and in more detail, from jitter (fluctuation component whose pitch is fast) and shimmer (fluctuation component whose amplitude is fast). Therefore, for a practical technique for judging the voice quality change "pressed voice", a technique can be implemented which extracts pitch of voice signals thereby extracting jitter components and shimmer components of fundamental frequency, and checks whether or not each of the components has a strength larger than a predetermined criterion thereby judging whether or not the voice quality change "pressed voice" has actually occurred. Furthermore, it is assumed here that the voice quality change estimation model 104 has an estimation equation and its threshold value for judging the voice quality change "pressed voice".

Subsequently, as an occurred expression portion where the voice quality change has actually occurred, the voice analysis unit 117 locates a part of a character sequence which is made of the shortest morpheme sequence including the accent phrase assigned at Step S111 with a flag of the actual voice-quality change occurrence (S112).

Next, after estimating voice quality change likelihood for each accent phrase of the language analysis result of the text at Step S102, the voice quality change portion judgment unit 105B (i) compares (a) a voice-quality change estimation value of each accent phrase, which is outputted from the voice quality change estimation unit 103, to (b) a threshold value in the voice quality change estimation model 104, which corresponds to the estimation equation used by the voice quality change estimation unit 103, and (ii) thereby assigns a flag representing high voice quality change likelihood, to an accent phrase whose estimation value exceeds the threshold value (S103B).

Subsequently, as an estimated expression portion where voice quality change is estimated to be likely to occur, the voice quality change portion judgment unit 105 locates a part of a character sequence which is made of the shortest morpheme sequence including the accent phrase assigned at Step S103B with the flag of the high voice quality change likelihood (S104).

Next, from among the plurality of expression portions that are located at Step S112 as occurred portions where voice quality change have actually occurred, the comprehensive judgment unit 114A counts the number of expression portions whose character sequence ranges are overlapped with the plurality of expression portions that are located at Step S104 in the text as the estimated portions where the voice quality change are estimated to be likely to occur. In addition, the comprehensive judgment unit 114A calculates a ratio of (i) the number of the overlapped portions to (ii) the number of the occurred expression portions that are located at Step S112 as portions where the voice quality change have actually occurred (S113).

Next, the display unit 108C displays the text, and two landscape rectangular regions each having a length identical to the length of one line of the text display, under each line of the text display. Here, the display unit 108C uses a different color for displaying a rectangular region which is included in one of the landscape rectangular regions and corresponds to horizontal position and length of a range of a character sequence at the estimated portion that is located at Step S104 as the portion where voice quality change is estimated to be likely to occur in the text, so that the color allows to distinguish the estimated portion from other portions where the voice quality change is estimated to be unlikely to occur. Likewise, the display unit 108C uses a different color for displaying a rectangular region which is included in the other landscape rectangular region and corresponds to horizontal position and length of a range of a character sequence at the occurred portion that is located at Step S112 as the portion where the voice quality change has actually occurred in the user's reading voices, so that the color allows to distinguish the occurred portion from other portions where the voice quality change has not occurred. In addition, the display unit 108C displays a ratio, which is calculated at Step S113, of (i) the portions where the voice quality change have actually occur in the user's reading voices to (ii) the estimated portions where the voice quality change are estimated to be likely to occur (S106D).

Figure 26:
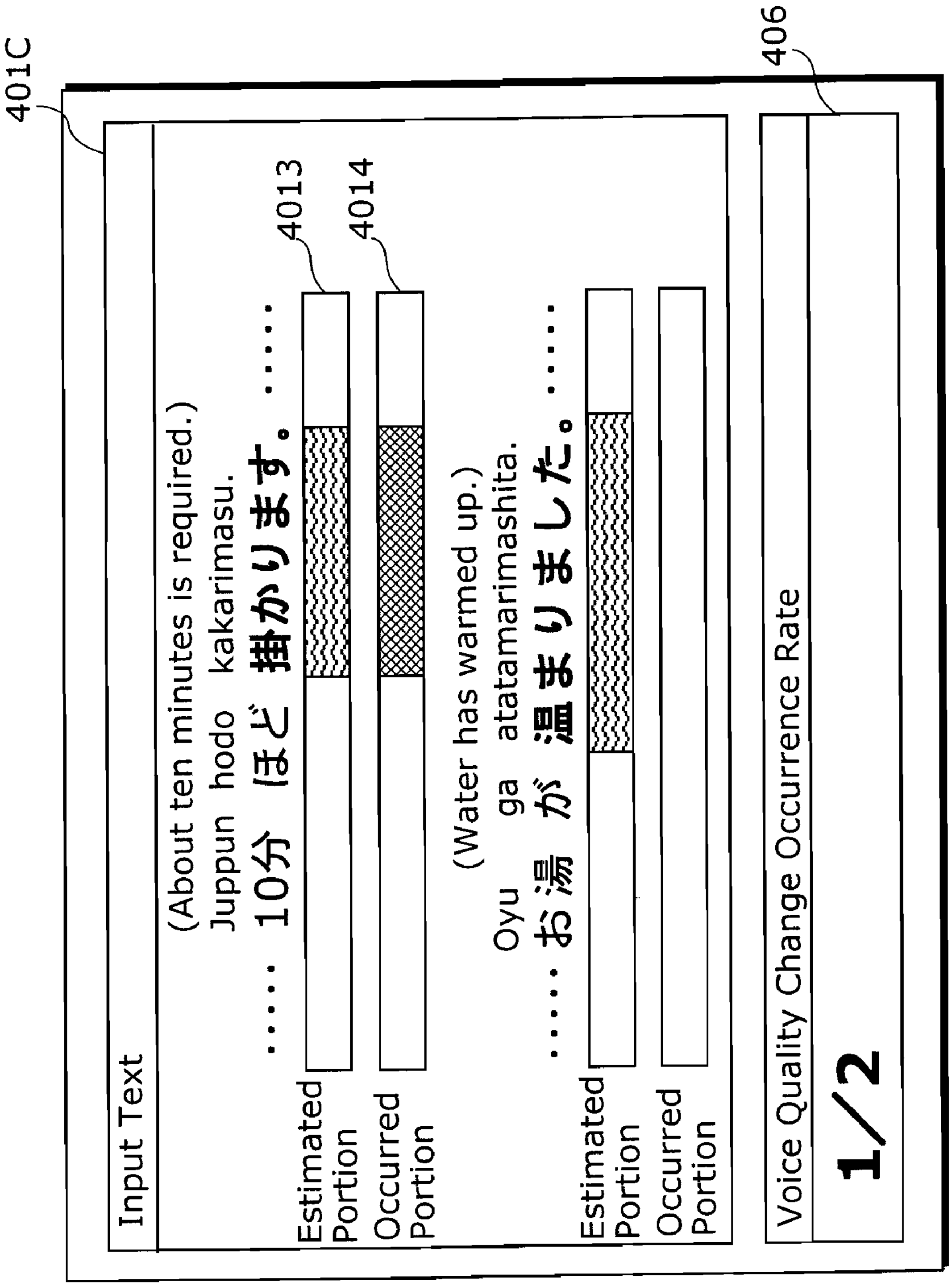
FIG. 26 is a diagram showing a screen display example of the text evaluation apparatus according to the fifth embodiment of the present invention.

FIG. 26 is a diagram showing an example of a screen detail which the display unit 108C displays on the display 203 of FIG. 24 at Step S106D. A display area 401C displays (i) the input text, (ii) a landscape rectangular region 4013 in which a region corresponding to the estimated portion where the voice quality change is estimated to be likely to occur in the text is displayed in a different color, which is displayed at Step 106D by the display unit 108C, and (iii) another landscape rectangular region 4013 in which a region corresponding to the occurred portion where the voice quality change has actually occurred in the user's reading voices is displayed in a different color, which is displayed at Step 106D by the display unit 108C. A display area 406 displays the ratio of (i) the occurred portions where the voice quality change have actually occur in the user's reading voices to (ii) the estimated portions which are located at Step S113 as portions where the voice quality change are estimated to be likely to occur, which is displayed at Step S106D by the display unit 108C. In the example of FIG. 26, "kakarimasu (is required, in Japanese)" and "atatamarimashita (has warmed up, in Japanese)" are presented as the estimated portions where the voice quality change "pressed voice" are estimated to be likely to occur, and the "kakarimasu" is presented as the occurred portion which is judged by analyzing the user's reading voices as the portion where the voice quality change has actually occurred. "1/2" is presented as the ratio regarding voice quality change occurrence. This is because, while there are two estimated portions where the voice quality change are estimated to be likely to occur, there is one occurred portion where the voice quality change has actually occurred and also overlapped with the estimated portion.

With the above structure, in a series of Steps S110, S111, and S112, the fifth embodiment locates occurred portions where the voice quality change have actually occurred in the user's reading voices. In addition, the comprehensive judgment unit 114A calculates at Step S113 the ratio of (i) estimated portions where the voice quality change are estimated to be likely to occur in the text and also overlapped with the occurred portions where the voice quality change have actually occurred in the user's reading voices to (ii) all of estimated portions where the voice quality change are estimated to be likely to occur in the text. Thereby, the fifth embodiment can provide a text evaluation apparatus which has specific advantages of confirming the occurred portions where the voice quality change have actually occurred in the user's reading voices, and also of presenting, as a ratio of the occurred portions to estimated portions, the estimation of how much the voice quality change occurrence have been reduced at the estimated portions when the user has read the text aloud paying attention to the estimated portions, in addition to the advantages of the text edit apparatus of the first embodiment of predicting or locating, for a single kind of voice quality change, from the text to be read aloud, a portion where voice quality change will occur when the text is actually read aloud, and then presenting the portion in a form by which the user can confirm it.

As further advantages, the user can use the text evaluation apparatus according to the fifth embodiment as a speech training apparatus by which the user practices to speak without voice quality change. More specifically, in the area 401C of FIG. 26, the user can check and compare an estimated portion where the voice quality change is estimated to occur and an occurred portion where the voice quality change has actually occur. Thereby, the user can practice to speak not to cause voice quality change at the estimated portion. In this case, the numeric value displayed in the display area 406 becomes a score of the user's speech. That is, the smaller numeric value represents speech with less voice quality change occurrence.

Sixth Embodiment

In the sixth embodiment of the present invention, the description is given for a text edit apparatus which performs an estimation method different from the above-described estimation methods of the first to fifth embodiments.

Figure 27:
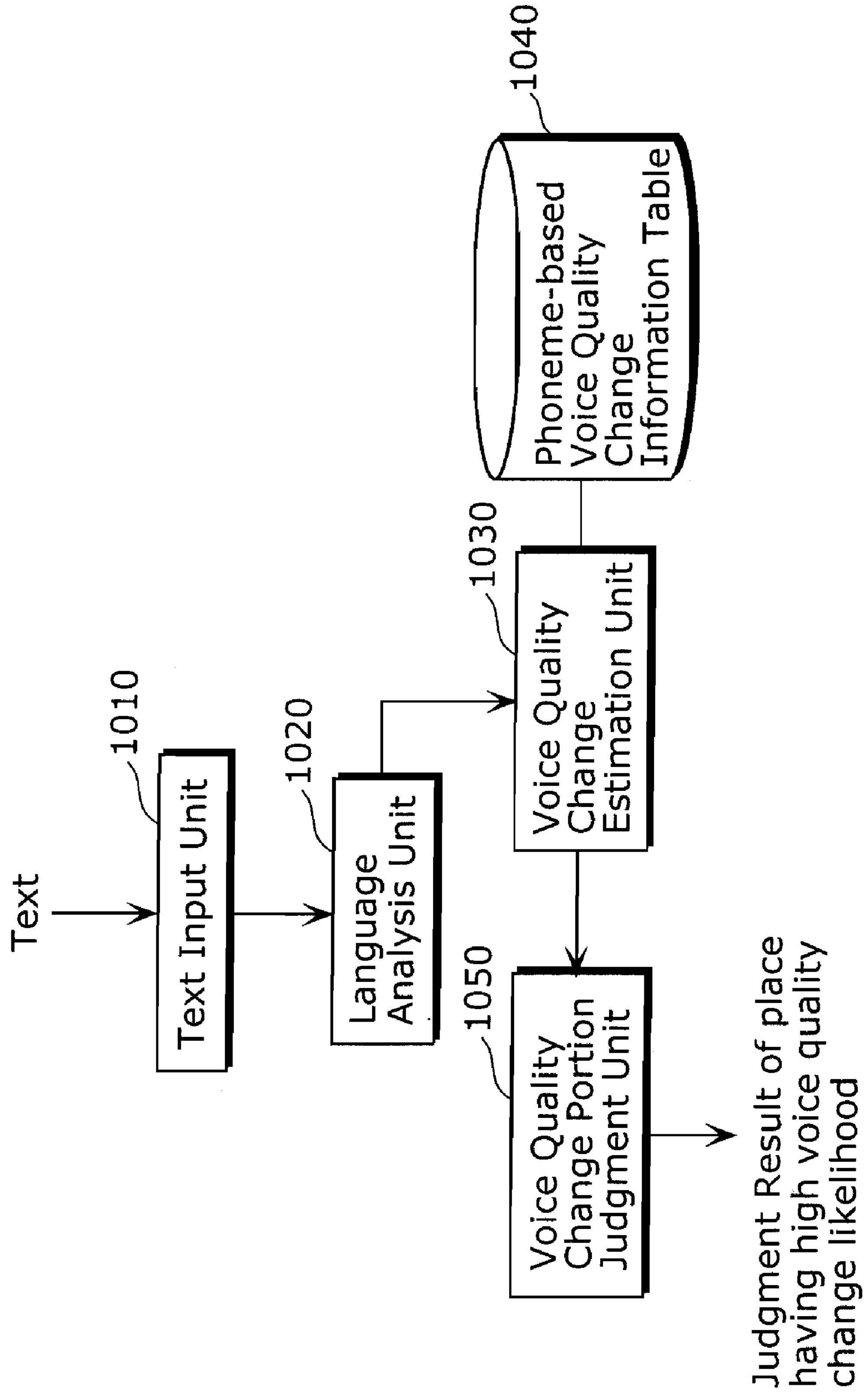
FIG. 27 is a functional block diagram showing only a main part, which is related to processing of voice quality change estimation method, of a text edit apparatus according to the sixth embodiment of the present invention.

FIG. 27 is a functional block diagram showing only a main part, which is related to processing of the voice quality change estimation method, of the text edit apparatus according to the sixth embodiment of the present invention.

The text edit apparatus of FIG. 27 includes a text input unit 1010, a language analysis unit 1020, a voice quality change estimation unit 1030, a phoneme-based voice quality change information table 1040, and a voice quality change portion judgment unit 1050. The text edit apparatus further includes another processing unit (not shown) which executes processing after the judging of estimated portions where voice quality change are estimated to be likely occur. These processing units are identical to the units of the first to fifth embodiments. For example, the text edit apparatus of the sixth embodiment may include the alternative expression search unit 106, the alternative expression database 107, and the display unit 108 shown in FIG. 1 according to the first embodiment.

In FIG. 27, the text input unit 1010 is a processing unit which receives a text to be processed. The language analysis unit 1020 is a processing unit which performs language analysis on the text provided from the text input unit 1010, and thereby outputs a language analysis result that includes a sequence of phonemes which is pronunciation information, information of boundary between accent phrases, accent position information, information of part of speech, and syntax information. The voice quality change estimation unit 1030 calculates a voice-quality change estimation value for each accent phrase of the language analysis result, with reference to the phoneme-based voice quality change information table 1040 in which a degree of voice quality change occurrence (hereinafter, referred to also as "voice-quality change degree") of each phoneme is represented by a finite numeric value. The voice quality change portion judgment unit 1050 judges whether or not voice quality change may occur in each accent phrase, based on the voice-quality change estimation value estimated by the voice quality change estimation unit 1030 and a predetermined threshold value.

FIG. 28 is a table showing an example of the phoneme-based voice quality change information table 1040. The phoneme-based voice quality change information table 1040 is a table showing how much voice-quality change degree each of consonants in moras has. For example, a consonant "p" has a voice-quality change degree "0.1".

Figure 29:
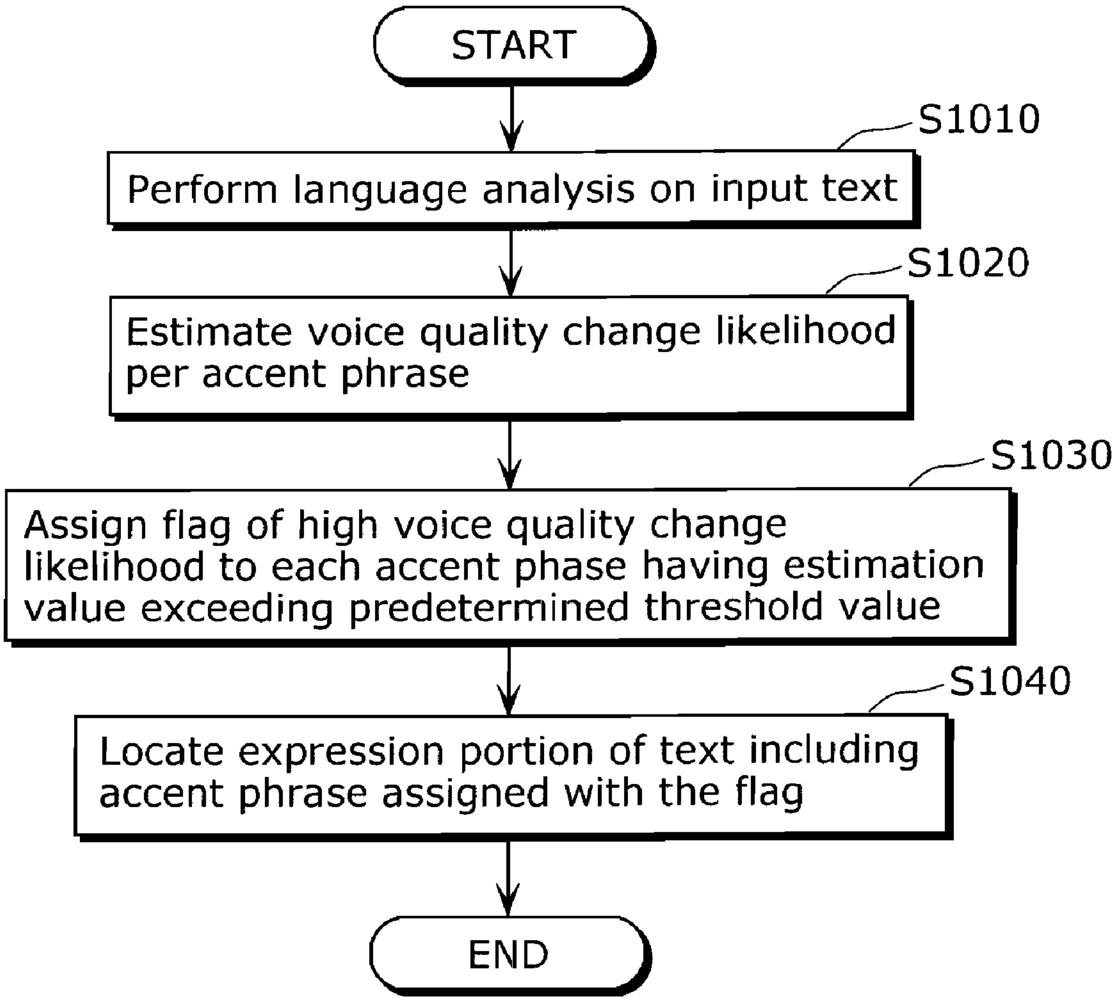
FIG. 29 is a flowchart of processing of the voice quality change estimation method according to the sixth embodiment of the present invention.

Next, description is given for the voice quality change estimation method performed by the text edit apparatus having the above structure with reference to FIG. 29. FIG. 29 is a flowchart of the voice quality change estimation method according to the sixth embodiment of the present invention.

Firstly, the language analysis unit 1020 performs a series of language analysis that includes morpheme analysis, syntax analysis, pronunciation generation, and accent phrase processing on a text received from the text input unit 1010, and then outputs a language analysis result that includes a sequence of phonemes which is pronunciation information, information of boundary between accent phrases, accent position information, information of part of speech, and syntax information (S1010).

Next, regarding each accent phrase of the language analysis result outputted at S1010, the voice quality change estimation unit 1030 determines, for each phoneme, a numeric value of a voice-quality change degree, with reference to the numeric values of voice-quality change degrees which are stored in the phoneme-based voice quality change information table 1040 for respective phonemes. In addition, the voice quality change estimation unit 1030 sets a numeric value of a voice-quality change degree which is the largest among the numeric values of the phonemes in the target accent phrase, to a representative voice-quality change estimation value of the accent phrase (S1020).

Next, the voice quality change portion judgment unit 1050 (i) compares (a) a voice-quality change estimation value of each accent phrase, which is outputted from the voice quality change estimation unit 1030, to (b) a predetermine threshold value, and (ii) thereby assigns a flag representing a high voice quality change likelihood, to an accent phrase whose estimation value exceeds the threshold value (S1030) Subsequently, as an expression portion with high likelihood of voice quality change, the voice quality change portion judgment unit 1050 locates a part of a character sequence which is made of the shortest morpheme sequence including the accent phrase assigned at Step S1030 with the flag of the high voice quality change likelihood (S1040).

With the above structure, the voice quality change estimation unit 1030 calculates a voice-quality change estimation value for each accent phrase, using a numeric value of a phoneme-based voice-quality change degree described in the phoneme-based voice quality change information table 1040, and the voice quality change portion judgment unit 1050 locates, as a portion where voice quality change is likely to occur, an accent phrase having an estimation value exceeding a predetermined threshold value, by comparing the estimation value and the threshold value. Thereby, the sixth embodiment can provide the practical method of predicting or locating, from the text to be read aloud, a portion where voice quality change is likely to occur when the text is actually read aloud.

Seventh Embodiment

In the seventh embodiment of the present invention, the description is given for a text-to-speech (TTS) apparatus which (i) converts an expression by which voice quality change is likely to occur in an input text, into a different expression by which the voice quality change is unlikely to occur, and vice versa, namely, converts an expression by which the voice quality change is unlikely to occur in the input text, into a different expression by which the voice quality change is likely to occur, and then (ii) generates synthesized voices of the converted text.

Figure 30:
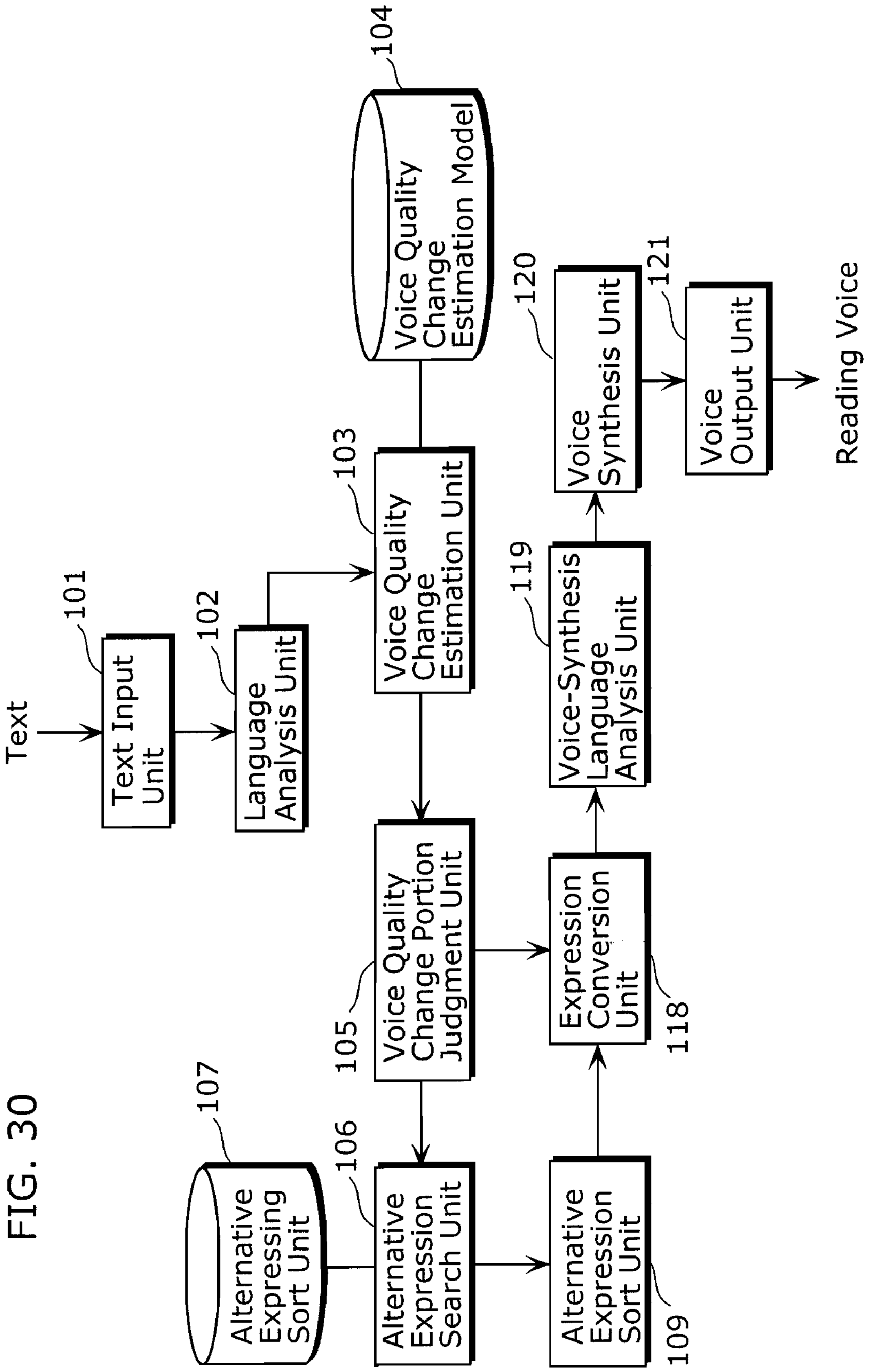
FIG. 30 is a functional block diagram of a text-to-speech apparatus according to the seventh embodiment of the present invention.

FIG. 30 is a functional block diagram of the TTS apparatus according to the seventh embodiment of the present invention.

The TTS apparatus of FIG. 30 includes the text input unit 101, the language analysis unit 102, the voice quality change estimation unit 103, the voice quality change estimation model 104, the voice quality change portion judgment unit 105, the alternative expression search unit 106, the alternative expression database 107, the alternative expression sort unit 109, an expression conversion unit 118, a voice synthesis language analysis unit 119, a voice synthesis unit 120, and a voice output unit 121.

The reference numerals in FIG. 1 or 11 are assigned to identical processing units in FIG. 30 which have the same functions as the processing units in the text edit apparatus of the first embodiment of FIG. 1. Description for the identical processing units having the same functions as the processing units in FIG. 1 is not repeated here.

In FIG. 30, the expression conversion unit 118 replaces (i) a portion which is judged in the text by the voice quality change portion judgment unit 105 as a portion where voice quality change is likely to occur, by (ii) an alternative expression at which the voice quality change is the most unlikely to occur, among the alternative expression set which has been sorted and outputted by the alternative expression sort unit 109. The voice synthesis language analysis unit 119 performs language analysis on the text which is replaced and outputted by the expression conversion unit 118. The voice synthesis unit 120 synthesizes voice signals based on pronunciation information, accent phrase information, pose information included in the language analysis result outputted by the voice synthesis language analysis unit 119. The voice output unit 121 outputs the voice signals synthesized by the voice synthesis unit 120.

Figure 31:
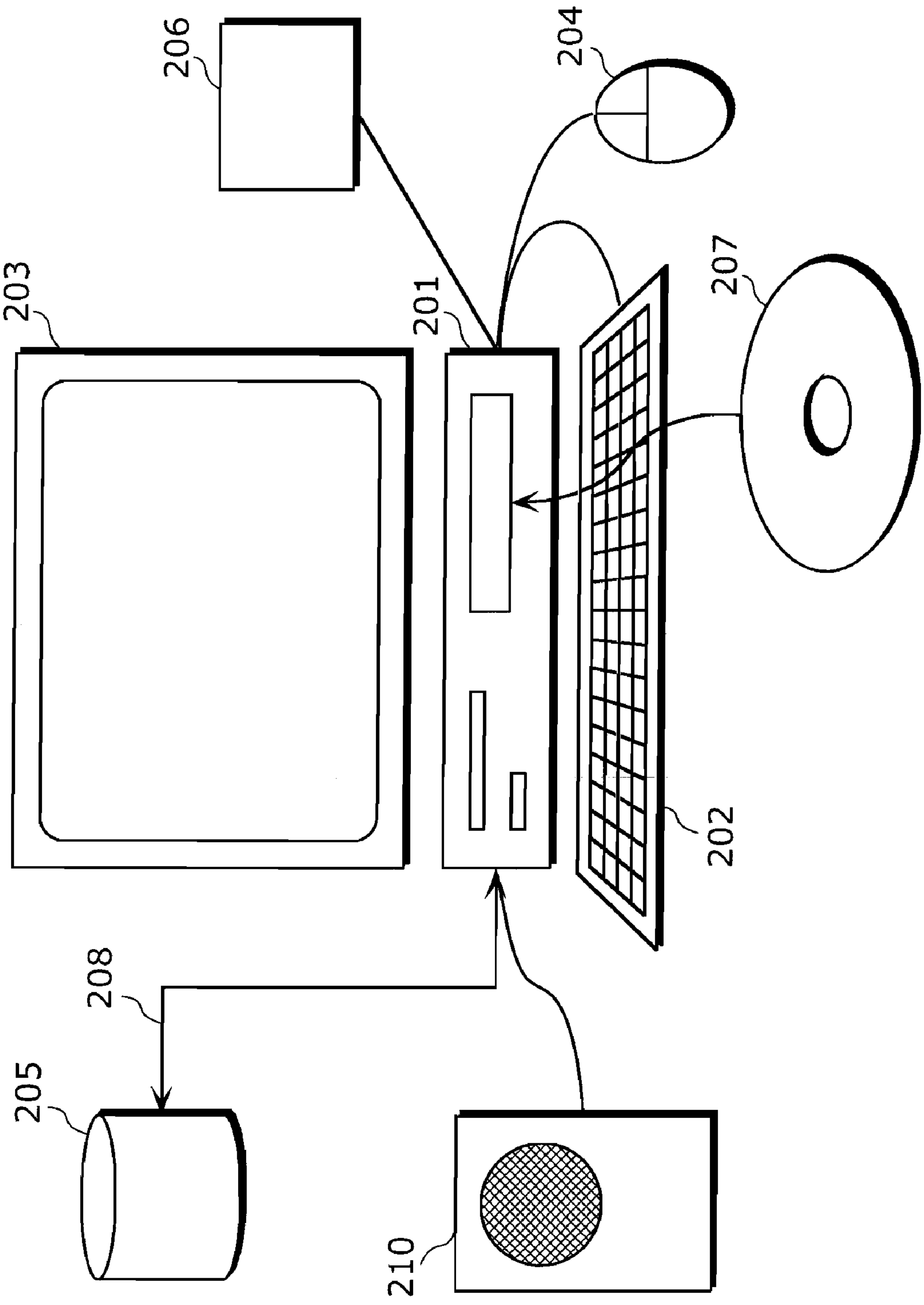
FIG. 31 is a diagram showing a computer system implementing the text-to-speech apparatus according to the seventh embodiment of the present invention.

The above-explained TTS apparatus is implemented, for example, in a computer system as shown in FIG. 31. FIG. 31 is a diagram showing a computer system implementing the TTS apparatus according to the seventh embodiment of the present invention. The computer system includes a body part 201, a keyboard 202, a display 203, and an input device (mouse) 204. The voice quality change estimation model 104 and the alternative expression database 107 of FIG. 30 are stored in a CD-ROM 207 which is set into the body part 201, a hard disk (memory) 206 which is embedded in the body part 201, or a hard disk 205 which is in another system connected with the computer system via a line 208. The text input unit 101 of FIG. 30 corresponds to the display 203, the keyboard 202, and the input device 204 in the system of FIG. 31. A speaker 210 corresponds to the voice output unit 121 of FIG. 30.

Figure 32:
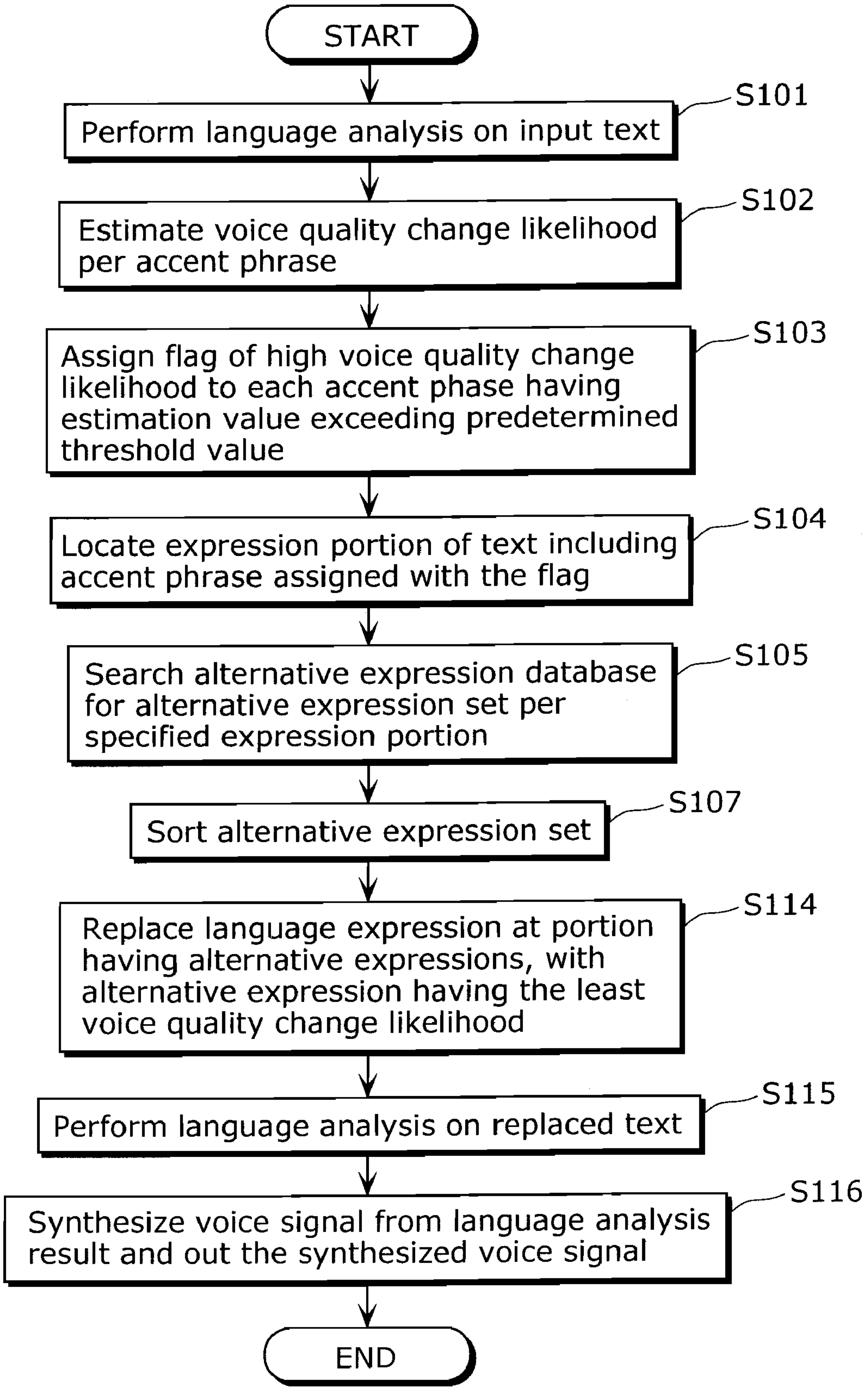
FIG. 32 is a flowchart showing processing performed by the text-to-speech apparatus according to the seventh embodiment of the present invention.

Next, description is given for processing performed by the TTS apparatus having the above-described structure with reference to FIG. 32. FIG. 32 is a flowchart showing processing performed by the TTS apparatus according to the seventh embodiment of the present invention. The step numerals in FIG. 5 or 14 are assigned to steps in FIG. 32 which are identical to the steps of the text edit apparatus according to the first embodiment. The description of the identical steps is not repeated here.

Figure 33:
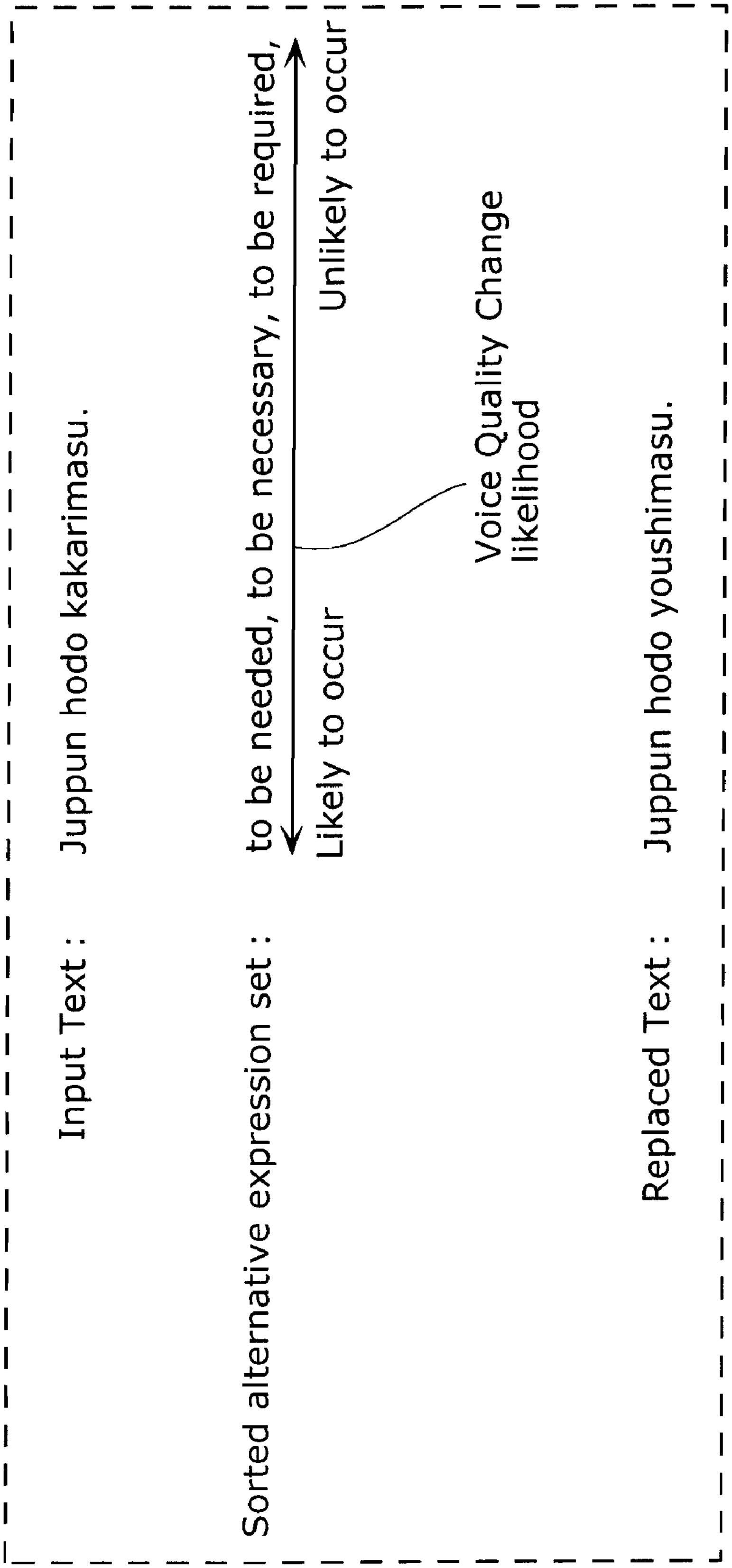
FIG. 33 is a diagram showing an example of intermediate data for explaining processing performed by the text-to-speech apparatus according to the seventh embodiment of the present invention.

The Steps S101 to S107 are identical steps performed by the text edit apparatus of the first embodiment of FIG. 14. The input text is assumed to be "Juppun hodo kakarimasu (About ten minutes is required, in Japanese)." as shown in FIG. 33. FIG. 33 is a diagram showing an example of intermediate data related to the processing of replacing the input text by the TTS apparatus according to the seventh embodiment.

As the following step S114, the expression conversion unit 118 (i) selects one alternative expression by which the voice quality change is the most unlikely to occur, from the alternative expression set which is selected for the target portion by the alternative expression search unit 106 and sorted by the alternative expression sort unit 109, and then (ii) replaces (a) the target portion which is located at Step S104 by the voice quality change portion judgment unit 105 as a portion where voice quality change is likely to occur by (b) the selected alternative expression (S114). As shown in FIG. 33, the sorted alternative expression set is sorted in order of degrees of voice quality change occurrence. In this example, “youshimasu (to be needed, in Japanese)” is selected as the alternative expression by which the voice quality change is the most unlikely to occur. Next, the voice synthesis language analysis unit 119 performs language analysis on the text converted at Step S114, and outputs a language analysis result including pronunciation information, information of boundary between accent phrases, accent position information, pose position information, pose length (S115). As shown in FIG. 33, “kakarimasu (is required, in Japanese)” in “Juppun hodo kakarimasu (About ten minutes is required, in Japanese)” of the input text is replaced by “youshimasu (to be needed, or is needed, in Japanese)”. Finally, the voice synthesis unit 120 synthesized voice signals based on the language analysis result outputted at Step S115, and outputs the synthesized voice signals via the voice output unit 121 (S116).

With the above structure, the voice quality change estimation unit 103 and the voice quality change portion judgment unit 105 (i) locates the portion where voice quality change is likely to occur in the input text, and the alternative expression search unit 106, the alternative expression sort unit 109, and the expression conversion unit 118 perform a series of steps for automatically (ii-1) replacing (a) the portion where voice quality change is likely to occur in the input text by (b) an alternative expression by which the voice quality change is unlikely to occur, and (ii-2) reads the resulting text aloud. Thereby, the seventh embodiment can provide a TTS apparatus which has specific advantages of reading the text aloud by preventing, as much as possible, instability of voice tone due to the bias (habit) in voice tone balance by which voice tones in voices synthesized by the voice synthesis unit 120 of the TTS apparatus cause voice quality change “pressed voice” or “breathy voice” depending on kinds of phonemes, if such bias exists.

Note that it has been described in the seventh embodiment that the expression at which voice quality change will occur is replaced by the expression at which the voice quality change is unlikely to occur, in order to read the text aloud. However, it is also possible that the expression at which the voice quality change is unlikely to occur is replaced by the expression at which voice quality change will occur, in order to read the text aloud.

Note also that it has been described in the above-described embodiments, the estimation of the voice quality change likelihood and the judgment of portions where voice quality change occur are performed using an estimate equation. However, if it is previously known in which mora an estimate equation is likely to exceed its threshold value, it is also possible to judge the mora as a portion where voice quality change always occurs.

For example, in the case where the voice quality change is “pressed voice”, an estimate equation is likely to exceed its threshold value in the following moras (1) to (4).

(1) a mora, whose consonant is “b” (a bilabial and plosive sound), and which is the third mora in an accent phrase.

(2) a mora, whose consonant is “m” (a bilabial and nasalized sound), and which is the third mora in an accent phrase (3) a mora, whose consonant is “n” (an alveolar and nasalized sound), and which is the first mora in an accent phrase (4) a mora, whose consonant is “d” (an alveolar and plosive sound), and which is the first mora in an accent phrase Furthermore, in the case where the voice quality change is “breathy voice”, an estimate equation is likely to exceed its threshold value in the following moras (5) to (8).

(5) a mora, whose consonant is “h” (guttural and unvoiced fricative), and which is the first or third mora in an accent phrase (6) a mora, whose consonant is “t” (alveolar and unvoiced plosive sound), and which is the fourth mora in an accent phrase (7) a mora, whose consonant is “k” (velar and unvoiced plosive sound), and which is the fifth mora in an accent phrase (8) a mora, whose consonant is “s” (dental and unvoiced fricative), and which is the sixth mora in an accent phrase As explained above, it is possible to locate a portion where voice quality change is likely to occur in a text, using a relationship between a consonant and an accent phrase. However, it is also possible, in English, Chinese, and the like, to locate a portion where voice quality change is likely to occur in a text, using a different relationship except the above relationship between a consonant and an accent phrase. For example, in the case of English, it is possible to locate a portion where voice quality change is likely to occur in a text, using a relationship between a consonant and the number of syllables in an accent phrase or between a consonant and a stress position in a stress phrase. Furthermore, in the case of Chinese, it is possible to locate a portion where voice quality change is likely to occur in a text, using a relationship between a consonant and a rising or falling pattern of four pitch tones, or between a consonant and the number of syllables included in breath group.

Note also that each of the apparatuses according to the above-described embodiments may be implemented into an integrated circuit, large-scale integration (LSI). For example, if the text edit apparatus according to the first embodiment is implemented into a LSI, the language analysis unit 102, the voice quality change estimation unit 103, the voice quality change portion judgment unit 105, and the alternative expression search unit 106 can be implemented together into a single LSI. Or, it is further possible to implement these processing units as the different LSIs. It is still further possible to implement one processing unit as a plurality of LSIs.

The voice quality change estimation model 104 and the alternative expression database 107 may be implemented as a storage unit outside the LSI, or a memory inside the LSI. If these databases are implemented as the storage device outside the LSI, data may be obtained from these database via the Internet.

The LSI can be called an IC, a system LSI, a super LSI or an ultra LSI depending on their degrees of integration.

The integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the processing units of the apparatuses as an integrated circuit. For example, biotechnology can be applied to the above implementation.

Figure 34:
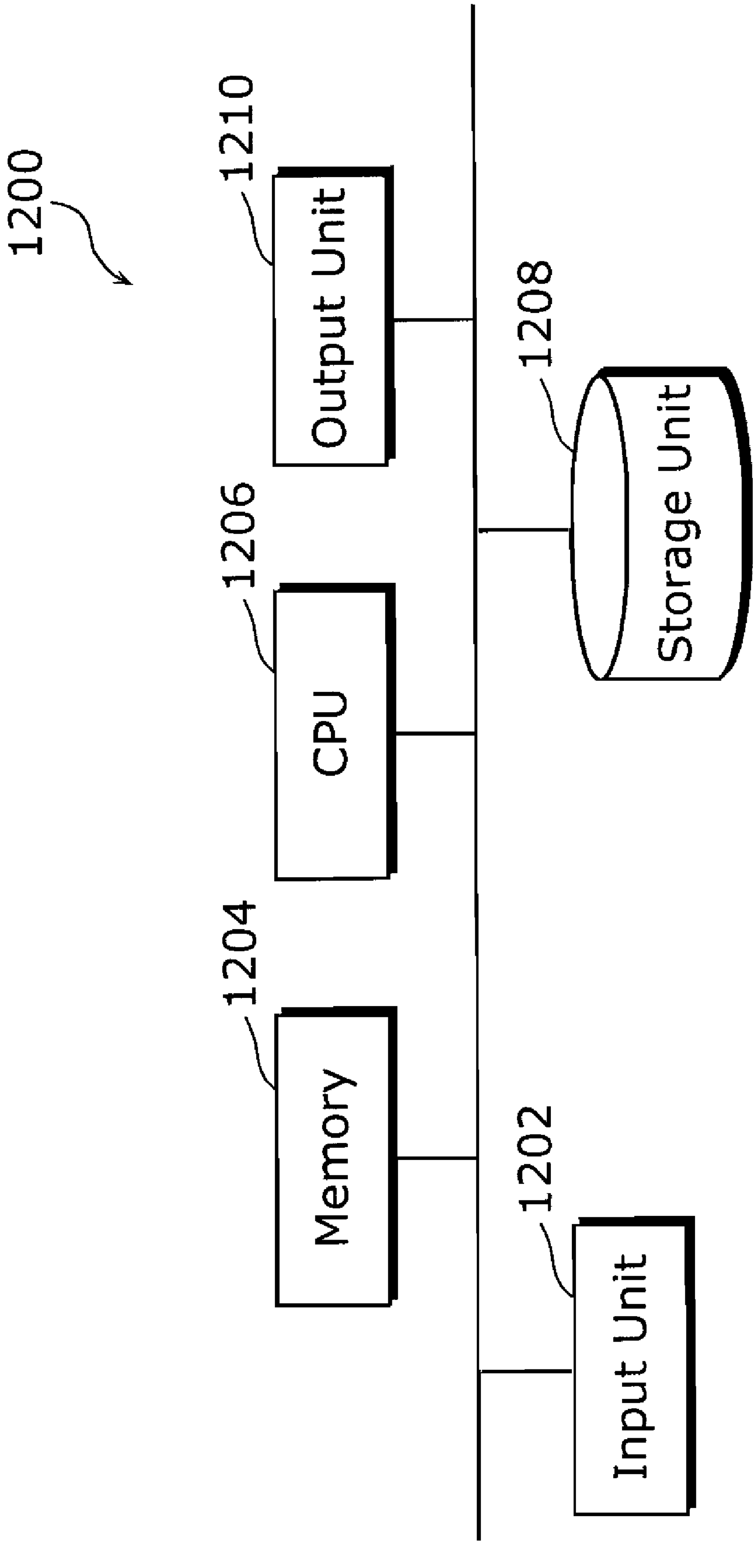
FIG. 34 is a diagram showing an example of a computer configuration.

Furthermore, each of the apparatuses according to the above-described embodiments may be implemented as a computer. FIG. 34 is a diagram showing an example of a configuration of the structure. The computer 1200 includes an input unit 1202, a memory 1204, a central processing unit (CPU) 1206, a storage unit 1208, and an output unit 1210. The input unit 1202 is a processing unit which receives input data from the outside. The input unit 1202 includes a keyboard, a mouse, a voice input device, a communication interface (I/F) unit, and the like. The memory 1204 is a storage device in which programs and data are temporarily stored. The CPU 1206 is a processing unit which executes the programs. The storage unit 1208 is a device in which the programs and the data are stored. The storage unit 1208 includes a hard disk and the like. The output unit 1210 is a processing unit which outputs the data to the outside. The output unit 1210 includes a monitor, a speaker, and the like.

For example, if the text edit apparatus according to the first embodiment is implemented as the computer, the language analysis unit 102, the voice quality change estimation unit 103, the voice quality change portion judgment unit 105, and the alternative expression search unit 106 corresponds to the programs executed by the CPU 1206, and the voice quality change estimation model 104 and the alternative expression database 107 are stored in the storage unit 1208. Furthermore, results of calculation of the CPU 1206 are temporarily stored in the memory 1204 or the storage unit 1208. Note that the memory 1204 and the storage unit 1208 may be used to exchange data among the processing units including the voice quality change portion judgment unit 105. Note also that programs for executing each of the apparatuses according to the above embodiment may be stored in a Floppy™ disk, a CD-ROM, a DVD-ROM, a nonvolatile memory, or the like, or may be read by the CPU of the computer 1200 via the Internet.

The above embodiments are merely examples and do not limit a scope of the present invention. The scope of the present invention is specified not by the above description but by claims appended with the specification. Accordingly, all modifications are intended to be included within the spirits and the scope of the present invention.

INDUSTRIAL APPLICABILITY

A text edit apparatus according to the present invention has functions of evaluating and modifying a text based on voice quality, and is thereby useful as a word processor apparatus, word processor software, or the like. In addition, the text edit apparatus according to the present invention is able to be used for an apparatus or software having a function of a text which is assumed to be read aloud by a human.

Furthermore, the text evaluation apparatus according to the present invention has functions of enabling a user to (i-1) read a text aloud paying attention to a portion which is predicted from language expression in the text as a portion where voice quality change is likely to occur, and (i-2) to confirm a portion where the voice quality change has actually occurred in user's reading voices of the text, and of (ii) evaluating how much voice quality change have actually occurred. Thereby, the text evaluation apparatus according to the present invention is useful as a speech training apparatus, language learning apparatus, or the like. In addition, the text evaluation apparatus according to the present invention is useful as an apparatus having a function of supporting reading practice, or the like.

The TTS apparatus according to the present invention has functions of replacing a language expression by which voice quality change is likely to occur by an alternative expression in order to read a text aloud, which makes it possible to read the text aloud with less voice quality change and high voice quality clarity while keeping the same contents of the text. Thereby, the TTS apparatus according to the present invention is useful as an apparatus for reading news aloud, or the like. In addition, regardless of contents of a text, the TTS apparatus according to the present invention is useful as a reading apparatus in the case where influence on listeners due to voice quality change of reading voices is to be eliminated, or the like.

The invention claimed is:

1. A voice quality change portion locating apparatus which locates, based on language analysis information regarding a text, a portion of the text where voice quality may change when the text is read aloud, said apparatus comprising:

- a storage unit in which a rule is stored, the rule being used for judging likelihood of the voice quality change based on phoneme information and prosody information;
- a voice quality change estimation unit operable to estimate the likelihood of the voice quality change which occurs when the text is read aloud, for each predetermined unit of an input symbol sequence including at least one phonologic sequence, based on (i-1) phoneme information and (i-2) prosody information which are included in the language analysis information that is a symbol sequence of a result of language analysis including a phonologic sequence corresponding to the text, and (ii) the rule; and
- a voice quality change portion locating unit operable to locate a portion of the text where the voice quality change is likely to occur, based on the language analysis information and a result of the estimation performed by said voice quality change estimation unit.

2. The voice quality change portion locating apparatus according to claim 1,

- wherein the rule is an estimation model of the voice quality change, the estimation model being generated by performing analysis and statistical learning on voice of a user.

3. The voice quality change portion locating apparatus according to claim 1,

- wherein said voice quality change estimation unit is operable to estimate the likelihood of the voice quality change for the each predetermined unit of the language analysis information, based on each of a plurality of utterance modes of a user, using a plurality of estimation models which are set for respective kinds of voice quality changes and generated by performing analysis and statistical learning on respective voices of the plurality of utterance modes.

4. The voice quality change portion locating apparatus according to claim 1,

- wherein said voice quality change estimation unit is operable to (i) select an estimation model corresponding to each of a plurality of users, from among a plurality of estimation models for the voice quality change which are generated by performing analysis and statistical learning on respective voices of the plurality of users, and (ii) estimate the likelihood of the voice quality change for the each predetermined unit of the language analysis information, using the selected estimation model.

5. The voice quality change portion locating apparatus according to claim 1, further comprising:

an alternative expression storage unit in which an alternative expression for a language expression is stored; and an alternative expression presentation unit operable to (i) search said alternative expression storage unit for an alternative expression for the portion of the text where the voice quality change is likely to occur, and (ii) present the alternative expression.

6. The voice quality change portion locating apparatus according to claim 1, further comprising:

an alternative expression storage unit in which an alternative expression for a language expression is stored; and a voice quality change portion replacement unit operable to (i) search said alternative expression storage unit for an alternative expression for the portion of the text which is located by said voice quality change locating unit as where the voice quality change is likely to occur, and (ii) replace the portion by the alternative expression.

7. The voice quality change portion locating apparatus according to claim 6, further comprising a voice synthesis unit operable to generate voice by which the text in which the portion is replaced by the alternative expression by said voice quality change portion replacement unit is read aloud.

8. The voice quality change portion locating apparatus according to claim 1, further comprising a voice quality change portion presentation unit operable to present a user the portion of the text which is located by said voice quality change locating unit as where the voice quality change is likely to occur.

9. The voice quality change portion locating apparatus according to claim 1, further comprising a language analysis unit operable to (i) perform the language analysis on the text, and (ii) output the language analysis information which is the symbol sequence of the result of the language analysis including the phonologic sequence.

10. The voice quality change portion locating apparatus according to claim 1, wherein said voice quality change estimation unit is operable to estimate the likelihood of the voice quality change for the each predetermined unit, using, as an input, at least a kind of a phoneme, the number of moras in an accent phrase, and an accent position among the language analysis information.

11. The voice quality change portion locating apparatus according to claim 1, further comprising an elapsed-time calculation unit operable to calculate an elapsed time which is a time period of reading from a beginning of the text to a predetermined position of the text, based on speech rate information indicating a speed at which a user reads the text aloud, wherein said voice quality change estimation unit is further operable to estimate the likelihood of the voice quality change for the each predetermined unit, by taking the elapsed time into account.

12. The voice quality change portion locating apparatus according to claim 1, further comprising a voice quality change ratio judgment unit operable to judge a ratio of (i) the portion which is located by said voice quality change locating unit as where the voice quality change is likely to occur, to (ii) all or a part of the text.

13. The voice quality change portion locating apparatus according to claim 1, further comprising:

a voice recognition unit operable to recognize voice by which a user reads the text aloud;

a voice analysis unit operable to analyze an occurrence degree of the voice quality change, for each predetermined unit which includes each phoneme unit of the voice of the user, based on a result of the recognition performed by said voice recognition unit; and a text evaluation unit operable to compare (i) the portion of the text which is located by said voice quality change locating unit as where the voice quality change is likely to occur to (ii) a portion where the voice quality change has actually occurred in the voice of the user, based on (a) the portion of the text where the voice quality change is likely to occur and (b) a result of the analysis performed by said voice analysis unit.

14. The voice quality change portion locating apparatus according to claim 1, wherein the rule is a phoneme-based voice quality change table in which a level of the likelihood of the voice quality change is represented for the each phoneme by the numeric value, and said voice quality change estimation unit is operable to estimate the likelihood of the voice quality change for the each predetermined unit of the language analysis information, based on the numeric value which is allocated to each phoneme included in the predetermined unit, with reference to the phoneme-based voice quality change table.

15. A voice quality change portion locating apparatus which locates, based on language analysis information regarding a text, a portion of the text where voice quality may change when the text is read aloud, said apparatus comprising a voice quality change portion locating unit operable to (i) locate a mora in the text as a portion where the voice quality change is likely to occur, the mora being one of (1) a mora, whose consonant is “b” that is a bilabial and plosive sound, and which is a third mora in an accent phrase, (2) a mora, whose consonant is “m” that is a bilabial and nasalized sound, and which is the third mora in the accent phrase, (3) a mora, whose consonant is “n” that is an alveolar and nasalized sound, and which is a first mora in the accent phrase, and (4) a mora, whose consonant is “d” that is an alveolar and plosive sound, and which is the first mora in the accent phrase, and also (ii) locate a mora in the text as a portion where the voice quality change is likely to occur, the mora being one of (5) a mora, whose consonant is “h” that is a guttural and unvoiced fricative, and which is one of the first mora and the third mora in the accent phrase, (6) a mora, whose consonant is “t” that is an alveolar and unvoiced plosive sound, and which is a fourth mora in the accent phrase, (7) a mora, whose consonant is “k” that is a velar and unvoiced plosive sound, and which is a fifth mora in the accent phrase, and (8) a mora, whose consonant is “s” that is a dental and unvoiced fricative, and which is a sixth mora in the accent phrase.

16. A voice quality change portion locating method of locating, based on language analysis information regarding a text, a portion of the text where voice quality may change when the text is read aloud, said method comprising steps of:

estimating likelihood of the voice quality change which occurs when the text is read aloud, for each predetermined unit of an input symbol sequence including at least one phonologic sequence, based on (i) a rule which is used for judging likelihood of the voice quality change according to phoneme information and prosody information, the phoneme information and prosody information being included in the language analysis information that is a symbol sequence of a result of language analysis including a phonologic sequence corresponding to the text, and (ii-1) the phoneme information and (ii-2) the prosody information; and locating a portion of the text where the voice quality change is likely to occur, based on the language analysis information and a result of said estimating.

17. A non-transitory computer-readable medium encoded with computer executable instructions for locating, based on language analysis information regarding a text, a portion of the text where voice quality may change when the text is read aloud, said computer executable instructions causing a computer to execute steps of:

estimating likelihood of the voice quality change which occurs when the text is read aloud, for each predetermined unit of an input symbol sequence including at least one phonologic sequence, based on (i) a rule which is used for judging likelihood of the voice quality change according to phoneme information and prosody information, the phoneme information and prosody information being included in the language analysis information that is a symbol sequence of a result of language analysis including a phonologic sequence corresponding to the text, and (ii-1) the phoneme information and (ii-2) the prosody information; and locating a portion of the text where the voice quality change is likely to occur, based on the language analysis information and a result of said estimating.

* * * * *